United States Patent
Lee et al.

(10) Patent No.: US 12,068,549 B2
(45) Date of Patent: Aug. 20, 2024

(54) ELECTRONIC DEVICE INCLUDING ANTENNA

(71) Applicant: Samsung Electronics Co., Ltd., Suwon-si (KR)

(72) Inventors: Hyunjeong Lee, Suwon-si (KR); Himchan Yun, Suwon-si (KR); Bomyoung Kim, Suwon-si (KR); Sewoong Kim, Suwon-si (KR); Soonho Hwang, Suwon-si (KR); Jin Kim, Suwon-si (KR); Jongoh Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 17/975,085

(22) Filed: Oct. 27, 2022

(65) Prior Publication Data

US 2023/0101080 A1    Mar. 30, 2023

Related U.S. Application Data

(63) Continuation of application No. PCT/KR2022/014457, filed on Sep. 27, 2022.

(30) Foreign Application Priority Data

Sep. 30, 2021 (KR) .................. 10-2021-0130409
Oct. 29, 2021 (KR) .................. 10-2021-0146313

(51) Int. Cl.
  *H01Q 9/04* (2006.01)
  *H01Q 5/35* (2015.01)
  *H01Q 21/06* (2006.01)

(52) U.S. Cl.
  CPC ............... *H01Q 9/045* (2013.01); *H01Q 5/35* (2015.01); *H01Q 21/065* (2013.01)

(58) Field of Classification Search
  CPC .......... H01Q 5/35; H01Q 21/065; H01Q 1/52; H01Q 1/243
  See application file for complete search history.

(56) References Cited

U.S. PATENT DOCUMENTS

| 6,239,762 B1 * | 5/2001 | Lier ................... H01Q 21/24 343/846 |
| 9,843,111 B2 | 12/2017 | Ying et al. |

(Continued)

FOREIGN PATENT DOCUMENTS

| KR | 10-2018083 B1 | 9/2019 |
| KR | 10-2070401 B1 | 1/2020 |

(Continued)

OTHER PUBLICATIONS

International Search Report dated Jan. 2, 2023, issued in International Application No. PCT/KR2022/014457.

*Primary Examiner* — Dieu Hien T Duong
(74) *Attorney, Agent, or Firm* — Jefferson IP Law, LLP

(57) ABSTRACT

An electronic device is provided. The electronic device includes a housing, an antenna structure, a first conductive material, and a second conductive material. The housing may be configured to provide a front surface and a rear surface of the electronic device. The antenna structure includes a printed circuit board positioned in the housing. The printed circuit board includes a first surface configured to face the front surface or the rear surface and a second surface configured to face a direction opposite to the first surface. The printed circuit board includes a first conductive layer, a second conductive layer, and a dielectric. The first conductive layer includes a first antenna element and a second antenna element which are configured so as not to overlap each other when viewed from above the first surface.

20 Claims, 26 Drawing Sheets

(56) References Cited

U.S. PATENT DOCUMENTS

| | | |
|---|---|---|
| 10,957,978 B2 | 3/2021 | Cooper et al. |
| 11,095,017 B2 | 8/2021 | Cooper et al. |
| 11,252,268 B2 | 2/2022 | Lee et al. |
| 11,316,284 B2 | 4/2022 | Cho et al. |
| 2018/0233808 A1 | 8/2018 | Noori et al. |
| 2019/0097317 A1 | 3/2019 | Di Nallo et al. |
| 2020/0021011 A1 | 1/2020 | Cooper et al. |
| 2020/0381843 A1* | 12/2020 | Murata ................. H01Q 1/243 |
| 2022/0255225 A1 | 8/2022 | Hwang |

FOREIGN PATENT DOCUMENTS

| | | |
|---|---|---|
| KR | 10-2021-0000519 A | 1/2021 |
| KR | 10-2021-0001976 A | 1/2021 |
| KR | 10-2220020 B1 | 2/2021 |
| KR | 10-2021-0051472 A | 5/2021 |
| KR | 10-2021-0058732 A | 5/2021 |

\* cited by examiner

ELECTRONIC DEVICE INCLUDING ANTENNA

CROSS-REFERENCE TO RELATED APPLICATION(S)

This application is a continuation application, claiming priority under § 365(c), of an International application No. PCT/KR2022/014457, filed on Sep. 27, 2022, which is based on and claims the benefit of a Korean patent application number 10-2021-0130409, filed on Sep. 30, 2021, in the Korean Intellectual Property Office, and of a Korean patent application number 10-2021-0146313, filed on Oct. 29, 2021, in the Korean Intellectual Property Office, the disclosure of each of which is incorporated by reference herein in its entirety.

TECHNICAL FIELD

The disclosure relates to an electronic device including an antenna.

BACKGROUND ART

In line with development of wireless communication technologies, electronic devices have become daily necessities, and content use has increased accordingly. In addition, an increasing number of applications have become available, thereby increasing the number of antennas included in electronic devices.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

As electronic devices have become slim, it may be difficult to position an antenna in a limited space while reducing electromagnetic influences with peripheral components.

Aspects of the disclosure are to address at least the above-mentioned problems and/or disadvantages and to provide at least the advantages described below. Accordingly, an aspect of the disclosure is to provide an electronic device including an antenna for improving antenna radiation performance.

Technical problems to be solved by the disclosure are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing is configured to provide a front surface and a rear surface of the electronic device, an antenna structure including a printed circuit board positioned in the housing, wherein the printed circuit board includes a first surface configured to face the front surface or the rear surface and a second surface configured to face a direction opposite to the first surface, a first conductive layer including a first antenna element and a second antenna element which are configured so as not to overlap each other when viewed from above the first surface, a second conductive layer positioned closer to the second surface than the first conductive layer and be configured to operate as a ground plane, a dielectric positioned between the first conductive layer and the second conductive layer, a first conductive material positioned between the front surface and the second surface when the first surface faces the rear surface and positioned between the rear surface and the second surface when the first surface faces the front surface, and configured to overlap the second conductive layer when viewed from above the first surface, a second conductive material positioned closer to the front surface than the first conductive material when the first surface faces the rear surface and positioned closer to the rear surface than the first conductive material when the first surface faces the front surface, and configured to overlap the first conductive material when viewed from above the first surface, wherein when viewed from above the first surface, the second conductive layer includes a second edge configured to correspond to a first edge of the first antenna element or the second antenna element, and wherein when viewed from above the first surface, the second conductive material includes a third edge configured to correspond to the second edge, and the second edge may be positioned between the first edge and the third edge.

Advantageous Effects of Invention

An electronic device including an antenna according to various embodiments of the disclosure may improve antenna radiation performance or coverage while reducing electromagnetic influences with peripheral components.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
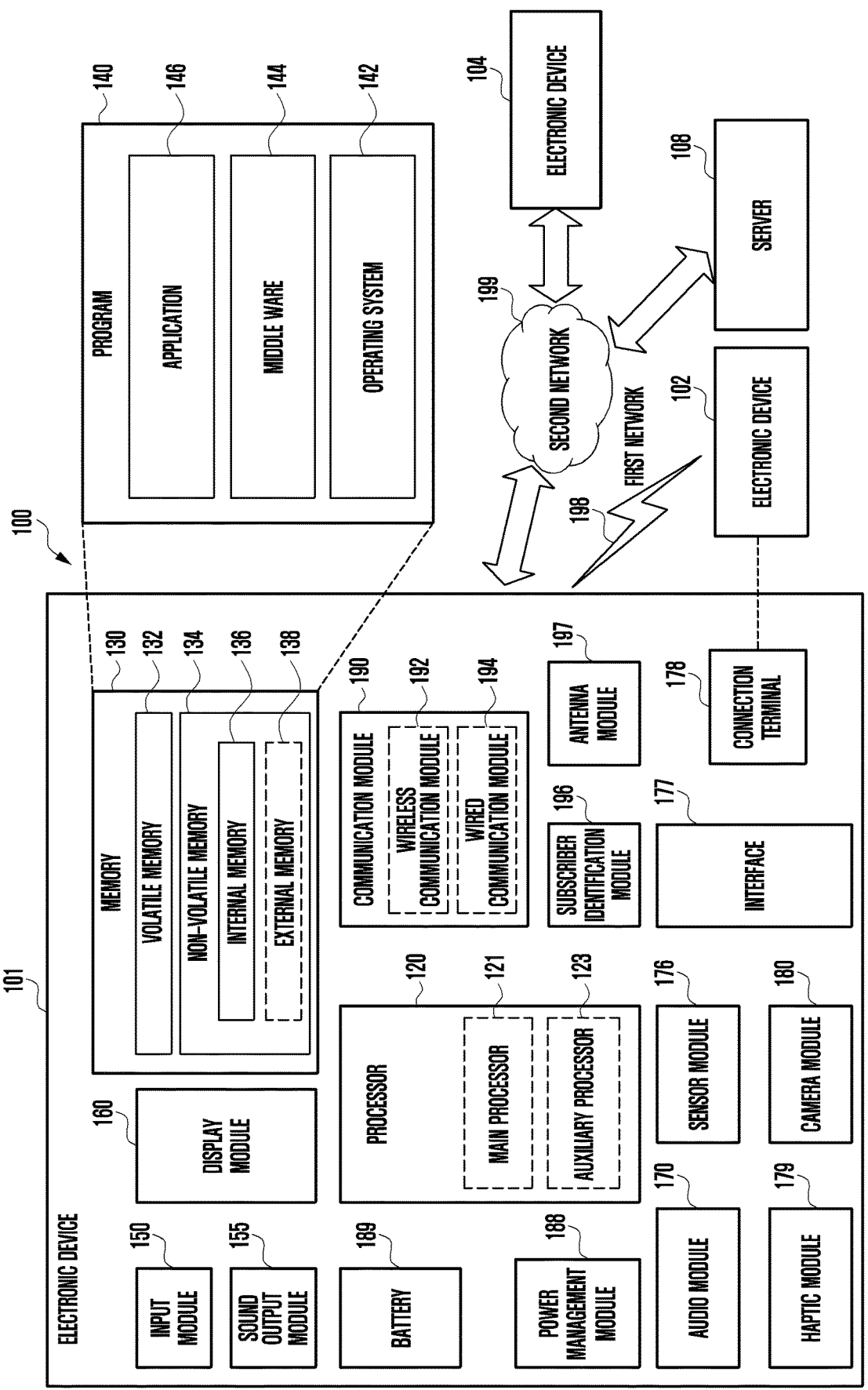
FIG. 1 is a block diagram of an electronic device in a network environment according to an embodiment of the disclosure.

FIG. 1 is a block diagram of an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a millimeter wave (mmWave) band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beamforming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
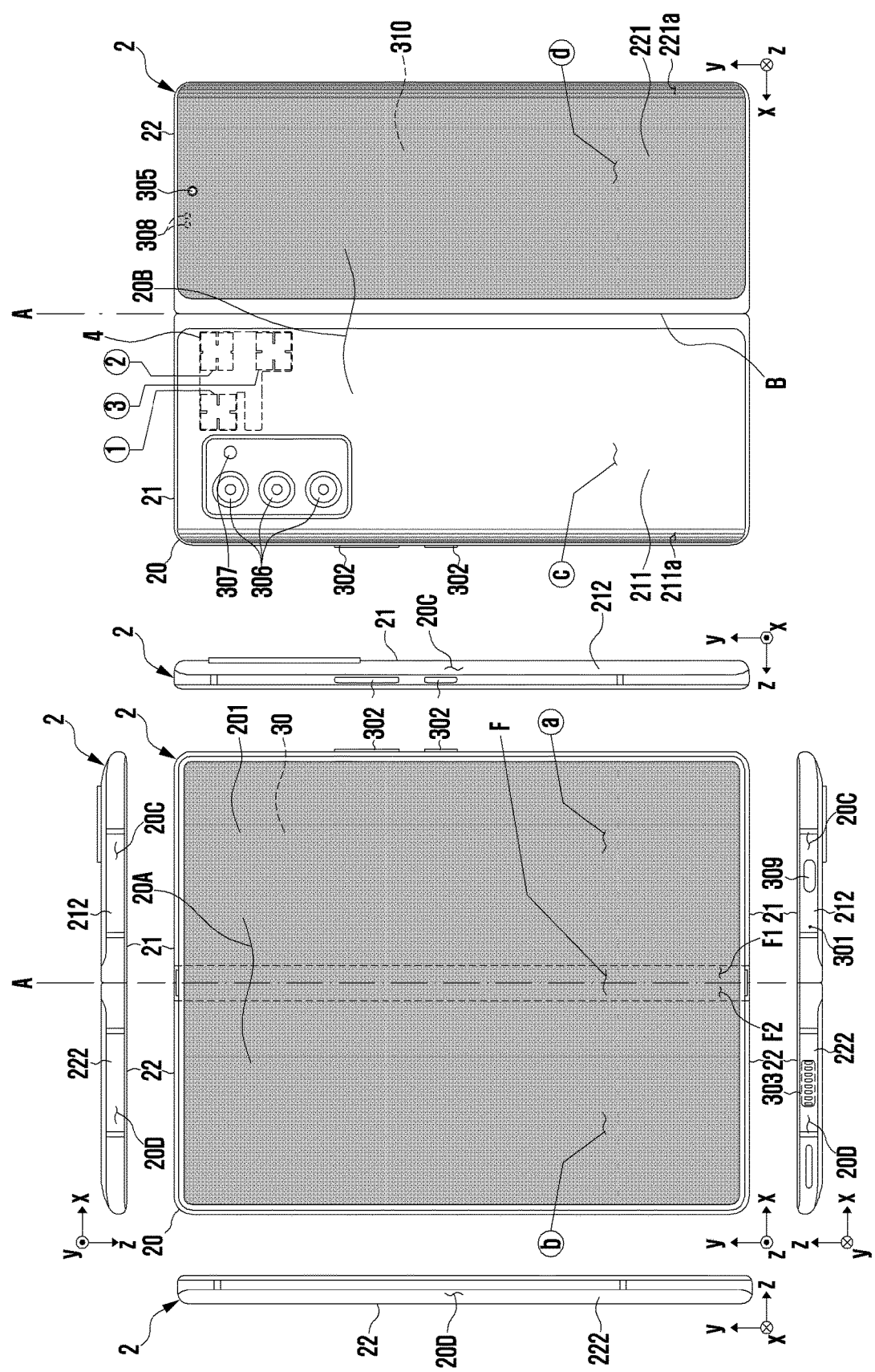
FIG. 2 is diagrams illustrating an electronic device in an unfolded state according to an embodiment of the disclosure.

FIG. 2 is diagrams illustrating the electronic device 2 in a flat or an unfolded state, or an unfolding state according to an embodiment of the disclosure.

Figure 3:
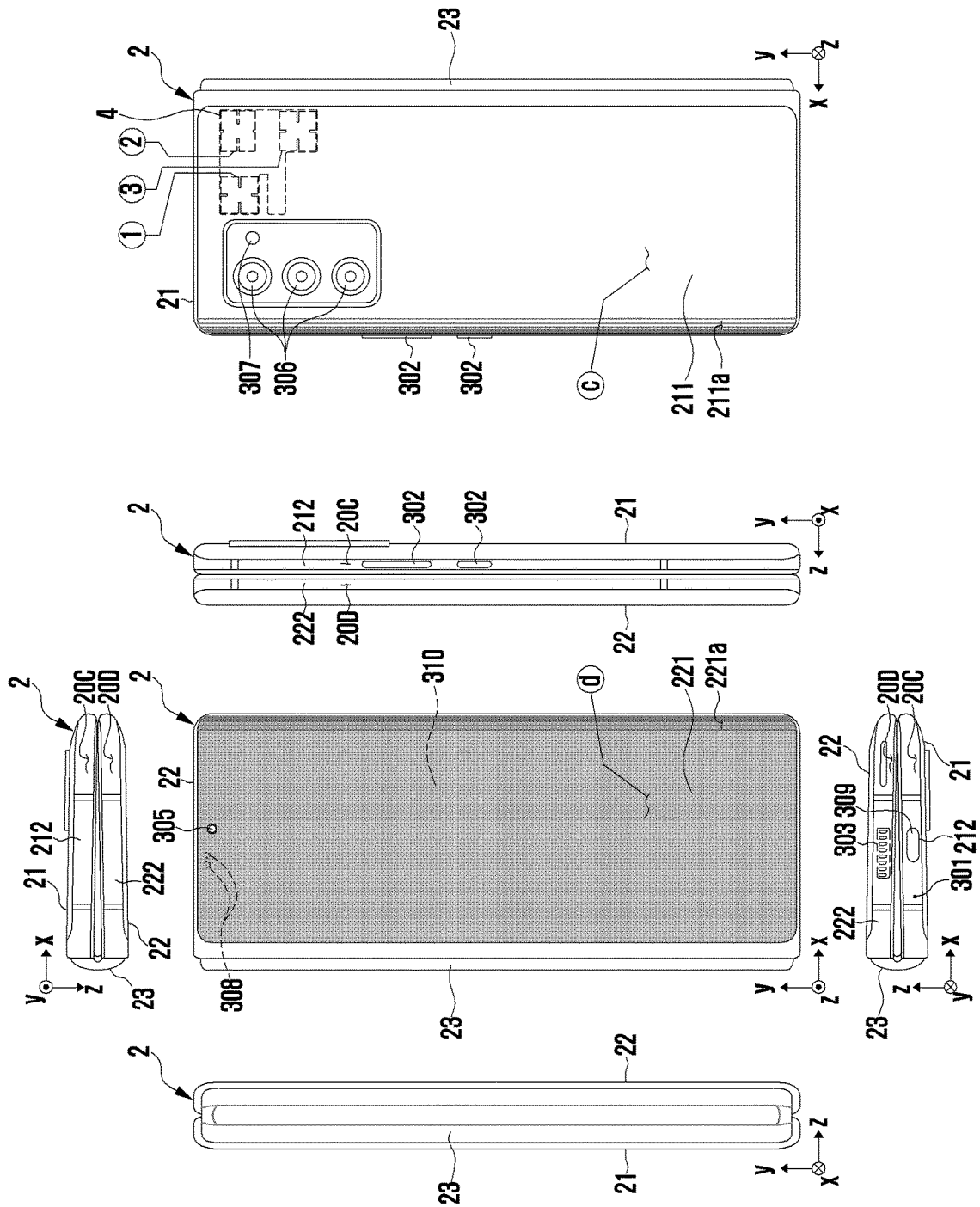
FIG. 3 is diagrams illustrating an electronic device in a folded state according to an embodiment of the disclosure.

FIG. 3 is diagrams illustrating the electronic device 2 in a folded state or a folding state according to an embodiment of the disclosure.

Referring to FIGS. 2 and 3, an electronic device 2 may include a foldable housing 20 and a flexible display 30. The foldable housing 20 may include a front surface 20A of the electronic device 2, and a rear surface 20B of the electronic device 2, which is positioned opposite to the front surface 20A. In order to help understanding, it may be interpreted that the front surface 20A of the electronic device 2 is a surface configured to allow the flexible display 30 to be exposed to the outside, and the rear surface 20B of the electronic device 2 is a surface positioned at the side opposite to the front surface 20A. The foldable housing 20 may include a first side surface 20C and a second side surface 20D of the electronic device 2, which is configured to surround at least a part of the space between the front surface 20A and the rear surface 20B. The front surface 20A may include a first cover area ⓐ, a second cover area ⓑ, and a folding cover area F between the first cover area ⓐ and the second cover area ⓑ. In an unfolded state of the foldable housing 20, the front surface 20A may be substantially a flat surface, and the first cover area ⓐ, the second cover area ⓑ, and the folding cover area F may be configured to face substantially the same direction. The rear surface 20B may include a third cover area ⓒ and a fourth cover area ⓓ. The third cover area ⓒ may be positioned at the side opposite to the first cover area ⓐ of the front surface 20A, and may be configured to face a direction opposite to the first cover area ⓐ. The fourth cover area ⓓ may be positioned at the side opposite to the second cover area ⓑ of the front surface 20A, and may be configured to face a direction opposite to the second cover area ⓑ.

The foldable housing 20 may be implemented as an in-folding structure in which the front surface 20A is folded inward. For example, in an unfolded state (see FIG. 2) of the foldable housing 20, the folding cover area F may be disposed in a flat surface shape, and the first cover area ⓐ and the second cover area ⓑ may be configured to form an angle of about 180 degrees. In a folded state (see FIG. 3) of the foldable housing 20, the folding cover area F may be disposed in a curved-surface surface shape, and the first cover area ⓐ and the second cover area ⓑ may be configured to form an angle different from about 180 degrees. A folded state may include a fully folded state or an intermediate state. The fully folded state (see FIG. 3) may be a maximally folded state in which the first cover area ⓐ and the second cover area ⓑ of the front surface 20A can no longer be close to each other, and for example, first cover area ⓐ and the second cover area ⓑ may be configured to form an angle of about 0 degree-about 10 degrees. In the fully folded state, the front surface 20A may be configured so as not to be substantially exposed to the outside. An intermediate state may mean a state between an unfolded state and the fully folded state. The folding cover area F of the front surface 20A may be configured to be more bent in the fully folded state than in an intermediate state. In some embodiments, the electronic device 2 may be implemented as an out-folding structure in which the front surface 20A (or a screen) is folded outward.

The foldable housing 20 may include a front cover (e.g., a window) 201 configured to form at least a part of the front surface 20A. The flexible display 30 may be configured to at least partially overlap the front cover 201 and be positioned in an inner space of the electronic device 2. The front cover 201 may be configured to protect the flexible display 30 from the outside, and may be substantially transparent. Light output from the flexible display 30 may pass through the front cover 201 and then may travel to the outside. For example, the flexible display 30 may include a first display area (or a first active area) configured to overlap the first cover area ⓐ of the front surface 20A, a second display area (or a second active area) configured to overlap the second cover area ⓑ of the front surface 20A, and a third display area (or a third active area) configured to overlap the folding cover area F. The third display area may be referred to as various other terms such as a 'folding display area' or a 'bendable display area'. A screen may mean an area capable of displaying an image in a device including the flexible display 30 and the front cover 201, and for example, may include a display area of the flexible display 30 and an area of the front cover 201, which is configured to overlap therewith. The front cover 201 may be an element included in the flexible display 30, and may be formed integrally with the flexible display 30. The front cover 201 may be implemented in a thin film form such as a film so as to have flexibility. For example, the front cover 201 may include a plastic film (e.g., a polyimide film) or thin glass (e.g., ultra-thin glass (UTG)). The front cover 201 may include multiple layers. For example, the front cover 201 may be a from in which a protective layer or a coating layer made of various polymer materials (e.g., polyester (PET), polyimide (PI), or thermoplastic polyurethane (TPU)) is arranged on a plastic film or thin glass.

The foldable housing 20 may include a first housing (or a first housing part or a first housing structure) 21, a second housing (or a second housing part or a second housing structure) 22, and a folding part between the first housing 21 and the second housing 22. Coordinate axes, which are shown to help the understanding, are illustrated with reference to the first housing 21, and for example, the first cover area ⓐ may be substantially oriented in the +z-axis direction, and the third cover area ⓒ may be oriented substantially in the −z-axis direction. The first housing 21 and the second housing 22 may be connected by a folding part, and may be mutually rotatable with reference to a folding axis A of the foldable housing 20. For example, the folding part may include a hinge assembly (or a hinge structure) (not shown). The folding axis A may be a rotation axis of the hinge assembly. In the illustrated example, the folding axis A may be parallel to the y-axis direction. The first housing 21 may include a first cover part of the front cover 201, which is positioned at one side with reference to the folding axis A, a first rear cover 211 configured to form at least a part of the third cover area ⓒ of the rear surface 20B, and a first side member (or a first side bezel structure) 212 configured to at least partially surround a space between the first cover part and the first rear cover 211 and to form the first side surface 20C. For example, the first cover part of the front cover 201 may be configured to form the first cover area (ⓐ) and a first folding cover area F1 of the folding cover area F, which is positioned at one side with reference to the folding axis A.

The second housing 22 may include a second cover part of the front cover 201, which is positioned at one side with reference to the folding axis A, a second rear cover 221 configured to form at least a part of the fourth cover area ⓓ of the rear surface 20B, and a second side member (or a side bezel structure) 222 configured to surround at least a part of a space between the second cover part and the second rear cover 221 and to form the second side surface 20D. For example, the second cover part of the front cover 201 may be configured to form the second cover area ⓑ and a second folding cover area F2 of the folding cover area F, which is positioned at the other side with reference to the folding axis A. In the fully folded state of the foldable housing 20, the first side member 212 and the second side member 222 may be aligned to at least partially overlap each other. For example, the first side member 212 and/or the second side member 222 may be formed of a ceramic, a polymer, a metal (e.g., aluminum, stainless steel, or magnesium), or a combination of at least two of the materials. For example, the first side member 212 and/or second side member 222 may include various metal materials such as titanium, an amorphous alloy, a metal-ceramic composite material (e.g., cermet), stainless steel, magnesium, a magnesium alloy, aluminum, an aluminum alloy, a zinc alloys, or a copper alloy. The first rear cover 211 and/or the second rear cover 221 may be substantially opaque. For example, the first rear cover 211 and/or the second rear cover 221 may be formed of coated or colored glass, ceramic, polymer, metal (e.g., aluminum, stainless steel, or magnesium), or a combination of at least two of the materials. The first rear cover 211 or second rear cover 221 may include a plate made of various materials such as transparent glass, ceramic, or polymer, and at least one coating layer disposed on the plate using a coating. As another example, the first rear cover 211 or the second rear cover 221 may include a plate made of various materials such as transparent glass, ceramic, or polymer, and a film (e.g., a decoration film) attached to the plate and having various visual effects. In some embodiments, the first rear cover 211 and the first side member 212 may be integrally formed and may include the same material. In some embodiments, the second rear cover 221 and the second side member 222 may be integrally formed and may include the same material.

The folding part may include a hinge housing 23. The hinge housing 23 may be configured to cover at least one hinge connecting the first housing 21 and the second housing 22. The hinge housing 23 may be referred to as a 'hinge cover'. When a state of the electronic device 2 is changed from the unfolded state of FIG. 2 to the folded state of FIG. 3, the hinge housing 23 may be configured to cover a gap B generated since the first housing 21 and the second housing 22 are spaced such that the inside of the electronic device 2 is not exposed. As illustrated in FIG. 2, in the unfolded state of the electronic device 2, the gap B may be substantially absent, and the hinge housing 23 may not be exposed to the outside due to being covered by the first housing 21 and the second housing 22. Although not illustrated, in an intermediate state of the electronic device 2, the hinge housing 23 may be partially exposed between the first housing 21 and the second housing 22. The hinge housing 23 may be more exposed in the folded state of FIG. 3 than in an intermediate state.

The foldable housing 20 may be referred to as a structure (e.g., a foldable housing structure or a foldable housing assembly) configured to form at least a part of the front surface 20A, the rear surface 20B, the first side surface 20C, and the second side surface 20D. For example, the foldable housing 20 may include a first housing part, a second housing part, and a folding part connected to the first housing part and the second housing part. The folding part may mean a more flexible portion than the first housing part and the second housing part, and may be bent in a folded state of the electronic device 2. For example, the folding part may include a hinge assembly. As another example, the folding part may include a structure (e.g., a multi-bar structure) in which multiple bars are arranged, and may be implemented as various other structures configured to have bending properties while connecting the first housing part and the second housing part without not being limited thereto.

The electronic device 2 may include a display (hereinafter, a sub-display) 310 positioned inside the first housing 21 to be adjacent to the first rear cover 211. A partial area of the first rear cover 211 may be configured to overlap the sub-display 310 and be substantially transparent. The electronic device 2 may be configured to output an image using the sub-display 310 instead of the flexible display 30 in the folded state of FIG. 3.

The second rear cover 221 may include a second curved-surface area 221a bent from the fourth cover area ⓓ toward the second cover area ⓑ and configured to seamlessly extend. The second curved-surface area 221a may be formed to be adjacent to the long edge of the second rear cover 221, which is substantially parallel to the folding axis A. The sub-display 310 may include a flexible display capable of being disposed in a form corresponding thereto.

The first rear cover 211 may include a first curved-surface area 211a bent from the third cover area ⓒ toward the first cover area ⓐ and configured to seamlessly extend. The first curved-surface area 211a may be formed to be adjacent to the long edge of the first rear cover 211, which is substantially parallel to the folding axis A. For example, in the unfolded state (see FIG. 2) or the folded state (see FIG. 3) of the electronic device 2, for the appearance thereof, the first curved-surface area 211a and the second curved-surface area 221a may be positioned at sides opposite to each other so as to be substantially symmetric. In some embodiments, the first curved-surface area 211a or the second curved-surface area 221a may be omitted.

The electronic device 2 may include an input module, a sound output module, a camera module, a sensor module, or a connection terminal. At least one of elements of the electronic device 2 may be omitted, or other elements may be additionally included therein. The position or the number of elements included the electronic device 2 may not be limited to the illustrated embodiment and may be various.

The input module may include a microphone positioned inside the electronic device 2, and a microphone hole 301 formed through the first side surface 20C to correspond to the microphone. The position or the number of the input module including the microphone and the microphone hole 301 corresponding thereto may not be limited to the illustrated example and may be various. In some embodiments, the electronic device 2 may include multiple microphones capable of detecting the direction of sound.

The input module may include key input devices 302. For example, the key input devices 302 may be positioned in an opening (not shown) formed through the first side surface 20C. In some embodiments, the electronic device 2 may omit some or all of the key input devices 302, and the key input device not included therein may be implemented as a soft key using the flexible display 30 or the sub-display 310. In some embodiments, the input module may include at least one sensor module.

The sound output module may include a speaker positioned inside the electronic device 2 and a speaker hole 303 formed through the second side surface 20D to correspond to the speaker. The position or the number of the sound output module including the speaker and the speaker hole 303 corresponding thereto may not be limited to the illustrated example and may be various. In some embodiments, the microphone hole 301 and the speaker hole 303 may be implemented as one hole. In some embodiments, a piezo speaker, in which the speaker hole 303 is omitted, may be implemented. For example, the sound output module may include a receiver for a call, which is positioned inside the electronic device 2, and a receiver hole (not shown) formed through the fourth cover area ⓓ to correspond to the receiver for a call.

The camera module may include a first camera module (or a front camera module) 305 positioned to correspond to the fourth cover area ⓓ, or multiple second camera modules (or rear camera modules) 306 positioned to correspond to the third cover area ⓒ. The first camera module 305 and the multiple second camera modules 306 may include one lens or multiple lenses, an image sensor, and/or an image signal processor. The position or the number of the first camera module 305 or the multiple second camera modules 306 may not be limited to the illustrated embodiment and may be various.

The sub-display 310 may include an opening aligned with the first camera module 305. External light may reach the first camera module 305 through the second rear cover 221 and the opening of the sub-display 310. The opening of the sub-display 310 may also be formed in a notch shape according to the position of the first camera module 305. The first camera module 305 may be positioned on the rear surface of the sub-display 310 or below or beneath the sub-display 310, and the first camera module 305 may be configured to perform a related function (e.g., image photographing) while the position thereof is not visually distinguished (or exposed). For example, the first camera module 305 may include a hidden display rear camera (e.g., an under-display camera (UDC)). In some embodiments, the first camera module 305 may be aligned and positioned in a recess formed on the rear surface of the sub-display 310. The first camera module 305 may be disposed to overlap at least a part of a screen, and may be configured to obtain an image of an external subject without being visually exposed to the outside. In this case, a partial area of the sub-display 310, which at least partially overlaps the first camera module 305, may include a different pixel structure and/or wiring structure compared to another area. For example, a partial area of the sub-display 310, which at least partially overlaps the first camera module 305, may have a different pixel density compared to another area. The pixel structure and/or wire structure formed in a partial area of the sub-display 310, which at least partially overlaps the first camera module 305, may be configured to reduce the loss of light between the outside and the first camera module 305. In some embodiments, pixels may not be arranged in some areas of the sub-display 310, which at least partially overlaps the first camera module 305.

The multiple second camera modules 306 may have different attributes (e.g., a view angle) or functions, and may include a dual camera or a triple camera. The multiple second camera modules 306 may include multiple camera modules including lenses having different view angles, and the electronic device 2 may be configured to control so as to change the view angle of the camera module, which is performed in the electronic device 2, based on a user's selection. The multiple second camera modules 306 may include at least one of a wide-angle camera, a telephoto camera, a color camera, a monochrome camera, or an infrared (IR) camera (e.g., a time of flight (TOF) camera or a structured light camera). In some embodiments, the IR camera may be operated as at least a part of a sensor module. The electronic device 2 may include a flash 307 as a light source for the multiple second camera modules 306. The flash 307 may include a light-emitting diode or a xenon lamp.

The sensor module may be configured to generate electric signals or data values corresponding to an internal operation state of the electronic device 2 or an external environment state. For example, the sensor module may include at least one of a proximity sensor, a gesture sensor, a gyro sensor, a barometric pressure sensor, a magnetic sensor, an acceleration sensor, a grip sensor, a color sensor, an infrared (IR) sensor, a biometric sensor (e.g., a fingerprint sensor, a heart rate monitor (HRM) sensor), a temperature sensor, a humidity sensor, or an illuminance sensor.

The sensor module may include an optical sensor 308 positioned inside the electronic device 2 so as to correspond to the fourth cover area ⓓ. For example, the optical sensor 308 may include a proximity sensor or an illuminance sensor. The optical sensor 308 may be aligned with the opening formed through the sub-display 310. External light may reach the optical sensor 308 through the second rear cover 221 and the opening of the sub-display 310. The optical sensor 308 may be positioned on the rear surface of the sub-display 310, or below or beneath the sub-display 310, and the optical sensor 308 may be configured to perform a related function while the position thereof is not visually distinguished (or exposed). The optical sensor 308 may be aligned and positioned in a recess formed on the rear surface of the sub-display 310. The optical sensor 308 may be disposed to overlap at least a part of a screen, and may be configured to perform a sensing function without being exposed to the outside. In this case, a partial area of the sub-display 310, which at least partially overlaps the optical sensor 308, may include a different pixel structure and/or wiring structure compared to another area. For example, a partial area of the sub-display 310, which at least partially overlaps the optical sensor 308, may have a different pixel density compared to another area. In some embodiments, the sensor module may include a fingerprint sensor (not shown) positioned below the sub-display 310. The fingerprint sensor may be implemented as a capacitive type, an optical type, or an ultrasonic type. The pixel structure and/or wiring structure formed in a partial area of the sub-display 310, which at least partially overlaps the sensor module, may be configured to reduce the loss thereof when various types of signals (e.g., light or ultrasound) related to the sensor module pass between the outside and the sensor module. In some embodiments, multiple pixels may not be arranged in some areas of the sub-display 310, which at least partially overlaps the sensor module.

The connection terminal may include a connector (e.g., a USB connector) positioned inside the electronic device 2. The electronic device 2 may include a connector hole 309 formed through the first side surface 20C to correspond to the connector. The electronic device 2 may be configured to transmit and/or receive power and/or data to and/or from an external electronic device electrically connected to the connector through the connector hole 309. The positions or the numbers of the connector and the connector hole 309 corresponding thereto may not be limited to the illustrated example and may be various.

The electronic device 2 may include an attachable/detachable pen input device (e.g., an electronic pen, a digital pen, or a stylus pen) (not shown). For example, the pen input device may be attachable to or detachable from the hinge housing 23. The hinge housing 23 may include a recess, and the pen input device may be fitted into the recess. The pen input device may be attached to or detached from the recess of the hinge housing 23, which is exposed to the outside in a folded state (see FIG. 3) or an intermediate state of the electronic device 2. In some embodiments, the electronic device 2 may be implemented such that the pen input device is inserted into an inner space of the first housing 21 or the second housing 22.

The electronic device 2 may include an antenna structure 4 positioned inside the first housing 21. For example, the electronic device 2 may be configured to perform a location positioning function (e.g., angle of arrival (AOA)) with respect to a signal source (e.g., a responder, a transmitter, or a Tx device) using the antenna structure 4. The electronic device 2 may include a wireless communication circuit (e.g., the wireless communication module 192 in FIG. 1) electrically connected to the antenna structure 4 and a processor (e.g., the processor 120 in FIG. 1) electrically connected to the wireless communication circuit. The processor may be configured to simultaneously perform an AOA for measuring an angle and a ranging for measuring a distance. The processor may be configured to identify (or estimate) the distance between the electronic device 2 and a signal source using a first antenna element ①, a second antenna element ②, or a third antenna element ③. The processor may be configured to identify (or estimate) a reception angle (e.g., the direction of a signal) of a signal with respect to a set axis of the electronic device 2 using at least one of a difference in the arrival time of a response message for a request message through at least two antenna elements (e.g., the first antenna element ①and the second antenna element ②, or the first antenna element ①and the third antenna element ③) of the antenna structure 4, an arrival distance difference between received signals, or a phase difference thereof.

The electronic device 2 may be configured to support a location positioning function using the bandwidth of a broadband (e.g., a UWB). For example, the UWB, which is a technology conforming to the international standard of IEEE 802.15.4, may be a technology in which communication is performed using the bandwidth of a broadband. In an embodiment, the electronic device 2 (e.g., an initiator, a receiver, or a receiver (Rx) device) may be configured to identify or estimate the position of a signal source (e.g., a responder, a transmitter, or a transmitter (Tx) device) using a phase difference of a signal received through multiple antenna elements (e.g., the first antenna element ①, the second antenna element ②, and the third antenna element ③) included in the antenna structure 4. The antenna structure 4 may be implemented as a printed circuit board (e.g., a flexible printed circuit board (FPCB)), and for example, may be a patch antenna including multiple patches (e.g., the first antenna element ①, the second antenna element ②, and the third antenna element ③).

The electronic device 2 may further include various elements according to a provision form thereof. The elements may be variously changed according to the convergence trend of the electronic device 2, and thus may not be enumerated. However, an element equivalent to the mentioned elements may be additionally included in the electronic device 2. In various embodiments, according to a provision form thereof, specific elements may be excluded from the above-described elements, or may be replaced with other elements.

Although the electronic device 2 including the antenna structure 4 has an appearance of a foldable type, the electronic device 2 is not limited thereto. For example, the electronic device 2 including the antenna structure 4 may be implemented as a bar-type or a plate-type electronic device, a slidable electronic device, a stretchable electronic device, and/or a rollable electronic device.

Figure 4:
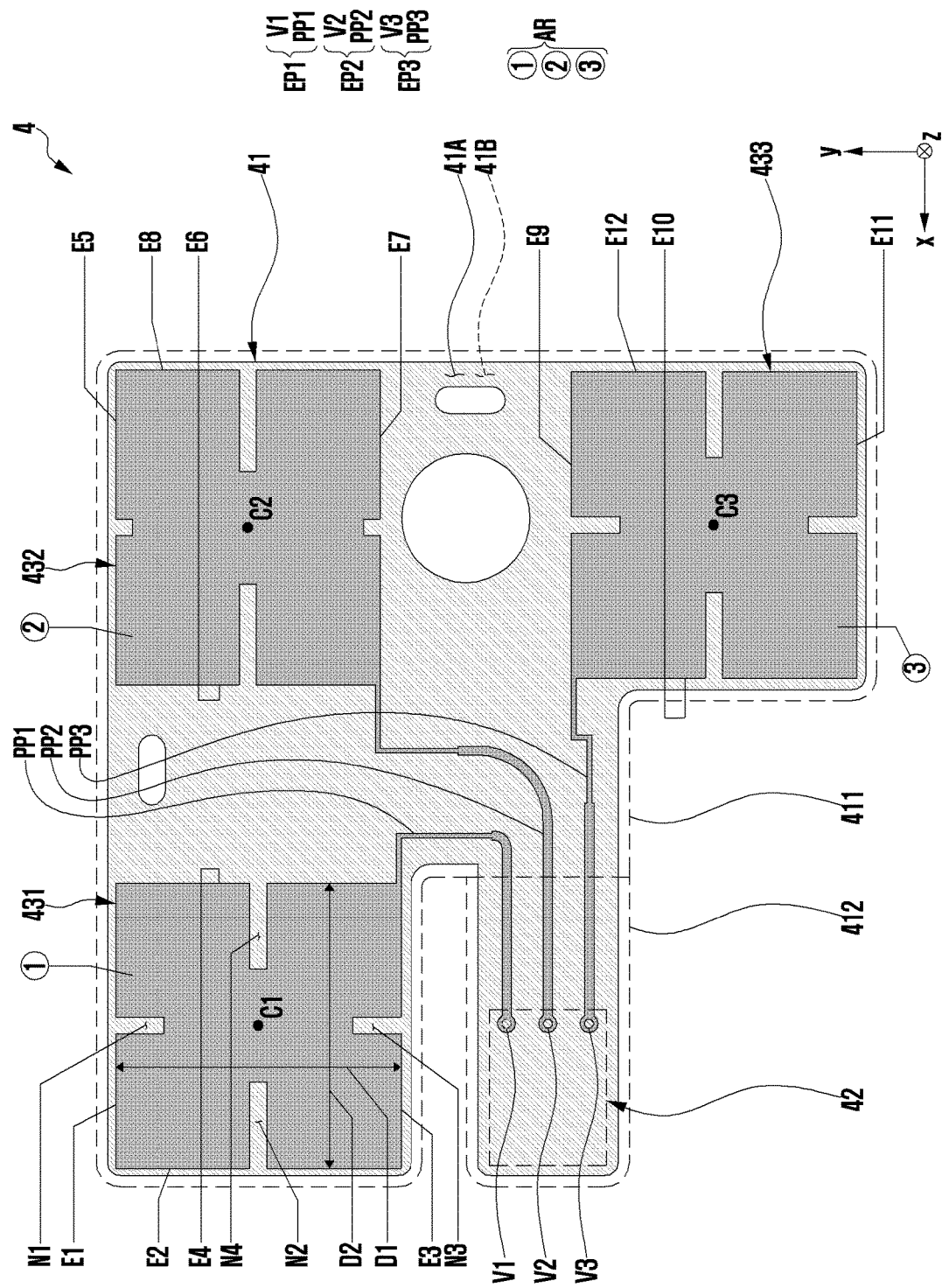
FIG. 4 is a diagram illustrating an antenna structure when viewed from above a third cover area of an electronic device according to an embodiment of the disclosure.

FIG. 4 is a diagram illustrating the antenna structure 4 when viewed from above the third cover area ⓒ (see FIG. 2) of the electronic device 2 (e.g., when viewed in the +z-axis direction) according to an embodiment of the disclosure.

Referring to FIG. 4, the antenna structure 4 may include a printed circuit board 41 and a connector 42.

For example, the printed circuit board 41 may have multiple conductive layers stacked thereon, each of which includes at least one conductive pattern, and a dielectric (or an insulator) may be positioned between the multiple conductive layers. At least a part of the printed circuit board 41 may be implemented using a flexible copper clad laminate (FCCL). The flexible copper clad laminate may be a laminate used in the printed circuit board 41, and may include a structure in which a copper foil is attached on one surface or both surfaces of an insulating film (or a dielectric film) having flexibility using an adhesive material (e.g., an acrylic adhesive). The insulating film having flexibility may include various non-conductive materials such as a polyimide film or a polyester film. For example, the insulating film having flexibility may include pre-impregnated materials (PREPREG) (e.g., an insulating resin layer). One or more conductive patterns included in the multiple conductive layers may be utilized as an antenna radiator. One or more conductive patterns included in the multiple conductive layers may be utilized as an electrical path (e.g., signal line). One or more conductive patterns included in the multiple conductive layers may be utilized as a ground plane. A conductive pattern utilized as an antenna radiator may be referred to as an 'antenna element' or a 'radiation pattern'. A conductive pattern utilized as at least a part of an electrical path may be referred to as a 'path pattern'. A conductive pattern utilized as at least a part of a ground plane may be referred to as a 'ground pattern'.

The printed circuit board 41 may include multiple conductive vias. The conductive vias may be conductive holes penetrated to allow connection wires for electrically connecting conductive patterns of conductive layers different from each other to be arranged therethrough. For example, the conductive via may include a plated through hole (PTH), a laser via hole (LVH), a buried via hole (BVH), or a stacked via. The printed circuit board 41 may include a first surface 41A and a second surface 41B positioned at a side opposite to the first surface 41A. The first surface 41A may be configured to substantially face the third cover area ⓒ (or the first rear cover 211) (see FIG. 2 or 3). The second surface 41B may be configured to substantially face the first cover area ⓐ (see FIG. 2).

The connector 42 may be disposed on the second surface 41B. The printed circuit board 41 may include a first portion 411 including the multiple antenna elements ①, ②, an ③, and a second portion 412 configured to extend from the first portion 411 and electrically connected to a first substrate assembly positioned in the inner space of the first housing 21 (see FIG. 2). The connector 42 may be disposed in the second portion 412. In some embodiments, a flexible member such as a sponge may be positioned between the first rear cover 211 (see FIG. 2 or FIG. 3) and the connector 42. The flexible member may be configured to elastically press the connector 42 toward the first substrate assembly such that the connector 42 is prevented from being separated from the first substrate assembly, between the connector 42 and the first rear cover 211.

The first portion 411 and the second portion 412 of the printed circuit board 41 may be substantially flexible. For example, the printed circuit board 41 may include a flexible printed circuit board (FPCB).

The second portion 412 of the printed circuit board 41 may be configured to have flexibility greater than the first portion 411 of the printed circuit board 41. Compared to the first portion 411, the second portion 412 may be configured to have a bending characteristic (e.g., flexibility) which allows same to be bent without breakage while reducing stress generation under the same conditions. The first portion 411 and the second portion 412 may be substantially flexible, and the second portion 412 may be configured to have flexibility greater than the first portion 411. For example, the second portion 412 may be configured to have a thinner thickness or a smaller number of stacks than the first portion 411, and thus may be implemented more flexibly than the first portion 411. As another example, the second portion 412 may include a material different from that of the first portion 411 and thus may be implemented more rigidly than the first portion 411. The second portion 412 may be a substantially flexible portion (or a flexible section) of the printed circuit board 41, and the first portion 411 may be a substantially rigid portions (or rigid sections) of the printed circuit board 41. The printed circuit board 41, which includes a flexible portion and a rigid portion, or portions having different flexibility, may be formed using various other structures. For example, the printed circuit board 41 may be formed as a rigid flexible printed circuit board (RFPCB) including a rigid first portion 411 and a flexible second portion 412. In some embodiments, the first portion 411 may be formed as a rigid printed circuit board (RPCB), and the second portion may be formed as an FPCB and connected to the first portion 411.

The printed circuit board 41 may include the first antenna element ①, the second antenna element ②, the third antenna element ③, a first path pattern PP1, a second path pattern PP2, a third path pattern PP3, a first conductive via V1, a second conductive via V2, and/or a third conductive via V3. In an embodiment, the first conductive via V1, the second conductive via V2, and the third conductive via V3 may be positioned in the second portion 412 of the printed circuit board 41. The first path pattern (or a first signal line pattern) PP1 may be configured to electrically connect the first antenna element ① and the first conductive via V1. The first path pattern PP1 may be electrically connected to the connector 42 through the first conductive via V1. The second path pattern (or a second signal line pattern) PP2 may be configured to electrically connect the second antenna element ② and the second conductive via V2. The second path pattern PP2 may be electrically connected to the connector 42 through the second conductive via V2. The third path pattern (or a third signal line pattern) PP3 may be configured to electrically connect the third antenna element ③ and the third conductive via V3. The third path pattern PP3 may be electrically connected to the connector 42 through the third conductive via V3. A first electrical path EP1 including the first path pattern PP1 and the first conductive via V1 may be configured to form a first signal line configured to connect the first antenna element ① and the connector 42. A second electrical path EP2 including the second path pattern PP2 and the second conductive via V2 may be configured to form a second signal line configured to connect the second antenna element ② and the connector 42. A third electrical path EP3 including the third path pattern PP3 and the third conductive via V3 may be configured to form a third signal line configured to connect the third antenna element ③ and the connector 42.

A wireless communication circuit (e.g., the wireless communication module 192 in FIG. 1) included in the first substrate assembly positioned in the inner space of the first housing 21 (see FIG. 2) may be configured to provide an emission current (or an electromagnetic signal) (e.g., an UWB signal) to the first antenna element ① through the first electrical path EP1, and the first antenna element ① may be configured to emit an electromagnetic wave. The first antenna element ① may be configured to emit an electromagnetic signal, which is fed to the first electrical path EP1 (e.g., a first feed line), to the outside, or to receive an electromagnetic signal from the outside. A wireless communication circuit (e.g., the wireless communication module 192 in FIG. 1) may be configured to provide an emission current (or an electromagnetic signal) (e.g., an UWB signal) to the second antenna element ② through the second electrical path EP2 and, the second antenna element ② may be configured emit an electromagnetic wave. The second antenna element ② may be configured to emit an electromagnetic signal, which is fed to the second electrical path EP2 (e.g., a second feed line), to the outside, or to receive an electromagnetic signal from the outside. A wireless communication circuit (e.g., the wireless communication module 192 in FIG. 1) may be configured to provide an emission current (or an electromagnetic signal) (e.g., an UWB signal) to the third antenna element ③ through the third electrical path EP3 and, the third antenna element ③ may be configured emit an electromagnetic wave. The third antenna element ③ may be configured to emit an electromagnetic signal, which is fed to the third electrical path EP3 (e.g., a third feed line), to the outside, or to receive an electromagnetic signal from the outside. In some embodiments, the first path pattern PP1 may be referred to as a 'first feeding pattern', the second path pattern PP2 may be referred to as a 'second feeding pattern', and the third path pattern PP3 may be referred to as a 'third feeding pattern'. The antenna element (e.g., the first antenna element ①, the second antenna element ②, or the third antenna element ③) may be connected to a communication circuit (e.g., the processor 120 in FIG. 1 or a communication processor) through the feeding patterns so as to secure a frequency resonance characteristic. The first feeding pattern, the second feeding pattern, and the third feeding pattern are spaced apart from each other, so that isolation between the feeding patterns can be secured.

An element including the first antenna element ① and the first electrical path EP1 may be referred to as a first antenna 431. An element including the second antenna element ② and the second electrical path EP2 may be referred to as a second antenna 432. An element including the third antenna element ③ and the third electrical path EP3 may be referred to as a third antenna 433. The first electrical path EP1 may be referred to as a first feeder (e.g., a first feeding line) configured to provide an electromagnetic signal (or an emission) to the first antenna element ①, and the first antenna element ① may be referred to as a first radiation part (or a first radiator or a first antenna radiator) configured to emit a fed electromagnetic signal to the outside or to receive an electromagnetic signal from the outside. The second electrical path EP2 may be referred to as a second feeder (e.g., a second feeding line) configured to provide an electromagnetic signal (or an emission current) to the second antenna element ②, and the second antenna element ② may be referred to as a second radiation part (or a second radiator or a second antenna radiator) configured to emit a fed electromagnetic signal to the outside or to receive an electromagnetic signal from the outside. The third electrical path EP3 may be referred to as a third feeder (e.g., a third feeding line) configured to provide an electromagnetic signal (or an emission current) to the third antenna element ③, and the third antenna element ③ may be referred to as a third radiation part (or a third radiator or a third antenna radiator) configured to emit a fed electromagnetic signal to the outside or to receive an electromagnetic signal from the outside.

The first antenna element ①, the second antenna element ②, and the third antenna element ③ may be included in a first conductive layer (not shown) among the multiple conductive layers included in the printed circuit board 41. The first conductive layer may be positioned closer to the first surface 41A than to the second surface 41B of the printed circuit board 41. The first path pattern PP1, the second path pattern PP2, and the third path pattern PP3 may be included in the first conductive layer. For example, the first path pattern PP1 may be configured to extend from the edge of the first antenna element ① when viewed from above the first surface 41A (e.g., when viewed in the +z-axis direction). The second path pattern PP2 may be configured to extend from the edge of the second antenna element ② when viewed from above the first surface 41A. The third path pattern PP3 may be configured to extend from the edge of the third antenna element ③ when viewed from above the first surface 41A. When viewed from above the first surface 41A, the second path pattern PP2 may be configured to extend from the second antenna element ② between the first path pattern PP1 and the third path pattern PP3 so as to be electrically connected to the second conductive via V2.

When the first path pattern PP1 is included in a conductive layer different from the first antenna element ①, the first electrical path EP1 may include a conductive via configured to electrically connect the first path pattern PP1 and the first antenna element ①. When the second path pattern PP2 is included in a conductive layer different from the second antenna element ②, the second electrical path EP2 may include a conductive via configured to electrically connect the second path pattern PP2 and the second antenna element ②. When the third path pattern PP3 is included in a conductive layer different from the third antenna element ③, the third electrical path EP3 may include a conductive via configured to electrically connect the third path pattern PP3 and the third antenna element ②. Any two of the first path pattern PP1, the second path pattern PP2, and the third path pattern PP3 may be included in the same conductive layer, or may be included in different conductive layers, respectively.

When the first path pattern PP1, the second path pattern PP2, or the third path pattern PP3 includes a first pattern and a second pattern respectively included in different layers, the printed circuit board 41 may include a conductive via configured to electrically connect the first pattern and the second pattern.

The electronic device 2 (see FIG. 2) may be configured to communicate with a signal source using the first antenna element ①, the second antenna element ②, and the third antenna element ③. An antenna array AR may be formed by including the first antenna element ①, the second antenna element ②, and the third antenna element ③. For example, the electronic device 2 may be configured to perform a location positioning function (e.g., an AOA) with respect to a signal source (e.g., a responder, a transmitter, or a Tx device) using the antenna array AR. In an embodiment, the antenna array AR may be arranged in an 'L' shape. Due to the 'L' shape arrangement, the first antenna element ① may be positioned to be spaced apart from the second antenna element ② in the +x-axis direction, and the third antenna element ③ may be positioned to be spaced apart from the second antenna element ② in the −y-axis direction. The first antenna element ① and the second antenna element ② among the antenna array AR may be aligned to be spaced apart in the x-axis direction, and the second antenna element ② and the third antenna element ③ among the antenna array AR may be aligned to be spaced apart in the y-axis direction.

A processor (e.g., the processor 120 in FIG. 1) may be configured to identify or estimate a first angle (e.g., a first signal reception angle) at which a signal is received with respect to a set x-axis of the electronic device 2 using a time difference between signals received through the first antenna element ① and the second antenna element ② which are aligned in the x-axis direction, and a phase difference resulting therefrom. For example, the set x-axis of the electronic device 2 may correspond to a direction orthogonal to a direction (e.g., the −z-axis direction) to which the third cover area ⓒ (see FIG. 2) is directed, and orthogonal to a direction (e.g., the y-axis direction) of the folding axis A (see FIG. 2). The processor may be configured to identify or estimate a second angle (e.g., a second signal reception angle) at which a signal is received with respect to a set y-axis of the electronic device 2 using a time difference between signals received through the second antenna element ② and the third antenna element ③ which are aligned in the y-axis direction, and a phase difference resulting therefrom. For example, the set y-axis of the electronic device 2 may correspond to a direction parallel to the folding axis A (see FIG. 2). The processor may be configured to identify or estimate a direction of a signal source with respect to the electronic device 2 using the first angle and the second angle.

The electronic device 2 may be configured to identify or estimate a distance between the electronic device 2 and a signal source using a time difference between signals received through the antenna array AR, and a phase difference resulting therefrom. When the first antenna element ① and the second antenna element ② are in a misaligned state (misalign state) in the x-axis direction, or the second antenna element ② and the third antenna element ③ are in a misaligned state in the y-axis direction, in order to reduce a recognition error of location positioning, the electronic device 2 may be implemented to correct by applying an offset value based on a misaligned distance between the antennas. For example, the state in which the first antenna element ① and the second antenna element ② are misaligned in the x-axis direction, may mean a state in which a first center C1 of the first antenna element ① and a second center C2 of the second antenna element ② are misaligned in the x-axis direction. For example, the state in which the second antenna element ② and the third antenna element ③ are misaligned in the y-axis direction, may mean a state in which the second center C2 of the second antenna element ② and a third center C3 of the third antenna element ③ are misaligned in the y-axis direction. Although an example in which the antenna structure 4 includes the first antenna element ①, the second antenna element ②, and the third antenna element ③, is presented, the number or the position of the antenna elements included in the antenna array AR is not limited to the illustrated example. In some embodiments, the antenna array AR may be arranged in various shapes other than the illustrated 'L' shape. The processor may be configured to identify or estimate the first angle and the second angle at which a signal is received with respect to the set x-axis and the set y-axis of the electronic device 2 using a time difference between signals received through all of the first antenna element ① to the third antenna element ③, and a phase difference resulting therefrom. When 3D AOA is measured through all of the first antenna element ① to the third antenna element ③ (all of the top, bottom, left, right are measured), the electronic device may be configured to perform more reliable AOA positioning.

When viewed from above the first surface 41A of the printed circuit board 41 (e.g., when viewed in the +z-axis direction, or when viewed in the x-y plane), the first antenna element ① may include a first edge E1, a second edge E2, a third edge E3, and a fourth edge E4. The first edge E1 may be positioned to be spaced apart from the third edge E3 in the +y-axis direction. The second edge E2 may be positioned to be spaced apart from the fourth edge E4 in the +x-axis direction. When viewed on the x-y plane, the first edge E1 and the third edge E3 may be formed to be substantially symmetrical with reference to the first center (e.g., the center of symmetry) C1 of the first antenna element ①. When viewed on the x-y plane, the second edge E2 and the fourth edge E4 may be formed to be substantially symmetrical with reference to the first center C1 of the first antenna element ①. In an embodiment, the first antenna element ① may include a first notch N1 formed on the first edge E1, a second notch N2 formed on the second edge E2, a third notch N3 formed on the third edge E3, and a fourth notch N4 formed on the fourth edge E4. For example, the notch may mean an opening formed in a dented shape on the edge. The notch may be referred to as a 'slit'. When viewed on the x-y plane, the first notch N1 and the third notch N3 may be formed to be substantially symmetrical with reference to the first center C1 of the first antenna element ①. When viewed on the x-y plane, the second notch N2 and the fourth notch N4 may be formed to be substantially symmetrical with reference to the first center C1 of the first antenna element ①. When viewed on the x-y plane, the first notch N1, the second notch N2, the third notch N3, and the fourth notch N4 may be arranged at an angle of substantially 90 degrees with reference to the first center C1 of the first antenna element ①. When viewed on the x-y plane, the first edge E1 may include a first straight line part configured to extend in the x-axis direction, and a first notch part due to the first notch N1. When viewed on the x-y plane, the second edge E2 may include a second straight line part configured to extend in the y-axis direction, and a second notch part due to the second notch N2. When viewed on the x-y plane, the third edge E3 may include a third straight line part configured to extend in the x-axis direction, and a third notch part due to the third notch N3. When viewed on the x-y plane, the fourth edge E4 may include a fourth straight line part configured to extend in the y-axis direction, and a fourth notch part due to the fourth notch N4.

A first distance D1, in which the first straight line part of the first edge E1 and the third straight line part of the third edge E3 are spaced apart from each other in the y-axis direction, may be substantially the same as a second distance D2 in which the second straight line part of the second edge E2 and the fourth straight line part of the fourth edge E4 are spaced apart from each other in the x-axis direction. The first distance and the second distance may be different.

The second antenna element ② may be formed in substantially the same method as the first antenna element ①. When viewed from above the first surface 41A of the printed circuit board 41 (e.g., when viewed in the +z-axis direction, or when viewed on the x-y plane), the second antenna element ② may include a fifth edge E5, a sixth edge E6, a seventh edge E7, and an eighth edge E8. The fifth edge E5 may be positioned to be spaced apart from the seventh edge E7 in the +y-axis direction. The sixth edge E6 may be positioned to be spaced apart from the eighth edge E8 in the +x-axis direction. When viewed on the x-y plane, the second antenna element ② may include a fifth notch formed on the fifth edge E5, a sixth notch formed on the sixth edge E6, a seventh notch formed on the seventh edge E7, and an eighth notch formed on the eighth edge E8. When viewed on the x-y plane, the fifth edge E5 and the seventh edge E7 may be formed to be substantially symmetrical with reference to the second center (e.g., the center of symmetry) C2 of the second antenna element ②. When viewed on the x-y plane, the sixth edge E6 and the eighth edge E8 may be formed to be substantially symmetrical with reference to the second center C2 of the second antenna element ②.

The third antenna element ③ may be formed in substantially the same method as the first antenna element ①. When viewed from above the first surface 41A of the printed circuit board 41 (e.g., when viewed in the +z-axis direction, or when viewed on the x-y plane), the third antenna element ③ may include a ninth edge E9, a tenth edge E10, an eleventh edge E11, and a twelfth edge E12. The ninth edge E9 may be positioned to be spaced apart from the eleventh edge E11 in the +y-axis direction. The tenth edge E10 may be positioned to be spaced apart from the twelfth edge E12 in the +x-axis direction. When viewed on the x-y plane, the third antenna element ③ may include a ninth notch formed on the ninth edge E9, a tenth notch formed on the tenth edge E10, an eleventh notch formed on the eleventh edge E11, and a twelfth notch formed on the twelfth edge E12. When viewed on the x-y plane, the ninth edge E9 and the eleventh edge E11 may be formed to be substantially symmetrical with reference to the third center (e.g., the center of symmetry) C3 of the third antenna element ③. When viewed on the x-y plane, the tenth edge E10 and the twelfth edge E12 may be formed to be substantially symmetrical with reference to the third center C3 of the third antenna element ③.

Any two of the first antenna element ①, second antenna element ② and the third antenna element ③ may have different shapes which enable to resonate substantially in a usage frequency band (or an operation frequency band). For example, the shape of the multiple antenna elements ①, ②, and ③ may be determined in consideration of the resonance frequency band of the antenna structure 4. In the illustrated example, the first antenna element ① and the second antenna element ②, or the second antenna element ② and the third antenna element ③ may be configured to have different shapes which enable same to resonate substantially in a usage frequency band. In some embodiments, the first antenna element ①, the second antenna element ②, and the third antenna element ③ may be formed in substantially the same shape.

The multiple notches, which are included in the antenna element (e.g., the first antenna element ①, the second antenna element ②, or the third antenna element ③), may be configured to contribute such that the antenna element generates a dual band electromagnetic wave. For example, the first antenna element ①, the second antenna element ②, and the third antenna element a may be configured to substantially resonate in a first usage frequency (e.g., about 8 GHz) and a second usage frequency (e.g., 6.5 GHz). According to the shape of the antenna element (e.g., the first antenna element ①, the second antenna element ②, or the third antenna element ③), or the shape of the notch included in the antenna element, the resonant frequency band, in which the antenna element can transmit or receive a signal, may be changed.

The first antenna element ① may be formed in a shape in which the first notch N1 and the third notch N3 are not included, or a shape which the second notch N2 and the fourth notch N4 are not included. The second antenna element ② may be formed in a shape which the fifth notch formed on the fifth edge E5 and the seventh notch formed on the seventh edge E7 are not included, a shape which the sixth notch formed on the sixth edge E6 and the eighth notch formed on the eighth edge E8 are not included. The third antenna element ③ may be formed in a shape which the ninth notch formed on the ninth edge E9 and the eleventh notch formed on the eleventh edge E11 are not included, a shape which the tenth notch formed on the tenth edge E10 and the twelfth notch formed on the twelfth edge E12 are not included.

The antenna element (e.g., the first antenna element ①, the second antenna element ②, or the third antenna element ③) may be formed in a shape which a notch is not included. In this case, the first antenna 431, the second antenna 432, and the third antenna 433 may be configured to substantially resonate in one frequency (e.g., a first usage frequency (e.g., about 8 GHz) or a second usage frequency (e.g., about 6.5 GHz)).

The antenna element (e.g., the first antenna element ①, the second antenna element ②, or the third antenna element ③) is not limited to the illustrated example, and may be formed in various other shapes. For example, the antenna element may be formed in a circular, an elliptical, a polygonal, or a ring shape, and may include or may not include one or more notches.

The printed circuit board 41 may include a second conductive layer (not shown) including a ground plane or a ground layer. The second conductive layer may be positioned between the second surface 41A and the antenna element (e.g., the first antenna element ①, the second antenna element ②, or the third antenna element ③). For example, the second conductive layer may be positioned closer to the second surface 41B than to the first surface 41A of the printed circuit board 41. The ground plane may be configured to reduce electromagnetic influence (e.g., electromagnetic interference (EMI)) on a circuit (or a circuit pattern) included in the printed circuit board 41. For example, the ground plane may be configured to reduce the influence of an external electromagnetic noise (e.g., an electromagnetic noise applied to the antenna structure 4 from around the antenna structure 4) on a circuit included in the printed circuit board 41. The ground plane may be configured to reduce the influence of an electromagnetic field, which is generated when a current flows through a circuit included in the printed circuit board 41, on an electrical element around the printed circuit board 41. The ground plane may be configured to operate as an antenna ground for the first antenna 431, the second antenna 432, and the third antenna 433. The ground plane included in the antenna structure 4 may be electrically connected to, through the connector 42, a ground (e.g., a ground plane or a ground layer) included in a first substrate assembly positioned in the inner space of the first housing 21. The ground plane included in the antenna structure 4 may be electrically connected to a ground member (e.g., ground a plane) included in the first substrate assembly.

Figure 5:
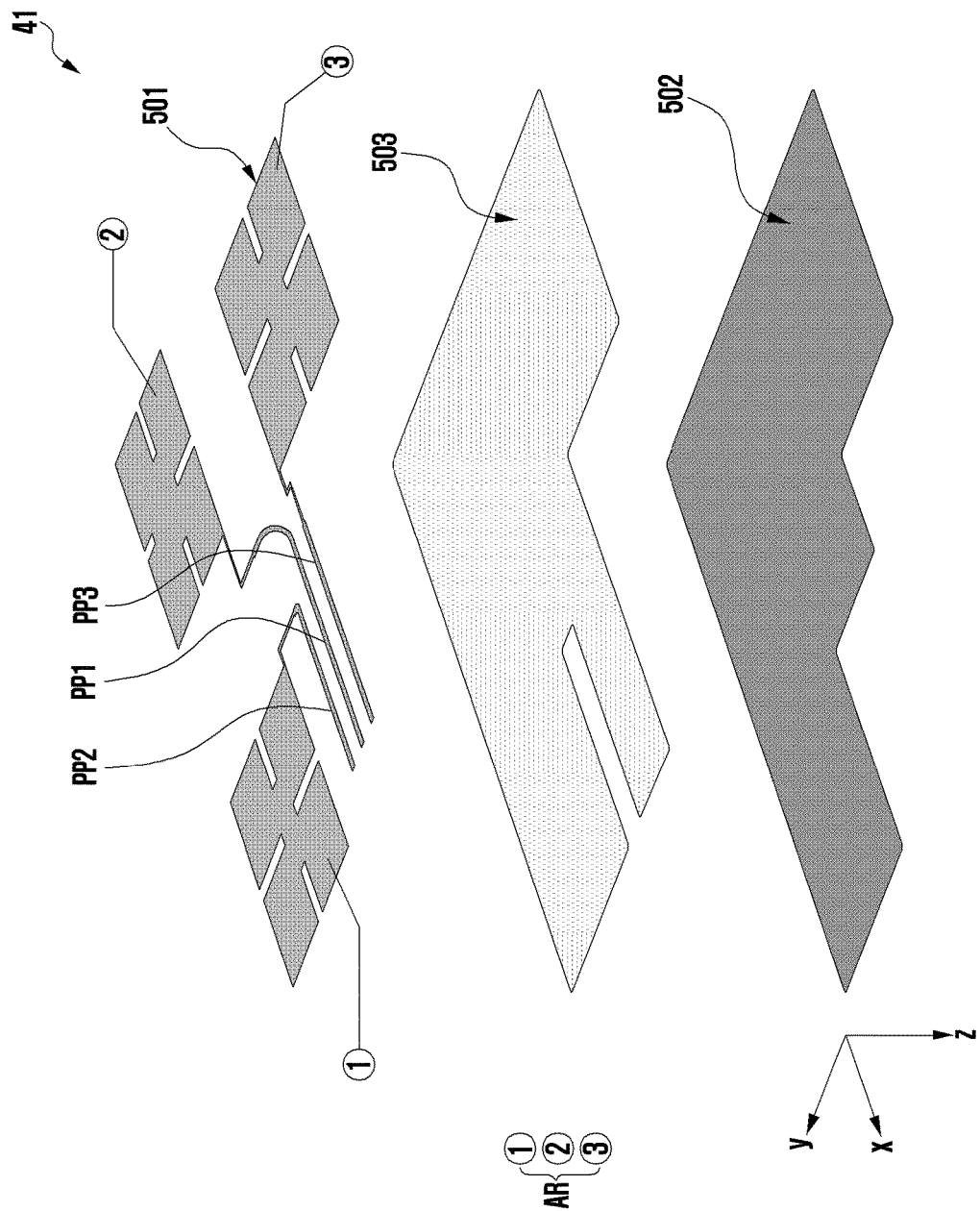
FIG. 5 is an exploded perspective view of a printed circuit board included in an antenna structure according to an embodiment of the disclosure.

FIG. 5 is an exploded perspective view of the printed circuit board 41 included in the antenna structure 4 according to an embodiment of the disclosure.

Figure 6:
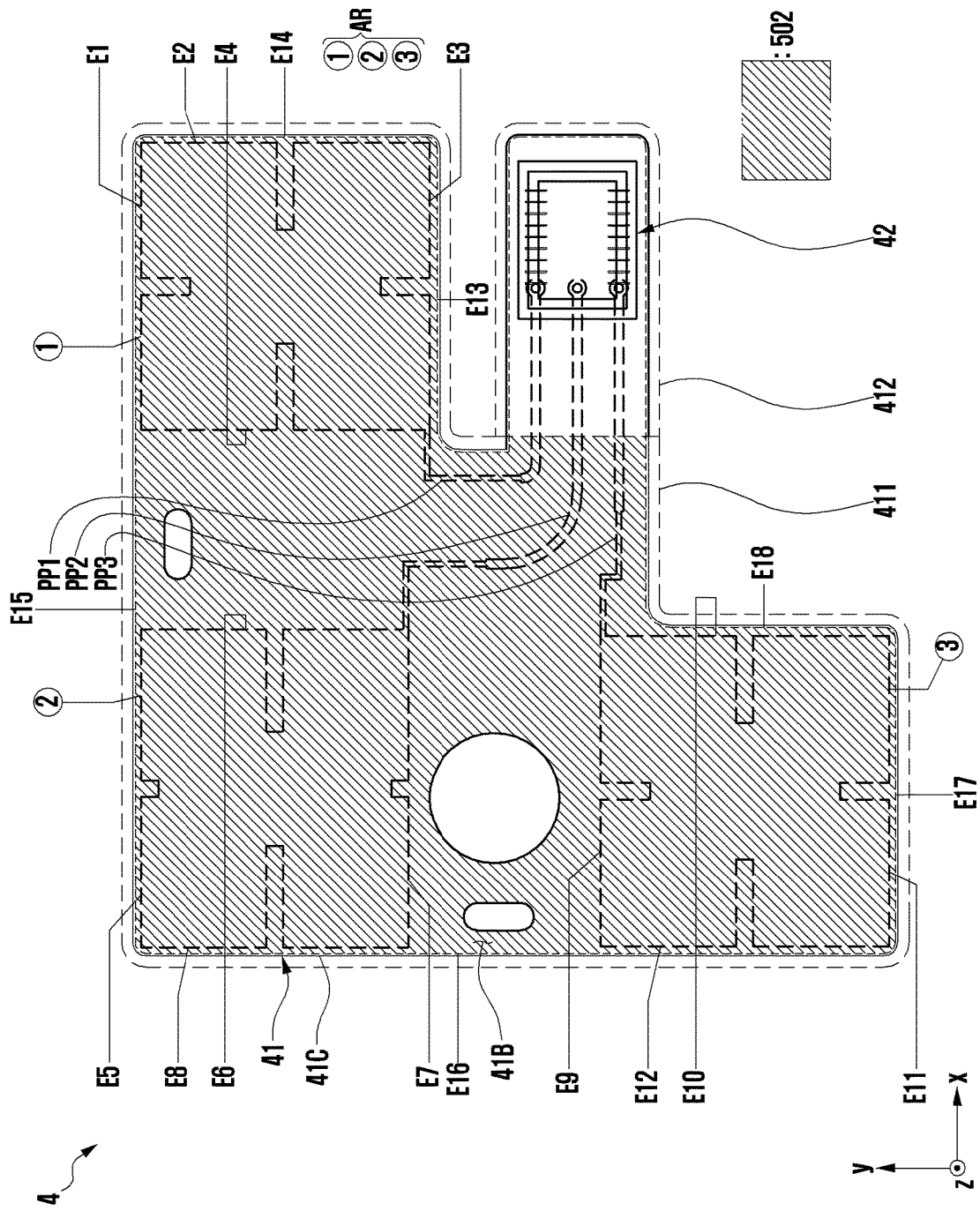
FIG. 6 is a diagram illustrating an antenna structure when viewed from above a first cover area of an electronic device according to an embodiment of the disclosure.

FIG. 6 is a diagram illustrating the antenna structure 4 when viewed from above the first cover area ⓐ (see FIG. 2) of the electronic device 2 (e.g., when viewed in the −z-axis direction) according to an embodiment of the disclosure.

Referring to FIGS. 5 and 6, the printed circuit board 41 may include a first conductive layer 501, a second conductive layer 502, and a dielectric (or a dielectric material layer) 503. The first conductive layer 501 may be positioned closer to the first surface 41A (see FIG. 4) of the printed circuit board 41 than to the second surface 41B (see FIG. 4) of the printed circuit board 41. For example, the first conductive layer 501 may include the first antenna element ①, the second antenna element ②, the third antenna element ③, the first path pattern PP1, the second path pattern PP2, and the third path pattern PP3. The second conductive 502 may be positioned closer to the second surface 41B than to the first surface 41A of the printed circuit board 41. The second conductive layer 502 may be configured to operate as a ground plane. The dielectric 503 may be positioned between the first conductive layer 501 and the second conductive layer 502. The printed circuit board 41 may be configured to operate as a patch antenna. The patch antenna may mean an antenna from including a dielectric substrate (e.g., the dielectric 503), one or more patches (e.g., the first antenna element ①, the second antenna element ②, and the third antenna element ③) arranged on one surface of the dielectric substrate, and a ground plane (e.g., the second conductive layer 502) disposed on the other surface of the dielectric substrate. When viewed from above the first surface 41A (see FIG. 4) of the printed circuit board 41 (e.g., when viewed in the +z-axis direction), the second conductive layer 502 may be configured to at least partially overlap the first conductive layer 501 and to operate as an antenna ground. When an emission current is provided (or fed) to the antenna structure 4, actual power emission may occur in the first antenna element ①, the second antenna element, and the third antenna element ③.

A first conductive area of the first conductive layer 501, which corresponds to a feeding pattern (e.g., the first feeding pattern PP1, the second feeding pattern PP2, or the third feeding pattern PP3), and a second conductive area of the second conductive layer 502, which corresponds a feeding pattern, may be configured to form a coplanar waveguide (CPW) configured to transmit a frequency signal (or an emission current). In this case, although not illustrated, the first conductive layer 501 may be implemented to include a ground pattern positioned around the feeding pattern. In some embodiments, the feeding pattern (e.g., the first feeding pattern PP1, the second feeding pattern PP2, or the third feeding pattern PP3) may be implemented as a micro-strip line.

Radiation characteristics (e.g., a resonance frequency and an impedance value) of the antenna structure 4 may be determined based on various conditions such as shapes and materials of elements included in the printed circuit board 41, and a relative position between the elements. For example, a resonant frequency and an impedance value thereof may be determined according to the shapes of the multiple antenna elements ①, ②, and ③, the thickness (e.g., the distance between the first conductive layer 501 and the second conductive layer 502) or the dielectric permittivity of the dielectric 503, and the thickness, the width, and the material of the conductive layer 502. Although not illustrated, the printed circuit board 41 may further include a first coverlay configured to form at least a part of the first surface 41A, or a second coverlay configured to form at least a part of the second surface 41B. The first coverlay or the second coverlay may be configured to perform a function for protecting a circuit (or a circuit pattern) included in the printed circuit board 41, and for example, may include an insulating layer or a non-conductive layer.

The second conductive layer 502 (e.g., a ground plane or an antenna ground) may be included in the first portion 411 of the printed circuit board 41. When viewed from above the second surface 41B (e.g., when viewed in the −z-axis direction), the second conductive layer 502 may be positioned to substantially overlap the entire circuit included in the first portion 411. For example, the circuit included in the first portion 411 may include a first antenna element ①, a second antenna element ②, a third antenna element ③, a part of the first path pattern PP1, a part of the second path pattern PP2, and a part of the third path pattern PP3. When viewed from above the second surface 41B, the second conductive layer 502 may be formed in various other forms, which are not limited to the illustrated example, at a level which enables antenna radiation performance to be secured. The second conductive layer 502 may be configured to expand to at least a part of the second portion 412. The second conductive layer 502 may be electrically connected to a ground plane included in the second portion 412 using a conductive via.

The first antenna element ① and the second antenna element ② may be positioned to be spaced apart from each other so as to have a degree of isolation of a designated value or a higher value at a level which enables antenna radiation performance to be secured. The second antenna element ②  and the third antenna element ③ may be positioned to be spaced apart from each other so as to have a degree of isolation of a designated value or a higher value at a level which enables antenna radiation performance to be secured. When viewed from above the first surface 41A (see FIG. 4), the first feeding pattern PP1, the second feeding pattern PP2, or the third feeding pattern PP3 may include a portion having a first width and a portion having a second width wider than the first width. For example, the portion having the first width may be a transformer line, and may be configured to contribute to adjusting the phase of an emission current. Phase adjustment using a transformer line may contribute to reducing interference between antenna elements. The first antenna element ①, the second antenna element ②, and the third antenna element ③ may be positioned adjacent to the edge 41C of the printed circuit board 41, and thus may be configured to contribute to securing isolation between antenna elements and to reducing the size of the printed circuit board 41. For example, when viewed from above the second surface 41B (e.g., when viewed in the −z-axis direction), the first portion 411 of the printed circuit board 41 may be in an 'L' shape corresponding to an antenna array AR disposed in an 'L' shape. When viewed from above the second surface 41B, the second conductive layer 502 (e.g., a ground plane) may include a thirteenth edge E13, a fourteenth edge E14, a fifteenth edge E15, a sixteenth edge E16, a seventeenth edge E17, and/or an eighteenth edge E18. The thirteenth edge E13 may be positioned to correspond to the third edge E3 of the first antenna element ①. When viewed from above the second surface 41B, the thirteenth edge E13 may be positioned to be spaced apart from the third edge E3 in the −y-axis direction. The fourteenth edge E14 may be positioned to correspond to the second edge E2 of the first antenna element ①. When viewed from above the second surface 41B, the fourteenth edge E14 may be positioned to be spaced apart from the second edge E2 in the +x-axis direction. The fifteenth edge E15 may be positioned to correspond to the first edge E1 of the first antenna element ① and the fifth edge E5 of the second antenna element ②. When viewed from above the second surface 41B, the fifteenth edge E15 may be positioned to be spaced apart from the first edge E1 and/or the fifth edge E5 in the +y-axis direction. The sixteenth edge E16 may be positioned to correspond to the eighth edge E8 of the second antenna element ② and the twelfth edge E12 of the third antenna element ③. When viewed from above the second surface 41B, the sixteenth edge E16 may be positioned to be spaced apart from the eighth edge E8 and/or the twelfth edge E12 in the −x-axis direction. The seventeenth edge E17 may be positioned to correspond to the eleventh edge E11 of the third antenna element ③. When viewed from above the second surface 41B, the seventeenth edge E17 may be positioned to be spaced apart from the eleventh edge E11 in the −y-axis direction. The eighteenth edge E18 may be positioned to correspond to the tenth edge E10 of the third antenna element ③. When viewed from above the second surface 41B, the eighteenth edge E18 may be positioned to be spaced apart from the tenth E10 in the +x-axis direction.

When an emission current (or an electromagnetic signal) (e.g., a UWB signal) is provided (or fed) to the antenna element (e.g., the first antenna element ①, the second antenna element ②, or the third antenna element ③), a distributed electromagnetic field (or, an electromagnetic wave, a radiation wave, or a radiant energy) may be formed around the antenna element. A part of the electromagnetic field may travel forward (e.g., in a direction to which the first surface 41A is directed) of the first surface 41A (see FIG. 4). The second conductive layer 502 (e.g., a ground plane or an antenna ground) may be configured to contribute such that energy can be substantially emitted in a direction to which the first surface 41A is directed. For example, the second conductive layer 502 may be configured to contribute such that beams, in which a relatively large amount of energy is emitted through the antenna element in a direction to which the first surface 41A is directed, are formed.

The second conductive layer 502 (e.g., a ground plane or an antenna ground) may be configured to reduce electromagnetic influence (e.g., electromagnetic interference (EMI)) on a circuit (or a circuit pattern) included in the printed circuit board 7, and thus to contribute to securing the radiation performance of the antenna structure 4. The second conductive layer 502 may be configured to shield or reduce electromagnetic noise in a signal or power flowing in the printed circuit board 41. The second conductive layer 502 may be configured to reduce the influence of an external electromagnetic noise (e.g., an electromagnetic noise applied to the antenna structure 4 from around the antenna structure 4) on a circuit included in the printed circuit board 41. The second conductive layer 502 may be configured to reduce the influence of an electromagnetic field, which is generated when a current flows through a circuit included in the printed circuit board 41, on an electrical element around the antenna structure 4.

Figure 7:
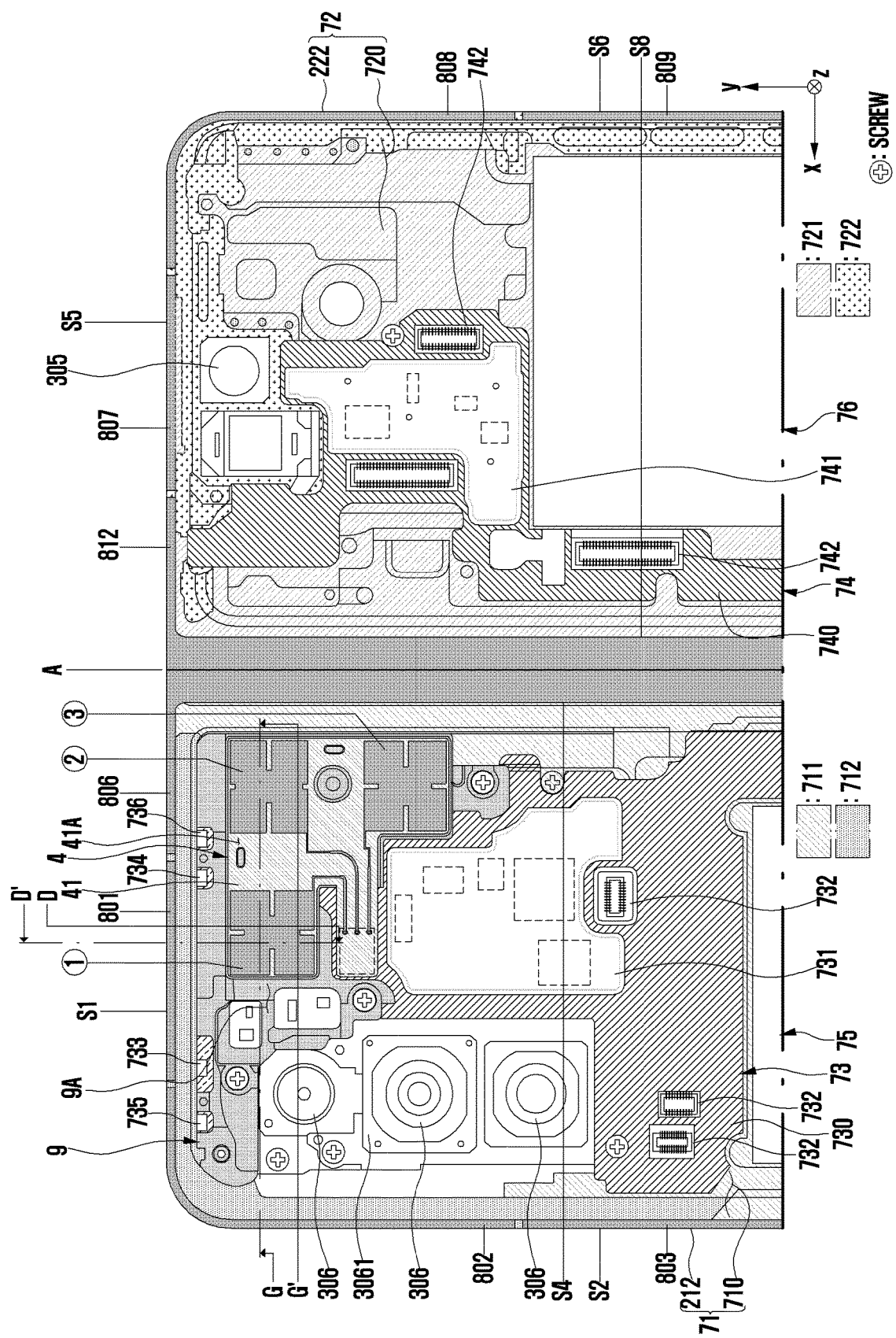
FIG. 7 is a diagram illustrating a part of an electronic device in an unfolded state when viewed from above the rear surface thereof according to an embodiment of the disclosure.

FIG. 7 is a diagram illustrating a part of the electronic device 2 in an unfolded state when viewed from above the rear surface 20B (see FIG. 2) (when viewed in the +z-axis direction) according to an embodiment of the disclosure.

Figure 8:
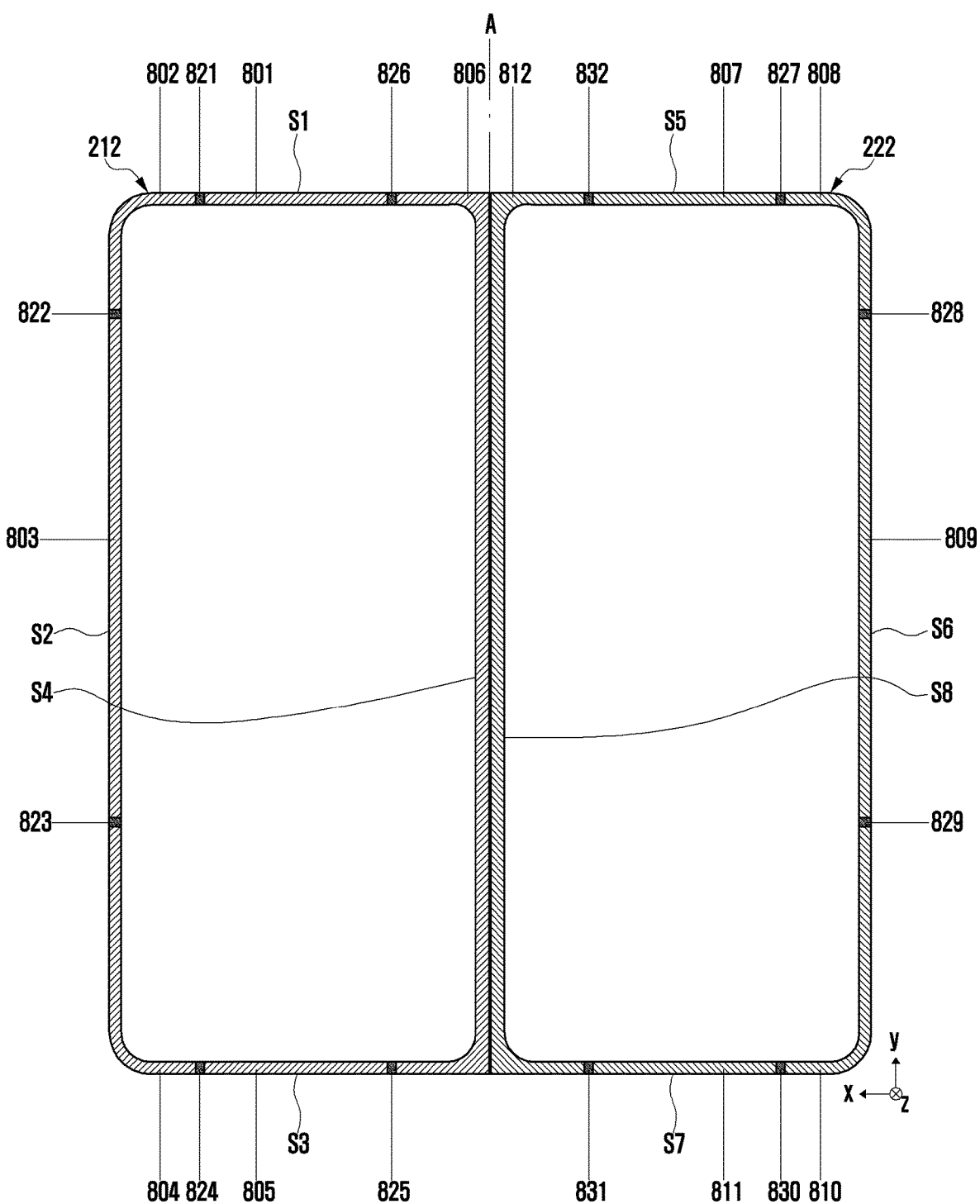
FIG. 8 is a diagram illustrating a first side member and a second side member of an electronic device in an unfolded state according to an embodiment of the disclosure.

FIG. 8 is a diagram illustrating the first side member 212 and the second side member 222 of an electronic device 2 in an unfolded state according to an embodiment of the disclosure.

Figure 9:
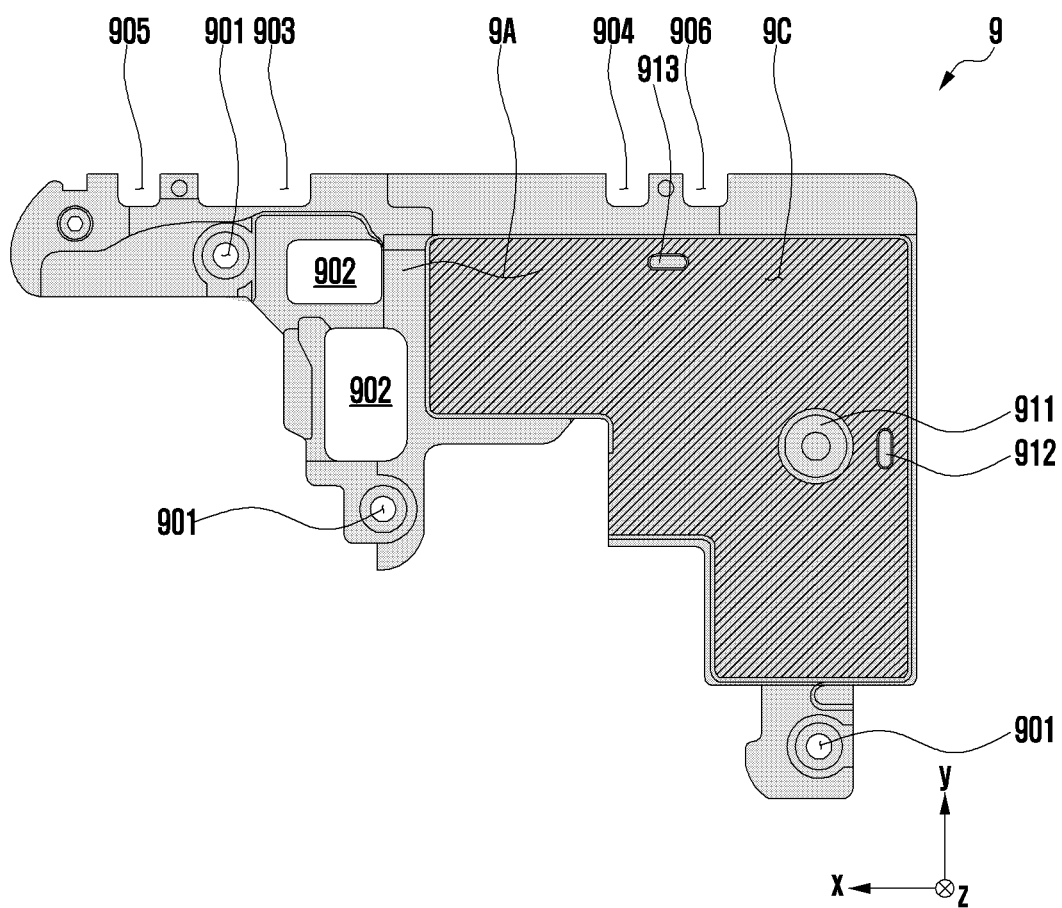
FIG. 9 is a diagram illustrating a third structure when viewed from above a third cover area of an electronic device according to an embodiment of the disclosure.

FIG. 9 is a diagram illustrating a third structure 9 when viewed from above the third cover area ⓒ (see FIG. 2) (e.g., when viewed in the +z-axis direction) of the electronic device 2 according to an embodiment of the disclosure.

Figure 10:
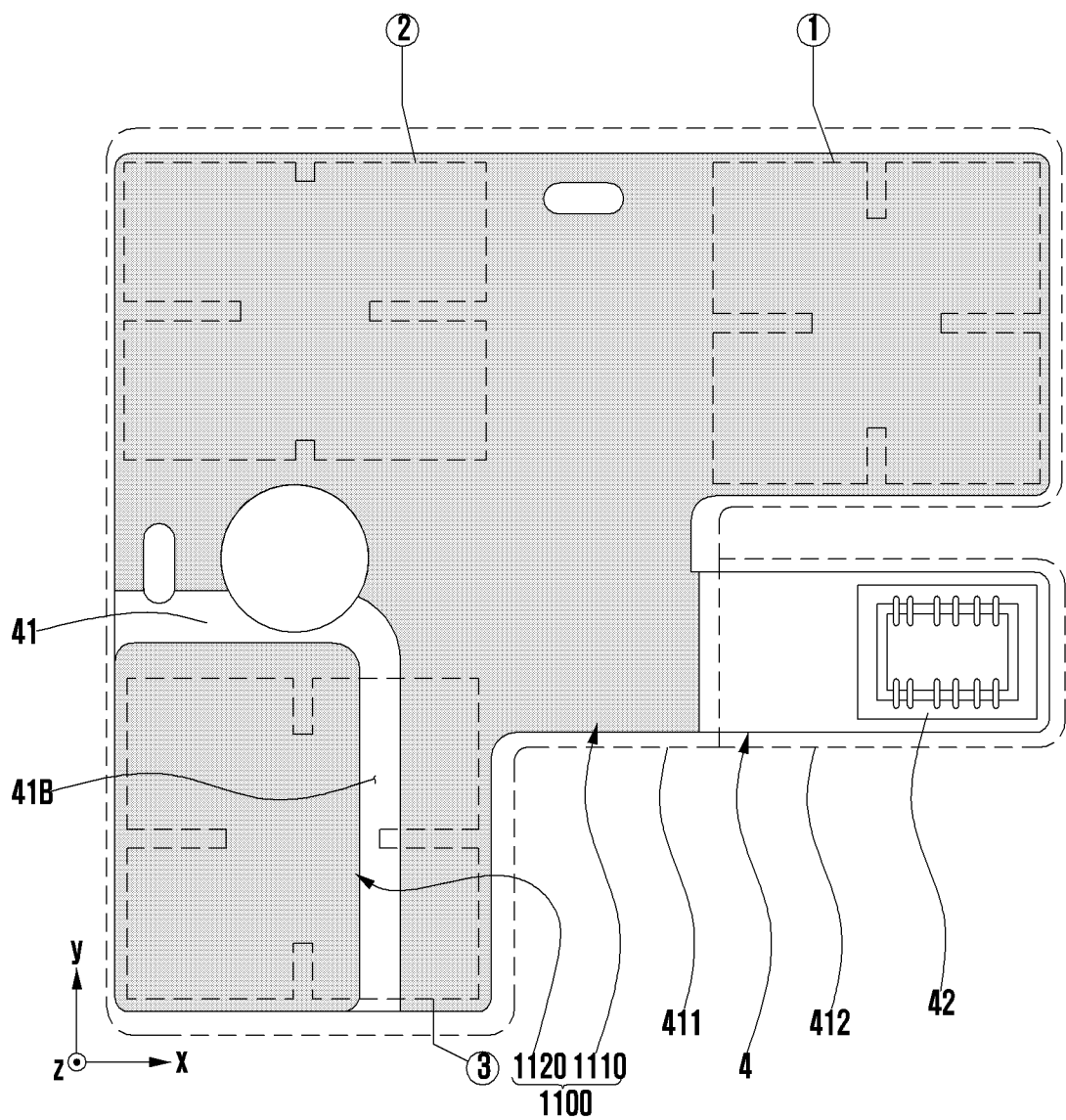
FIG. 10 is a diagram illustrating a state in which a conductive adhesive member is disposed on an antenna structure according to an embodiment of the disclosure.

FIG. 10 is a diagram illustrating a state in which a conductive adhesive member 1100 is disposed on the antenna structure 4 according to an embodiment of the disclosure.

Figure 11:
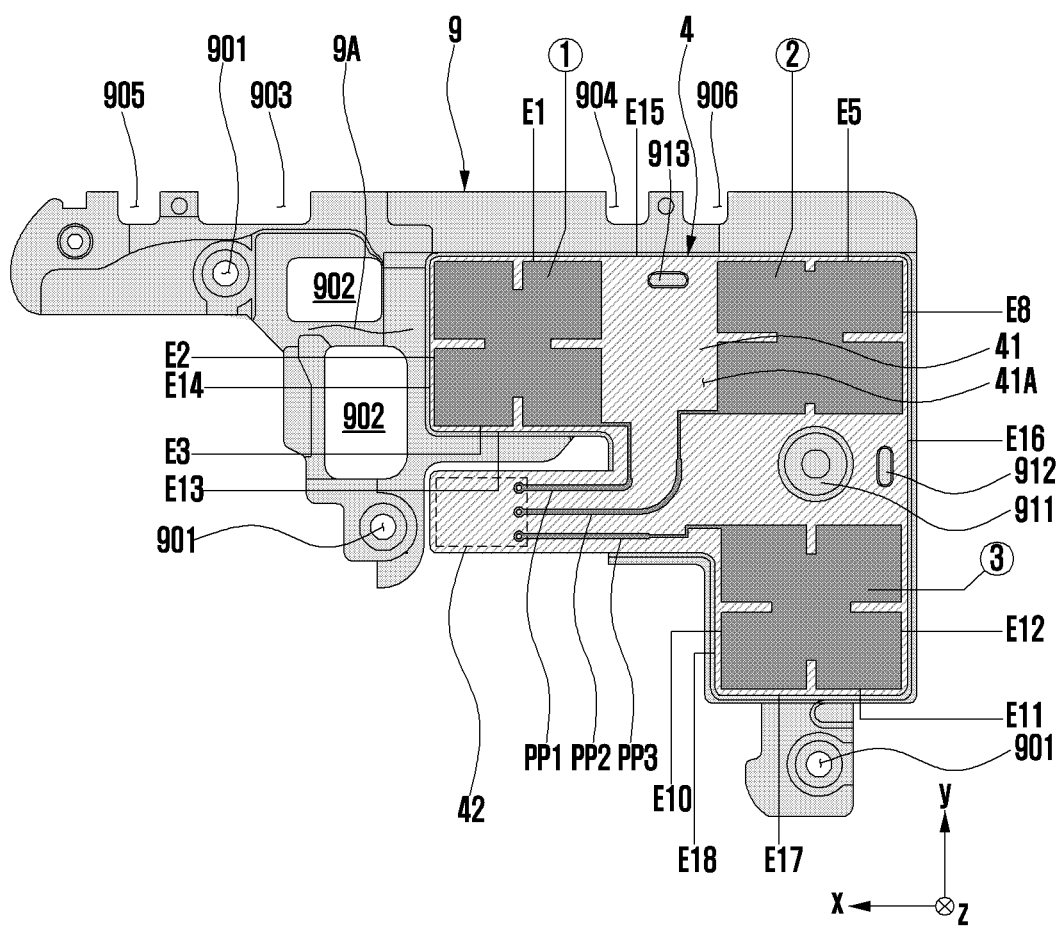
FIGS. 11 and 12 are diagrams illustrating states in which an antenna structure is coupled to a third support structure according to various embodiments of the disclosure.
Figure 12:
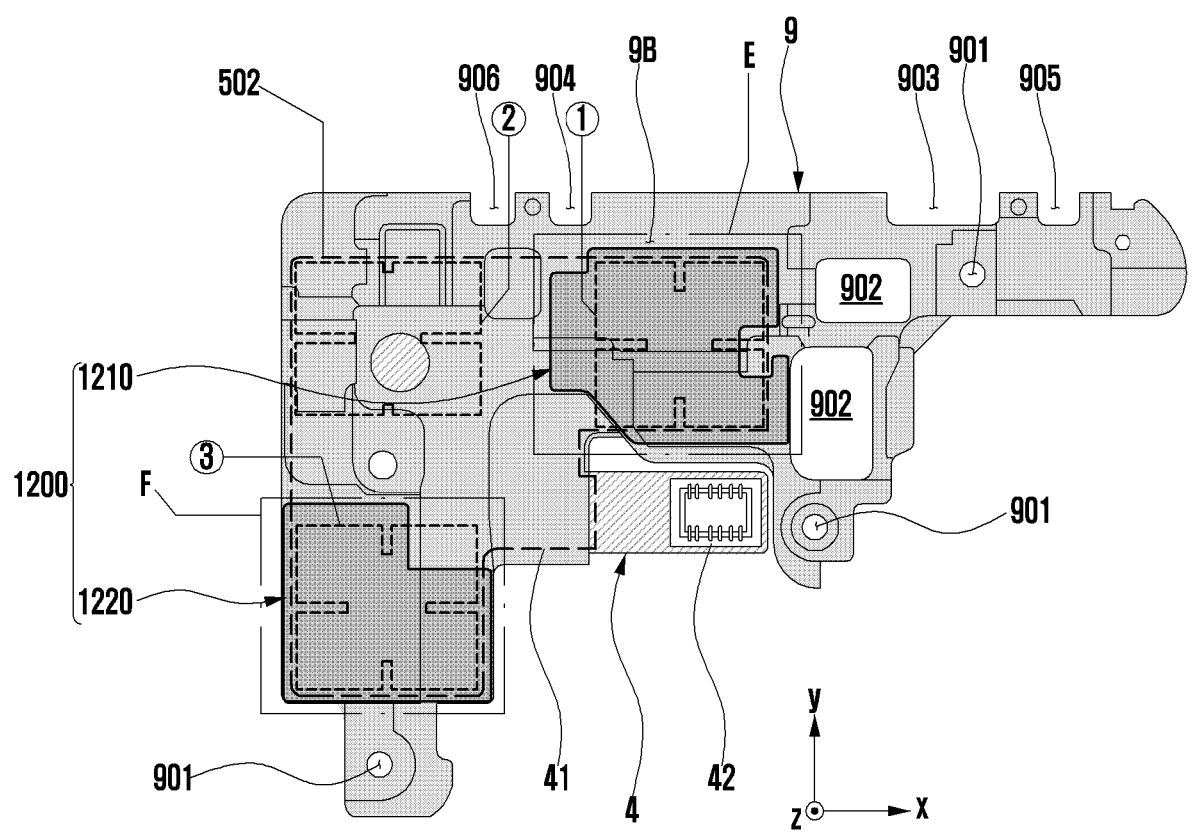

FIGS. 11 and 12 are diagrams illustrating states in which the antenna structure 4 is coupled to a third support structure 9 according to various embodiments of the disclosure.

Referring to FIG. 7, the electronic device 2 may include a first front case 71, a second front case 72, a first substrate assembly 73, a second substrate assembly 74, a first battery 75, a second battery 76, the antenna structure 4, a third support structure 9, the first camera module 305, and/or the multiple second camera modules 306. At least one of the elements may be omitted from the electronic device 2, or other elements may be additionally included therein.

The first front case 71 may include the first side member 212 and a first support structure 710. The first support structure 710 may be positioned in the inner space of the first housing 21 (see FIG. 2), and may be connected to the first side member 212 or formed integrally with the first side member 212. The second front case 72 may include the second side member 222 and a second support structure 720. The second support structure 720 may be positioned in the inner space of the second housing 22 (see FIG. 2), and may be connected to the second side member 222 or formed integrally with the second side member 222. One or more hinges may be configured to connect the first support structure 710 and the second support structure 720, and the first front case 71 and the second front case 72 may be configured to be mutually rotatable with reference to a rotation axis (e.g., the folding axis A) by the one or more hinges. The first support structure 710 and the second support structure 720 may be positioned in the electronic device 2 so as to withstand a load, thereby contributing to the durability or rigidity (e.g., torsional rigidity) of the electronic device 2. The first support structure 710 and/or the second support structure 720 may be formed of, for example, a metal material and/or a non-metal material (e.g., polymer). Electronic components (e.g., a part of the flexible display 30, the first substrate assembly 73, the first battery 75, or the multiple second camera modules 306), or various members associated with the electronic components, may be positioned in the first front case 71 or the first support structure 710, or may be supported by the first front case 71 or the first support structure 710.

Electronic components (e.g., a part of the flexible display 30, the second substrate assembly 74, the second battery 76, or the first camera modules 305), or various members associated with the electronic components, may be positioned in the second front case 72 or the second support structure 720, or may be supported by the second front case 72 or the second support structure 720. The first front case 71 or the first support structure 710 may be included in the first housing 21 of the foldable housing 20 (see FIG. 2) so as to withstand a load, thereby contributing to the durability or rigidity of the electronic device 2. The second front case 72 or the second support structure 720 may be included in the second housing 22 of the foldable housing 20 so as to withstand a load, thereby contributing to the durability or rigidity of the electronic device 2. The first front case 71 or the first support structure 710 may be referred to as various other terms such as a 'first frame', a 'first frame structure', or a 'first framework'. The second front case 72 or the second support structure 720 may be referred to as various other terms such as a 'second frame', a 'second frame structure', or 'second framework'. The first support structure 710 may be an internal structure positioned in the inner space of the electronic device 2 to correspond to the first housing 21, and may be referred to as various other terms such as a 'first bracket' or a 'first support member'. The second support structure 720 may be an internal structure positioned in the inner space of the electronic device 2 to correspond to the second housing 22, and in some embodiments, may be referred to as various other terms such as a 'second bracket' or a 'second support member'. The first support structure 710 may be interpreted as a part of the first housing 21, and the second support structure 720 may be interpreted as a part of the second housing 22.

Referring to FIGS. 7 and 8, the first side member 212 may include a first side part S1, a second side part S2, a third side part S3, and/or a fourth side part S4. The second side part S2 may be spaced apart from and be substantially parallel to the folding axis A. The fourth side part S4 may be substantially parallel to the folding axis A, and may be positioned closer to the folding axis A than the second side part S2. The first side part S1 may be configured to connect one end of the second side part S2 and one end of the fourth side part S4, and to be substantially perpendicular to the folding axis A. The third side part S3 may be configured to connect the other end of the second side part S2 and the other end of the fourth side part S4, and may be spaced apart from and be substantially parallel to the first side part S1. A corner part to which the first side part S1 and the second side part S2 of the first side member 212 are connected, or a corner part to which the second side part S2 and the third side part S3 of the first side member 212, may be formed in a round shape or a curved shape.

The first side member 212 may include a first conductive part 801, a second conductive part 802, a third conductive part 803, a fourth conductive part 804, a fifth conductive part 805, a sixth conductive part 806, a first insulating part 821, a second insulating part 822, a third insulating part 823, a fourth insulating part 824, a fifth insulating part 825, and/or a sixth insulating part 826. The first conductive part 801 may be configured to form a part of the first side part S1. The second conductive part 802 may include a corner to which the first side part S1 and the second side part S2 are connected, and may be configured to form a part of the first side part S1 and a part of the second side part S2. The third conductive part 803 may be configured to form a part of the second side part S2. The fourth conductive part 804 may include a corner to which the second side part S2 and the third side part S3 are connected, and may be configured to form a part of the second side part S2 and a part of the third side part S3. The fifth conductive part 805 may be configured to form a part of the third side part S3. The sixth conductive part 806 may include a corner to which the first side part S1 and the fourth side part S4 are connected, and a corner to which the third side part S3 and the fourth side part S4 are connected, and may be configured to form a part of the first side part S1, the fourth side part S4, and a part of the third side part S3.

The first insulating part 821 may be positioned between the first conductive part 801 and the second conductive part 802, and may be configured to form a part of the first side part S1. The second insulating part 822 may be positioned between the second conductive part 802 and the third conductive part 803, and may be configured to form a part of the second side part S2. The third insulating part 823 may be positioned between the third conductive part 803 and the fourth conductive part 804, and may be configured to form a part of the second side part S2. The fourth insulating part 824 may be positioned between the fourth conductive part 804 and the fifth conductive part 805, and may be configured to form a part of the third side part S3. The fifth insulating part 825 may be positioned between the fifth conductive part 805 and the sixth conductive part 806, and may be configured to form a part of the third side part S3. The sixth insulating part 826 may be positioned between the first conductive part 801 and the sixth conductive part 806, and may be configured to form a part of the first side part S1. The multiple conductive parts 801, 802, 803, 804, 805, and 806 included in the first side member 212 may be positioned to be spaced apart from each other by the multiple insulating parts 821, 822, 823, 824, 825, and 826 included in the first side member 212.

The first support structure 710 may include a first conductive area 711 including a metal material, and a first non-conductive area 712 which is coupled to the first conductive area 711 and includes a non-metal material. The first conductive part 801, the second conductive part 802, the third conductive part 803, the fourth conductive part 804, the fifth conductive part 805, or the sixth conductive part 806 may be formed integrally with the first conductive area 711, or may be connected to the first conductive area 711. The first insulating part 821, the second insulating part 822, the third insulating part 823, the fourth insulating part 824, fifth insulating part 825, or the sixth insulating part 826 may be formed integrally with the first non-conductive area 712, or connected to the first non-conductive area 712.

The second side member 222 may include a fifth side part S5, a sixth side part S6, a seventh side part S7, and/or an eighth side part S8. In a folded state (see FIG. 3) of the electronic device 2, the first side part S1 and the fifth side part S5, the second side part S2 and the sixth side part S6, the third side part S3 and the seventh side part S7, and the fourth side part S4 and the eighth side part S8 may be aligned with each other and thus may overlap each other. The second side member 222 may include a seventh conductive part 807, an eighth conductive part 808, a ninth conductive part 809, a tenth conductive part 810, an eleventh conductive part 811, a twelfth conductive part 812, a seventh insulating part 827, an eighth insulating part 828, a ninth insulating part 829, a tenth insulating part 830, and an eleventh insulating part 831, and/or a twelfth insulating part 832.

In a folded state of the electronic device 2, the first insulating part 821 and seventh insulating part 827, the second insulating part 822 and the eighth insulating part 828, the third insulating part 823 and the ninth insulating part 829, a fourth insulating part 824 and a tenth insulating part 830, the fifth insulating part 825 and the eleventh insulating part 831, and the sixth insulating part 826 and the twelfth insulating part 832 may be may be aligned with each other. In a folded state of the electronic device 2, the first conductive part 801 and the seventh conductive part 807, the second conductive part 802 and the eighth conductive part 808, the third conductive part 803 and the ninth conductive part 809, the fourth conductive part 804 and the tenth conductive part 810, the fifth conductive part 805 and the eleventh conductive part 811, and the sixth conductive part 806 and the twelfth conductive part 812 may be aligned with each other and thus overlap each other. For example, the multiple conductive parts 807, 808, 809, 810, 811, and 812 included in the second side member 222 may be positioned to be spaced apart from each other by the multiple insulating parts 827, 828, 829, 830, 831, and 832 included in the second side member 222.

The second support structure 720 may include a second conductive area 721 including a metal material, and a second non-conductive area 722 which is coupled to the second conductive area 721 and includes a non-metal material. The seventh conductive part 807, the eighth conductive part 808, the ninth conductive part 809, the tenth conductive part 810, the eleventh conductive part 811, or the twelfth conductive part 812 may be formed integrally with the second conductive area 721, or may be connected to the second conductive area 721. The seventh insulating part 827, the eighth insulating part 828, the ninth insulating 829, the tenth insulating part 830, the eleventh insulating part 831, or the twelfth insulating part 832 may be formed integrally with the second non-conductive area 722, or may be connected to the second non-conductive area 722. The shape or the number of the conductive part or the insulating part included in the first side member 212 is not limited to the illustrated example. In addition, in a folded state of the electronic device 2, the second side member 222 may be implemented to have the multiple conductive parts and the multiple insulating parts which are aligned with the multiple conductive parts and/or the multiple insulating parts of the first side member 212.

The electronic device 2 may be configured to transmit and/or receive a signal (e.g., a frequency signal) in a selected or a designated frequency band using at least one conductive part (e.g., the first conductive part 801, the second conductive part 802, the fourth conductive part 804, the fifth conductive part 805, or the sixth conductive part 806) included in the first side member 212. The electronic device 2 may be configured to transmit and/or receive a signal (e.g., a frequency signal) in a selected or a designated frequency band using at least one conductive part (e.g., the seventh conductive part 807, the eighth conductive part 808, the ninth conductive part 809, the tenth conductive part 810, the eleventh conductive part 811, or the twelfth conductive part 812) included in the second side member 222.

At least one conductive part included in the first side member 212 or at least one conductive part included in the second side member 222 may be electrically connected to a wireless communication circuit (e.g., the wireless communication module 192 in FIG. 1) included in the first substrate assembly 73 so as to operate as an antenna radiator. The wireless communication circuit may be configured to process a transmission signal or a reception signal in at least one selected or designated frequency band through at least one radiator. For example, the selected or designated frequency band may include at least one of a low band (LB) (about 600 MHz-about 1 GHz), a middle band (MB) (about 1 GHz-about 2.3 GHz), a high band (HB) (about 2.3 GHz-about 2.7 GHz), or an ultra-high band (UHB) (about 2.7 GHz-about 6 GHz). The designated frequency band may include various other frequency bands other than the above frequency bands. Although not illustrated, the electronic device 2 may include one or more other antenna radiators.

In a folded state (see FIG. 3) of the electronic device 2, a structure, in which the multiple insulating parts (e.g., the first insulating part 821, the second insulating part 822, the third insulating part 823, the fourth insulating part 824, the fifth insulating part 825, and the sixth insulating part 826) of the first side member 212 and the multiple insulating parts (e.g., the seventh insulating part 827, the eighth insulating part 828, the ninth insulating part 829, the tenth insulating part 830, the eleventh insulating part 831, and the twelfth insulating part 832) of the second side member 222 are correspondingly aligned, respectively, may be configured to reduce the degradation of the antenna radiation performance thereof when at least one conductive part included in the first side member 212 or at least one conductive part included in the second side member 222 is utilized as an antenna radiator.

A wireless communication circuit (e.g., the wireless communication module 192 in FIG. 1) or a processor (e.g., the processor 120 in FIG. 1) included in the first substrate assembly 73 may be configured to transmit or receive data through a MIMO technique using multiple antenna radiators in a communication mode using the corresponding frequency band thereof. The electronic device 2 may include a memory (e.g., the memory 130 in FIG. 1) electrically connected to a processor. The memory may be configured to store instructions which cause the processor to transmit or receive data through a MIMO technique by selectively using a multiple number of the multiple antenna radiators, based on a communication mode. For example, the MIMO technique may include a 'beamforming' scheme in which the phase information on each antenna radiator is adjusted so as to adjust the signal strength thereof according to the position angle between a base station (or a transmitter) and a user, thereby removing ambient interference and improving the performance thereof. The MIMO technique may include a 'diversity' scheme in which a distance between antenna radiators is formed in order to make the signals between antenna radiators independent, thereby improving the performance thereof. The MIMO technique may include a 'multiplexing' scheme in which a virtual auxiliary channel is formed between transmission/reception antenna radiators so as to transmit different data through each transmission antenna, thereby improving the transmission speed. A technique, in which a base station transmits different data through each transmission antenna and the electronic device 2 classifies the transmission data through appropriate signal processing, may be used. For example, according to a 4×4 MIMO technique, four antenna radiators may be used in each of a base station (or a transmitter) and an electronic device 2 (or a receiver).

The first support structure 710 may include a first support area configured to face the first cover area (a) (see FIG. 2), and a third support area configured to face the third cover area (c) (or the first rear cover 211) (see FIG. 2). A portion of the flexible display 30 (see FIG. 2), which corresponds to the first housing 21, may be positioned between the front cover 201 (see FIG. 2) and the first support area. A portion of the flexible display 30, which corresponds to the first housing 21, may be disposed in the first support area or may be supported by the first support area, using bonding including an adhesive member. Elements such as the first substrate assembly 73, the first battery 75, or the third support structure 9 may be arranged in the third support area using mechanical coupling such as screw fastening or snap-fit fastening (e.g., a hook and a hook fastening structure to which a hook is fastened), or bonding (or chemical coupling) including an adhesive member. For example, the multiple second camera modules 306 may be connected to the third support area using a camera bracket. A camera bracket, on which the multiple second camera modules 306 are positioned, may be disposed in the third support area using screw fastening. The first support area and the third support area may include a seating structure configured to allow elements to be stably positioned on the first support structure 710. For example, the seating structure may include a structure (e.g., a fitting structure or a recess structure) to which elements can be fitted.

The second support structure 720 may include a second support area configured to face the second cover area (b) (see FIG. 2), and a fourth support area configured to face the fourth cover area (d) (or the second rear cover 221) (see FIG. 2). A portion of the flexible display 30 (see FIG. 2), which corresponds to the second housing 22, may be positioned between the front cover 201 (see FIG. 2) and the second support area. For example, a portion of the flexible display 30, which corresponds to the first housing 21, may be disposed in the second support area or may be supported by the second support area, using bonding including an adhesive member. Elements such as the second substrate assembly 74, the second battery 76, or the first camera module 305 may be arranged in the fourth support area using mechanical coupling such as screw fastening or snap-fit fastening, or bonding including an adhesive member. The second support area and the fourth support area may include a seating structure configured to allow elements to be stably positioned on the second support structure 720. For example, the seating structure may include a structure (e.g., a fitting structure or a recess structure) to which elements can be fitted.

The first substrate assembly 73 may be disposed in the first support structure 710, and may include a first printed circuit board 730 (e.g., a printed circuit board (PCB) or a printed circuit board assembly (PBA)). The first substrate assembly 73 may include various electronic components electrically connected to the first printed circuit board 730. Electronic components positioned in the inner space of the first housing 21 (see FIG. 2) may be arranged on the first printed circuit board 730, or may be electrically connected to the first printed circuit board 730 through an electrical path such as a cable or an FPCB. The first substrate assembly 73 may include electronic components such as a processor (e.g., the processor 120 in FIG. 1) and a wireless communication circuit (e.g., the wireless communication module 192 in FIG. 1) which are arranged on the first printed circuit board 730, and an electromagnetic shield member 731 (e.g., a shield can) configured to cover the electronic components. Elements such as the multiple second camera modules 306 or the antenna structure 4 may be electrically connected to one or more connectors 732 arranged on the first printed circuit board 730 using an electrical path (e.g., an FPCB) (not shown). When viewed from above the third cover area (c) (or the first rear cover 211) (see FIG. 2) (e.g., when viewed in the +z-axis direction), the first printed circuit board 730, the multiple second camera modules 306, and the first battery 75 may be positioned on the first support structure 710 so as not to substantially overlap with one another.

The second substrate assembly 74 may be disposed on the second support structure 720, and may include a second printed circuit board 740 (e.g., a PCB or a PBA). The second substrate assembly 74 may include various electronic components electrically connected to the second printed circuit board 740. For example, electronic components positioned in the inner space of the second housing 22 (see FIG. 2) may be arranged on the second printed circuit board 740, or may be electrically connected to the second printed circuit board 740 through an electrical path such as a cable or an FPCB. The second substrate assembly 74 may include electronic components arranged on the second printed circuit board 740, and an electromagnetic shield member 741 (e.g., a shield can) configured to cover the electronic components. Elements such as the first camera module 305 or the sub-display 310 (see FIG. 2 or FIG. 3) may be electrically connected to one or more connectors 742 arranged on the second printed circuit board 740 using an electrical path (e.g., an FPCB) (not shown). The first printed circuit board 730 and the second printed circuit board 740 may be electrically connected to each other using a flexible electrical path (e.g., an FPCB) (not shown) which crosses a folding part between the first housing 21 (see FIG. 2) and the second housing 22 (see FIG. 2), and is positioned in the inner space of the electronic device 2. When viewed from above the fourth cover area (d) (or the second rear cover 221) (see FIG. 2) (e.g., when viewed in the +z-axis direction), the first printed circuit board 730, the first camera module 305, and the second battery 76 may be positioned on the second support structure 720 so as not to substantially overlap with one another.

The first substrate assembly 73 or the second substrate assembly 74 may include a primary PCB (or a main PCB or a master PCB), a secondary PCB (or a slave PCB) disposed to partially overlap the primary PCB, and/or an interposer substrate between the primary PCB and the secondary PCB. For example, the first printed circuit board 730 or the second printed circuit board 740 may be the primary PCB.

Referring to FIGS. 7, 9, 11, and 12, in an embodiment, the third support structure 9 may include a third surface 9A and a fourth surface 9B positioned at a side opposite to the third surface 9A. The third surface 9A may be configured to substantially face the third cover area (c) (or the first rear cover 211) (see FIG. 2) of the electronic device 2. The fourth surface 9B may be configured to substantially face the first support structure 710. The third support structure 9 may be coupled to the first support structure 710. When viewed from above the third surface 9A (e.g., when viewed in the +z-axis direction), the third support structure 9 may be configured to at least partially overlap the first printed circuit board 730. For example, when viewed from above the third surface 9A, the first printed circuit board 730, which is disposed on the first support structure 710, may include a first area configured to overlap the third support structure 9, and a second area configured not to overlap the third support structure 9. The first area of the first printed circuit board 730 may be positioned between the fourth surface 9B of the third support structure 9 and the first support structure 710. The third support structure 9 and the first area of the first printed circuit board 730 may be coupled to the first support structure 710 using screw fastening. In an embodiment, the fourth surface 9B of the third support structure 9 may include a recess (or a recess structure) or one or more openings 902 into which the first area of the first printed circuit board 731 or one or more electronic components positioned in the first area are inserted, and thus may be configured to contribute to slimness of the stacked structure including the first support structure 710, the first substrate assembly 73, and the third support structure 9. In an embodiment, when viewed from above the third cover area ⓒ (or the first rear cover 211) (see FIG. 2), the third support structure 9 may be configured not to overlap the multiple second camera modules 306.

A part of a camera bracket 3061 may be positioned between the fourth surface 9B of the third support structure 9 and the first support structure 710. A part of a camera bracket 3061, which is positioned between the fourth surface 9B of the third support structure 9 and the first support structure 710, and the third support structure (9), may be coupled to the first support structure 710 using screw fastening. The third support structure 9 may include multiple screw holes 901 corresponding to multiple screws.

The first substrate assembly 73 may include one or more flexible conductive members arranged on the first printed circuit board 730 so as to correspond to the first conductive part 801, the second conductive part 802, the third conductive part 803, the fourth conductive part 804, the fifth conductive part 805, or the sixth conductive part 806 which are included in the first side member 212. For example, the flexible conductive member may include a conductive clip (e.g., a conductive member including an elastic structure), a pogo pin, a spring, conductive PORON, a conductive rubber, a conductive tape, or a conductive connector. The first conductive part 801, the second conductive part 802, the third conductive part 803, the fourth conductive part 804, the fifth conductive part 805, or the sixth conductive part 806 may be electrically connected to the first printed circuit board 730 through at least one flexible conductive member so as to operate as an antenna radiator. The first conductive part 801, the second conductive part 802, the third conductive part 803, the fourth conductive part 804, the fifth conductive part 805, or the sixth conductive part 806 may be electrically connected to a ground plane included in first printed circuit board 730 through at least one flexible conductive member. In the illustrated example, the first conductive part 801 may be electrically connected to a wireless communication circuit disposed on the first printed circuit board 730 through one of a first flexible conductive member 733 and a second flexible conductive member 734, and may be electrically connected to a ground plane included in the first printed circuit board 730 through the other of the first flexible conductive member 733 and the second flexible conductive member 734. The third support structure 9 may include a first opening 903 which has a notch shape and is formed to correspond to the first flexible conductive member 733, and a second opening 904 which has a notch shape and is formed to correspond to the second flexible conductive member 734.

The third support structure 9 may include a third opening 905, which is formed to correspond to a third flexible conductive member 735 electrically connected to the second conductive part 802, in substantially the same manner as the first opening 903 or the second opening 904 positioned to correspond to the first conductive part 801. The third support structure 9 may include a fourth opening 906, which is formed to correspond to a fourth flexible conductive member 736 electrically connected to the sixth conductive part 806, in substantially the same manner as the first opening 903 or the second opening 904 positioned to correspond to the first conductive part 801.

The antenna structure 4 may be positioned on the third surface 9A of the third support structure 9. For example, the antenna structure 4 may be disposed on the third support structure 9 using bonding including an adhesive member (or an adhesive material).

FIG. 10 illustrates a state in which a conductive adhesive member 1100 (e.g., a first conductive adhesive member 1110 and a second conductive adhesive member 1120) is disposed on the second surface 41B of the antenna structure 4. The conductive adhesive member 1100 may be positioned between the second surface 41B of the antenna structure 4 and the third surface 9A of the third support structure 9, and the second surface 41B and the third surface 9A may be coupled by the conductive adhesive member 1100. The conductive adhesive member 1100 may have various forms such as a conductive double-sided tape. In the illustrated example, although a first conductive adhesive member 1110 and a second conductive adhesive member 1120 are presented, an integrated conductive adhesive member, which replaces the first and second adhesive members 1110 and 1120, may be positioned between the antenna structure 4 and the third support structure 9. The shape, the number, or the position of the conductive adhesive member, which is positioned between the antenna structure 4 and the third support structure 9, is not limited to the illustrated example.

The first portion 411 of the antenna structure 4 may be coupled to the third support structure 9. For example, the conductive adhesive member 1100 may be positioned between the third support structure 9 and the first portion 411 of the antenna structure 4. The second portion 412 of the antenna structure 4 may be positioned to face the first printed circuit board 730, and the connector 42, which is disposed on the second portion 412, may be electrically connected to a connector (not shown) disposed on the first printed circuit board 730.

The third surface 9A of the third support structure 9 may include a recess-shaped seating structure configured to allow the first portion 411 of the antenna structure 4 to be stably positioned on the third support structure 9. The recess-shaped seating structure may be configured to contribute to slimness of the stacked structure including the third support structure 9 and the antenna structure 4. A surface (hereinafter referred to as a 'seating surface') 9C of the seating structure, on which the first portion 411 of the antenna structure 4 is disposed, may be substantially a flat surface. For example, the seating surface 9C may be configured to substantially face the third cover area ⓒ (or the first rear cover 211) (see FIG. 2) (e.g., in the −z-axis direction) of the electronic device 2 substantially. The conductive adhesive member 1100 may be disposed on the seating surface 9C. The seating surface 9C having a flat shape may be configured to contribute such that the first portion 411 of the antenna structure 4 and a conductive pattern (e.g., the first antenna element ①, the second antenna element ②, the third antenna element ③, a part of the first path pattern PP1, a part of the second path pattern PP2, a part of the third path pattern PP3, or the second conductive layer 502 of FIG. 5 or FIG. 6) included in the first portion 411 are positioned in a substantially flat shape.

The third support structure 9 may include a non-metal material (e.g., polymer). The third support structure 9 may be referred to as various other terms, such as a 'non-conductive member', a 'non-metal member', a 'non-conductive structure', a 'non-metal structure', or a 'non-conductive support structure'. The third support structure 9 may be an internal structure positioned in the inner space of the electronic device 2 so as to correspond to the first housing 21, and may be referred to as various other terms, such as a 'third support member', an 'antenna support member', an 'antenna support structure', an 'antenna bracket', or a 'rear case'. The third support structure 9 may include one or more protrusions 911, 912, and 913 configured to protrude with respect to the third surface 9A. The antenna structure 4 may include one or more openings formed to correspond to the one or more protrusions 911, 912, and 913. When the antenna structure 4 is coupled to the third support structure 9, the one or more protrusions 911, 912, and 913 may be positioned through one or more openings of the antenna structure 4. For example, the one or more protrusions 911, 912, and 913 and one or more openings, which are formed through the antenna structure 4 so as to correspond thereto, may be configured to guide such that the antenna structure 4 is positioned in a designated area of the third support structure 9, or to contribute such that the antenna structure 4 is stably positioned on the third support structure 9.

Referring to FIG. 12, at least one conductive pattern 1200 (e.g., a first conductive pattern 1210 and a second conductive pattern 1220) may be disposed on the fourth surface 9B of the third support structure 9. The first conductive pattern 1210 and/or the second conductive pattern 1220 may be implemented by laser direct structuring (LDS). The LDS may be a method in which a pattern is drawn (designed) on the third support structure 9 using a laser and then a conductive material such as copper or nickel is plated thereon to form a conductive pattern. The first conductive pattern 1210 and/or the second conductive pattern 1220 may be arranged on the third support structure 9 using various other methods such as printing or coating without not being limited to the LDS. The first conductive pattern 1210 and/or the second conductive pattern 1220 may include a conductive sheet disposed on the third support structure 9, and in this case, a polymer adhesive material may be positioned between the conductive sheet and the third support structure 9. The first conductive pattern 1210 and/or the second conductive pattern 1220 may be implemented in the form of a flexible printed circuit board disposed on the third support structure 9, and in this case, a polymer adhesive material may be positioned between the flexible printed circuit board and the third support structure 9. The first conductive pattern 1210 and/or the second conductive pattern 1220 may include a conductive tape. The third support structure 9, which is coupled to the first conductive pattern 1210 and/or the second conductive pattern 1220, may be implemented using insert injection molding. Although it is presented an example in which the conductive pattern 1200 includes the first conductive pattern 1210 and the second conductive pattern 1220, it may not be limited thereto, and the conductive pattern 1200 may be formed as an integrated conductive pattern and be positioned on the third support structure 9. The shape, the number, or the position of the conductive pattern, which is positioned on the third support structure 9, is not limited to the illustrated example.

At least a part of the first conductive pattern 1210 and/or the second conductive pattern 1220 may be positioned inside the third support structure 9.

The third support structure 9 may be a form in which multiple non-conductive structures are coupled to each other. At least a part of the first conductive pattern 1210 and/or the second conductive pattern 1220 may be positioned between the multiple non-conductive structures.

The conductive adhesive member 1100, the first conductive pattern 1210, and the second conductive pattern 1220 may be configured to operate as a ground plane or an antenna ground for the antenna structure 4. For example, the conductive adhesive member 1100, the first conductive pattern 1210, and the second conductive pattern 1220 may be configured to contribute to expanding or strengthening the antenna ground for the antenna structure 4 without expansion of the ground plane (e.g., the second conductive layer 502 of FIG. 5 or FIG. 6) included in the antenna structure 4.

When viewed from above the first surface 41A of the antenna structure 4 (e.g., when viewed in the +z-axis direction), the first conductive pattern 1210 and the conductive adhesive member 1100 may be configured to overlap the first antenna element ① and the second conductive layer 502. When viewed from above the first surface 41A of the antenna structure 4, the first conductive pattern 1210 and the conductive adhesive member 1100 may be arranged to be expanded more than the second conductive layer 502, in at least one direction substantially perpendicular to a direction (e.g., the −z-axis direction) to which the first surface 41A is directed. For example, the conductive adhesive member 1100 and the first conductive pattern 1210 may be configured to expand or strengthen the antenna ground for the first antenna element ① compared to a comparative example not including the conductive adhesive member 1100 and the first conductive pattern 1210. The conductive adhesive member 1100 and/or the first conductive pattern 1210 may be configured to improve antenna radiation performance of the first antenna element ①. The conductive adhesive member 1100 and/or the first conductive pattern 1210 may be configured to reduce the electromagnetic influence (e.g., the electromagnetic interference (EMI)) of the electrical elements around the antenna structure 4 on the first antenna element ①. The conductive adhesive member 1100 and/or the first conductive pattern 1210 may be configured to reduce the electromagnetic influence of the first antenna element ① on the electrical element around the antenna structure 4. Hereinafter, what is referred to as a 'comparative example' may be presented merely for comparison with an embodiment of the document, and it does not have a prior status with respect to the various embodiments of the document.

When viewed from above the first surface 41A of the antenna structure 4 (e.g., when viewed in the +z-axis direction), the second conductive pattern 1220 and the conductive adhesive member 1100 may be configured to overlap the third antenna element ③ and the second conductive layer 502. When viewed from above the first surface 41A of the antenna structure 4, the second conductive pattern 1220 and the conductive adhesive member 1100 may be arranged to be expanded more than the second conductive layer 502, in at least one direction substantially perpendicular to a direction (e.g., the −z-axis direction) to which the first surface 41A is directed. The conductive adhesive member 1100 and/or the second conductive pattern 1220 may be configured to expand or strengthen the antenna ground for the third antenna element ③ compared to a comparative example not including the conductive adhesive member 1100 and the second conductive pattern 1220. The conductive adhesive member 1100 and/or the second conductive pattern 1220 may be configured to improve antenna radiation performance of the third antenna element ③. The conductive adhesive member 1100 and/or the second conductive pattern 1220 may be configured to reduce the electromagnetic influence (e.g., the electromagnetic interference (EMI)) of the electrical elements around the antenna structure 4 on the third antenna element ③. The conductive adhesive member 1100 and/or the second conductive pattern 1220 may be configured to reduce the electromagnetic influence of the third antenna element ③ on the electrical element around the antenna structure 4.

In the illustrated example, a conductive adhesive member and a conductive pattern, which is configured to contribute to expanding or strengthening the antenna ground for the second antenna element ②, may not be included therein. Without being limited thereto, in order to reduce the degradation of antenna radiation performance of the second antenna element ②, or to reduce the electromagnetic influence between the second antenna element ② and electrical elements around the antenna structure 4, a conductive adhesive member and a conductive pattern may be added.

Figure 13:
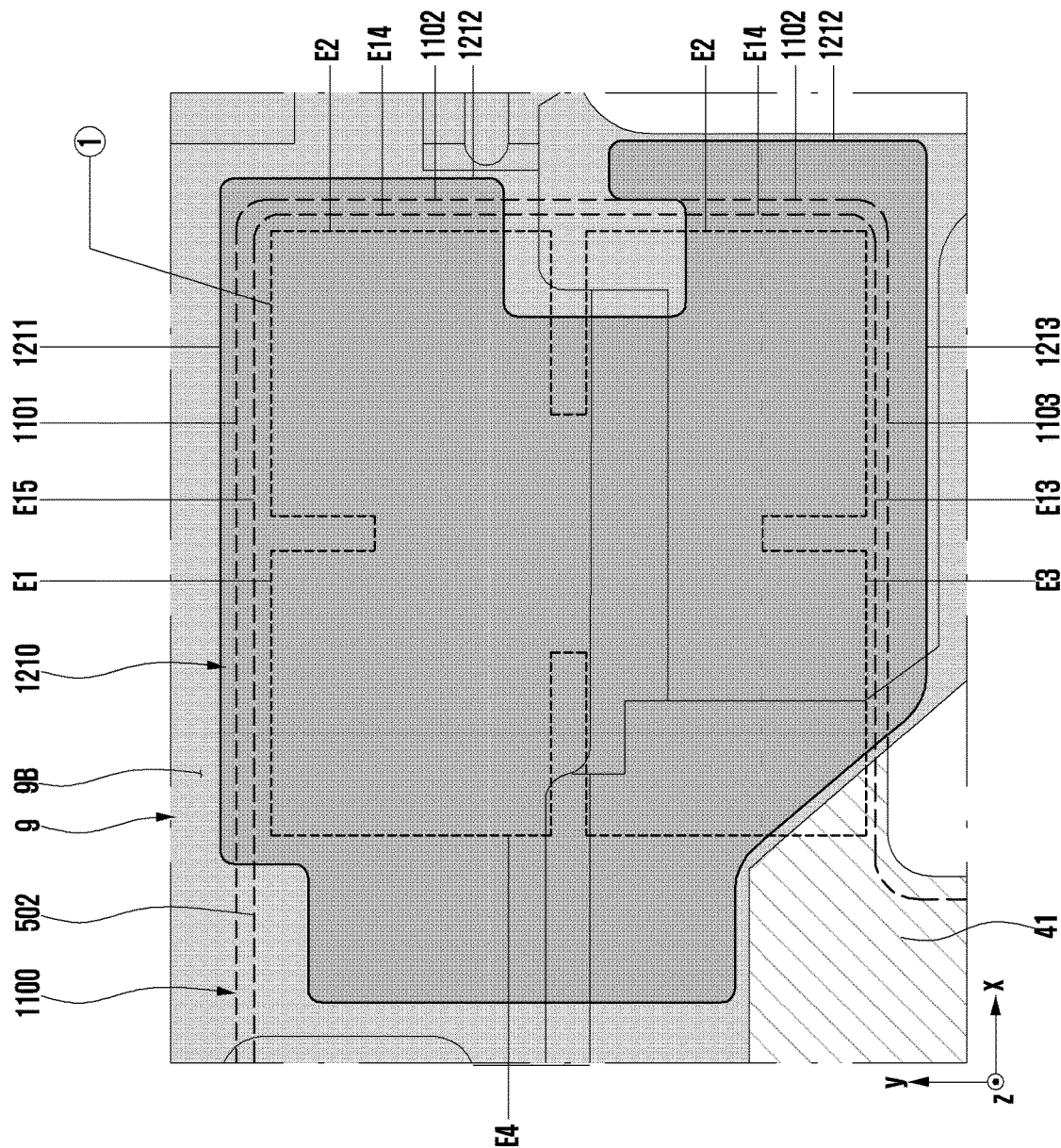
FIG. 13 is an enlarged view of the portion indicated by reference numeral 'E' in FIG. 12 according to an embodiment of the disclosure.

FIG. 13 is an enlarged view of the portion indicated by reference numeral 'E' in FIG. 12 according to an embodiment of the disclosure.

Figure 14:
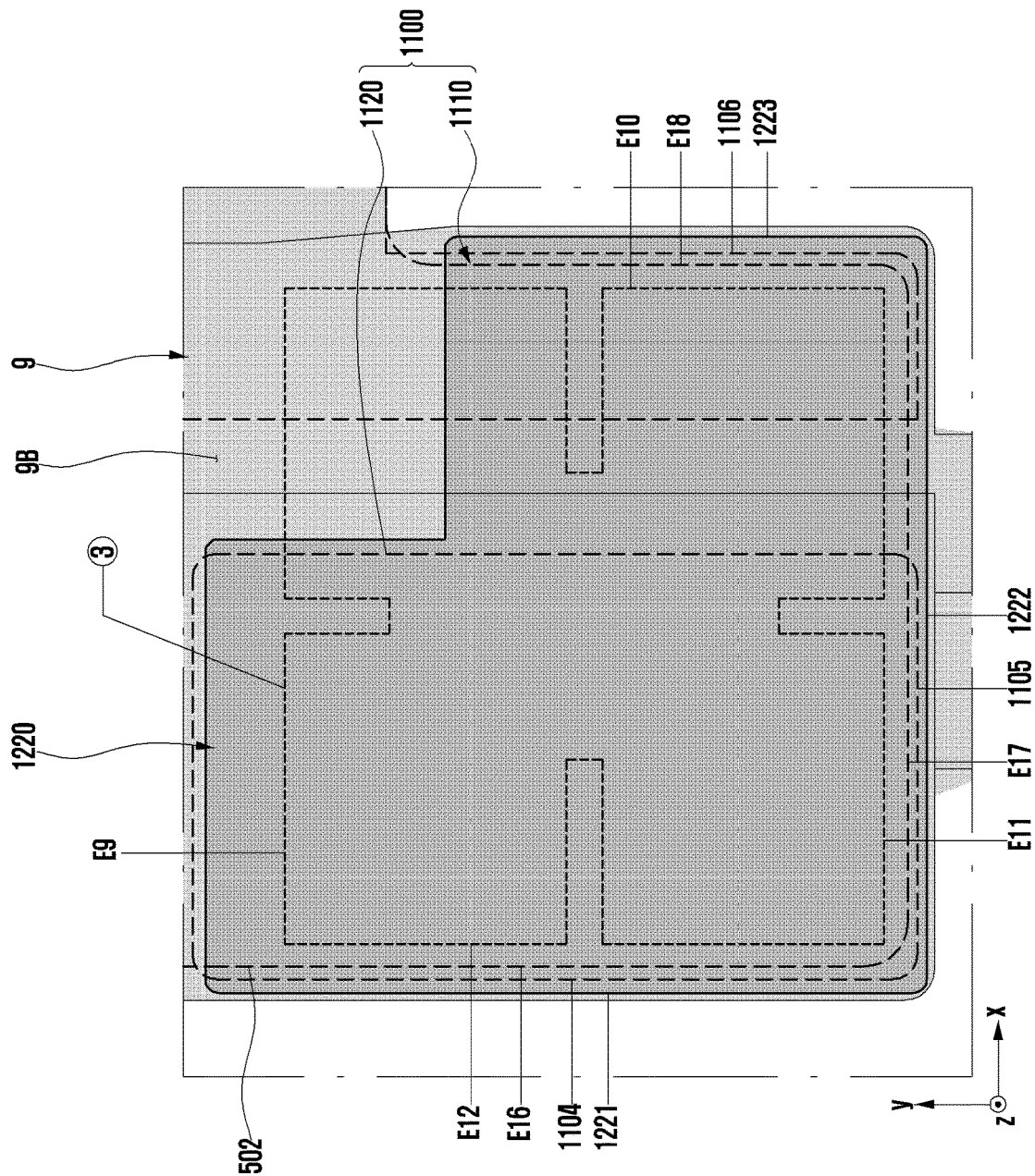
FIG. 14 is an enlarged view of the portion indicated by reference numeral 'F' in FIG. 12 according to an embodiment of the disclosure.

FIG. 14 is an enlarged view of the portion indicated by reference numeral 'F' in FIG. 12 according to an embodiment of the disclosure.

Referring to FIG. 13, when viewed from above the fourth surface 9B of the third support structure 9 (e.g., when viewed in the −z-axis direction), the conductive adhesive member 1100 may be formed to include an edge 1101 positioned to be spaced apart in the +y-axis direction with respect to the fifteenth edge E15 of the second conductive layer 502. The first conductive pattern 1210 may be formed to include an edge 1211 positioned to be spaced apart in the +y-axis direction with respect to the edge 1101 of the conductive adhesive member 1100, which corresponds to the first edge E1 of the first antenna element ①. When viewed from above the fourth surface 9B of the third support structure 9, the fifteenth edge E15 of the second conductive layer 502 may be positioned to be spaced apart in the +y-axis direction with respect to the first edge E1 of the first antenna element ①.

When viewed from above the fourth surface 9B of the third support structure 9 (e.g., when viewed in the −z-axis direction), the conductive adhesive member 1100 may be formed to include an edge 1102 positioned to be spaced apart in the +x-axis direction with respect to the fourteenth edge E14 of the second conductive layer 502. The first conductive pattern 1210 may be formed to include an edge 1212 positioned to be spaced apart in the +x-axis direction with respect to the edge 1102 of the conductive adhesive member 1100, which corresponds to the second edge E2 of the first antenna element ①. When viewed from above the fourth surface 9B of the third support structure 9, the fourteenth edge E14 of the second conductive layer 502 may be positioned to be spaced apart in the +x-axis direction with respect to the second edge E2 of the first antenna element ①.

When viewed from above the fourth surface 9B of the third support structure 9 (e.g., when viewed in the −z-axis direction), the conductive adhesive member 1100 may be formed to include an edge 1103 positioned to be spaced apart in the −y-axis direction with respect to the thirteenth edge E13 of the second conductive layer 502. The first conductive pattern 1210 may be formed to include an edge 1213 positioned to be spaced apart in the −y-axis direction with respect to the edge 1103 of the conductive adhesive member 1100, which corresponds to the third edge E3 of the first antenna element ①. When viewed from above the fourth surface 9B of the third support structure 9, the thirteenth edge E13 of the second conductive layer 502 may be positioned to be spaced apart in the −y-axis direction with respect to the third edge E3 of the first antenna element ①.

Referring to FIG. 14, when viewed from above the fourth surface 9B of the third support structure 9 (e.g., when viewed in the −z-axis direction), the conductive adhesive member 1100 may be formed to include an edge 1104 positioned to be spaced apart in the −x-axis direction with respect to the sixteenth edge E16 of the second conductive layer 502. In an embodiment, the second conductive pattern 1220 may be formed to include an edge 1221 positioned to be spaced apart in the −x-axis direction with respect to the edge 1104 of the conductive adhesive member 1100, which corresponds to the twelfth edge E12 of the third antenna element ③. When viewed from above the fourth surface 9B of the third support structure 9, the sixteenth edge E16 of the second conductive layer 502 may be positioned to be spaced apart in the −x-axis direction with respect to the twelfth edge E12 of the third antenna element ③.

When viewed from above the fourth surface 9B of the third support structure 9 (e.g., when viewed in the −z-axis direction), the conductive adhesive member 1100 may be formed to include an edge 1105 positioned to be spaced apart in the −y-axis direction with respect to the seventeenth edge E17 of the second conductive layer 502. The second conductive pattern 1220 may be formed to include an edge 1222 positioned to be spaced apart in the −y-axis direction with respect to the edge 1105 of the conductive adhesive member 1100, which corresponds to the eleventh edge E11 of the third antenna element ③. When viewed from above the fourth surface 9B of the third support structure 9, the seventeenth edge E17 of the second conductive layer 502 may be positioned to be spaced apart in the −y-axis direction with respect to the eleventh edge E11 of the third antenna element ③.

When viewed from above the fourth surface 9B of the third support structure 9 (e.g., when viewed in the −z-axis direction), the conductive adhesive member 1100 may be formed to include an edge 1106 positioned to be spaced apart in the +x-axis direction with respect to the eighteenth edge E18 of the second conductive layer 502. The second conductive pattern 1220 may be formed to include an edge 1223 positioned to be spaced apart in the +x-axis direction with respect to the edge 1106 of the conductive adhesive member 1100, which corresponds to the tenth edge E10 of the third antenna element ③. When viewed from above the fourth surface 9B of the third support structure 9, the eighteenth edge E18 of the second conductive layer 502 may be positioned to be spaced apart in the +x-axis direction with respect to the tenth edge E10 of the third antenna element ③.

In the case of a limited antenna design space (or an antenna mounting space) in the electronic device 2, there may be limitations in expanding the printed circuit board 41 included in the antenna structure 4 and the second conductive layer 502 included in the printed circuit board 41. According to an embodiment of the disclosure, the conductive adhesive member 1100, the first conductive pattern 1210, and the second conductive pattern 1220 may be configured to contribute to expanding or strengthening the antenna ground for the antenna structure 4 without expanding the second conductive layer 502.

When an emission current (or an electromagnetic signal) (e.g., a UWB signal) is provided (or fed) to the first antenna element ①, a distributed electromagnetic field (an electric field and a magnetic field) may be formed around the first antenna element ①. A part of the electromagnetic field, which is formed by the first antenna element ①, may travel forward (e.g., in a direction to which the first surface 41A is directed) of the first surface 41A (see FIG. 11) of the antenna structure 4. The conductive adhesive member 1100 and/or the first conductive pattern 1210 may be configured to expand or strengthen the antenna ground for the first antenna element ① compared to a comparative example not including the conductive adhesive member 1100 and the first conductive pattern 1210. The conductive adhesive member 1100 and/or the first conductive pattern 1210 may be configured to improve antenna radiation performance of the first antenna element ①. For example, the conductive adhesive member 1100 and/or the first conductive pattern 1210 may be configured to contribute such that energy is emitted from the first antenna element ① in a direction to which the first surface 41A of the antenna structure 4 is directed. The conductive adhesive member 1100 and/or the first conductive pattern 1210 may be configured to contribute such that beams, in which a relatively large amount of energy is emitted through the first antenna element ① in a direction to which the first surface 41A is directed, are formed. The conductive adhesive member 1100 and/or the first conductive pattern 1210 may be configured to reduce the electromagnetic influence (e.g., the electromagnetic interference (EMI)) of the electrical elements around the antenna structure 4 on the first antenna element ①. The conductive adhesive member 1100 and/or the first conductive pattern 1210 may be configured to shield electromagnetic noise in signal flow or power flow with respect to the first antenna element ① so as to reduce the loss thereof. The conductive adhesive member 1100 and/or the first conductive pattern 1210 may be configured to reduce the electromagnetic influence of the first antenna element ① on the electrical element around the antenna structure 4.

When an emission current is provided (or fed) to the first antenna element ①, an electromagnetic wave may be substantially emitted from the edge (e.g., the first edge E1, the second edge E2, the third edge E3, and the fourth edge E4) of the first antenna element ①. The conductive adhesive member 1100 and/or the first conductive pattern 1210 may be configured to contribute such that the electromagnetic wave emitted from the edge of the first antenna element ① travels in a direction to which the first surface 41A (see FIG. 11) of the antenna structure 4 is directed. Since the first edge E1, the second edge E2, and the third edge E3 are positioned adjacent to the edge of the printed circuit board 41 compared to the fourth edge E4, an antenna ground area of the second conductive layer 502, which corresponds to the first edge E1, the second edge E2, and the third edge E3, may be configured to be smaller than an antenna ground area of the second conductive layer 502, which corresponds to the fourth edge E4. An antenna ground area, which corresponds to the first edge E1, the second edge E2, or the third edge E3, may be configured to be expanded or strengthened using the conductive adhesive member 1100 and/or a first conductive pattern 1210 without expansion of the second conductive layer 502. For example, the conductive adhesive member 1100 and the first conductive pattern 1210 may be configured to substantially contribute such that electromagnetic waves emitted from the first edge E1, the second edge E2, and third edge E3 of the first antenna element ①, which are positioned adjacent to the edge of the printed circuit board 41, travel in a direction to which the first surface 41A of the antenna structure 4 is directed.

The conductive adhesive member 1100 and the first conductive pattern 1210 may be configured to reduce the influence (e.g., an electromagnetic interference (EMI)) of electrical elements around the antenna structure 4 on electromagnetic waves emitted from the edge of the first antenna element ①. The conductive adhesive member 1100 and the first conductive pattern 1210 may be configured to reduce the influence of electromagnetic waves emitted from the edge of the first antenna element ① on the electrical element around the first antenna element ①.

A conductive part (e.g., the first conductive part 801, the second conductive part 802, or the sixth conductive part 806), which is at least partially positioned on the first side part S1 corresponding to the first edge E1 of the first antenna element ①, may be configured to operate as an antenna radiator. For example, in order to improve the antenna radiation performance of the first antenna element ①, there may be a comparative example in which the fifteenth edge E15 of the second conductive layer 502, which corresponds to the first edge E1 of the first antenna element ①, is expanded in the +y-axis direction. In the case of the comparative example, since the second conductive layer 502 becomes close to the first conductive part 801, the second conductive part 802, or the sixth conductive part 806, antenna radiation performance of an antenna using the first conductive part 801, the second conductive part 802, or the sixth conductive part 806 as an antenna radiator may be reduced. Compared to the comparative example, the conductive adhesive member 1100 and the first conductive pattern 1210 may be configured to reduce the degradation of antenna radiation performance of an antenna using the first conductive part 801, the second conductive part 802, or the sixth conductive part 806 as an antenna radiator while expanding or strengthening the antenna ground for the first antenna element ① without expansion of the second conductive layer 502.

When an emission current (or an electromagnetic signal) (e.g., a UWB signal) is provided (or fed) to the third antenna element ③, a distributed electromagnetic field (an electric field and a magnetic field) may be formed around the third antenna element ③. A part of the electromagnetic field formed by the third antenna element ③ may travel forward (e.g., in a direction to which the first surface 41A is directed) of the first surface 41A (see FIG. 11) of the antenna structure 4. The conductive adhesive member 1100 and the second conductive pattern 1220 may be configured to expand or strengthen the antenna ground for the third antenna element ③ compared to a comparative example not including the conductive adhesive member 1100 and the second conductive pattern 1220. The conductive adhesive member 1100 and the second conductive pattern 1220 may be configured to improve antenna radiation performance of the third antenna element ③. The conductive adhesive member 1100 and/or the second conductive pattern 1220 may be configured to contribute such that energy is emitted from the third antenna element ③ in a direction to which the first surface 41A of the antenna structure 4 is directed. The conductive adhesive member 1100 and the second conductive pattern 1220 may be configured to contribute such that beams, in which a relatively large amount of energy is emitted through the third antenna element ③ in a direction to which the first surface 41A is directed, are formed. The conductive adhesive member 1100 and the second conductive pattern 1220 may be configured to reduce the electromagnetic influence (e.g., the electromagnetic interference (EMI)) of the electrical elements around the antenna structure 4 on the third antenna element ③. The conductive adhesive member 1100 and the second conductive pattern 1220 may be configured to shield electromagnetic noise in signal flow or power flow with respect to the third antenna element ③ so as to reduce the loss thereof. The conductive adhesive member 1100 and the second conductive pattern 1220 may be configured to reduce the electromagnetic influence of the third antenna element ③ on the electrical element around the antenna structure 4.

When an emission current is provided (or fed) to the third antenna element ③, an electromagnetic wave may be substantially emitted from the edge (e.g., the ninth edge E9, the tenth edge E10, the eleventh edge E11, and the twelfth edge E12) of the third antenna element ③. The conductive adhesive member 1100 and the second conductive pattern 1220 may be configured to contribute such that the electromagnetic wave emitted from the edge of the third antenna element ③ travels in a direction to which the first surface 41A (see FIG. 11) of the antenna structure 4 is directed. Since the tenth edge E10, the eleventh edge E11, and the twelfth edge E12 are positioned adjacent to the edge of the printed circuit board 41 compared to the ninth edge E9, an antenna ground area of the second conductive layer 502, which corresponds to the tenth edge E10, the eleventh edge E11, and the twelfth edge E12, may be configured to be smaller than an antenna ground area of the second conductive layer 502, which corresponds to the ninth edge E9. An antenna ground area, which corresponds to the tenth edge E10, the eleventh edge E11, or the twelfth edge E12, may be configured to be expanded or strengthened using the conductive adhesive member 1100 and/or a first conductive pattern 1210 without expansion of the second conductive layer 502. For example, the conductive adhesive member 1100 and/or the first conductive pattern 1210 may be configured to substantially contribute such that an electromagnetic wave emitted from the tenth edge E10, the eleventh edge E11, and the twelfth edge E12 of the third antenna element ③, which are positioned adjacent to the edge of the printed circuit board 41, travels in a direction to which the first surface 41A of the antenna structure 4 is directed. The conductive adhesive member 1100 and/or the second conductive pattern 1220 may be configured to reduce the influence (e.g., an electromagnetic interference (EMI)) of electrical elements around the antenna structure 4 on electromagnetic waves emitted from the edge of the third antenna element ③. The conductive adhesive member 1100 and the second conductive pattern 1220 may be configured to the influence of electromagnetic waves emitted from the edge of the third antenna element ③ on the electrical element around the third antenna element ③.

When an emission current (or an electromagnetic signal) (e.g., a UWB signal) is provided (or fed) to the second antenna element ② (see FIG. 11), a distributed electromagnetic field (an electric field and a magnetic field) may be formed around the second antenna element ②. A part of the electromagnetic field formed by the second antenna element ② may travel forward (e.g., in a direction to which the first surface 41A is directed) of the first surface 41A (see FIG. 11) of the antenna structure 4. The conductive adhesive member 1100 may be configured to expand or strengthen the antenna ground for the second antenna element ② compared to a comparative example not including the conductive adhesive member 1100. The conductive adhesive member 1100 may be configured to improve antenna radiation performance of the second antenna element ②. The conductive adhesive member 1100 may be configured to contribute such that energy is emitted from the second antenna element ② in a direction to which the first surface 41A of the antenna structure 4 is directed. The conductive adhesive member 1100 may be configured to contribute such that beams, in which a relatively large amount of energy is emitted through the second antenna element ② in a direction to which the first surface 41A is directed, are formed. The conductive adhesive member 1100 may be configured to reduce the electromagnetic influence (e.g., electromagnetic interference (EMI)) of the electrical elements around the antenna structure 4 on the second antenna element ②. The conductive adhesive member 1100 may be configured to shield electromagnetic noise in signal flow or power flow with respect to the second antenna element ② so as to reduce the loss thereof. The conductive adhesive member 1100 may be configured to reduce the electromagnetic influence of the second antenna element ② on the electrical element around the antenna structure 4.

When an emission current is provided (or fed) to the second antenna element ② (see FIG. 11), an electromagnetic wave may be substantially emitted from the edge (e.g., the fifth edge E5, the sixth edge E6, the seventh edge E7, and the eighth edge E8 in FIG. 6) of the second antenna element ②. The conductive adhesive member 1100 may be configured to contribute such that the electromagnetic wave emitted from the edge of the second antenna element ② travels in a direction to which the first surface 41A (see FIG. 11) of the antenna structure 4 is directed. The conductive adhesive member 1100 may be configured to reduce the influence (e.g., an electromagnetic interference (EMI)) of the electrical elements around the antenna structure 4 on the electromagnetic wave emitted from the edge of the second antenna element ②. The conductive adhesive member 1100 may be configured to reduce the influence of electromagnetic waves emitted from the edge of the second antenna element ② on the electrical element around the second antenna element ②. Although not illustrated, in order to expand or strengthen the antenna ground for the second antenna element ②, a third conductive pattern, which is positioned on the third support structure 9, may be added.

The conductive pattern 1200 (e.g., the first conductive pattern 1210 or the second conductive pattern 1220), which is disposed on the conductive adhesive member 1100 or the third support structure 9, may be referred to as various other terms such as a 'conductive layer', a 'metal layer', a 'ground layer', or a 'ground plane'.

The conductive pattern 1200 (e.g., the first conductive pattern 1210 or the second conductive pattern 1220), which is disposed on the conductive adhesive member 1100 or the third support structure 9, may be in a floating state in which the conductive pattern 1200 is not electrically connected to other electrical elements. In this case, the conductive adhesive member 1100 may be referred to as various other terms such as a 'floating ground layer' or a 'floating ground plane'.

The conductive pattern 1200 (e.g., the first conductive pattern 1210 or the second conductive pattern 1220), which is disposed on the conductive adhesive member 1100 or the third support structure 9, may be electrically connected to the ground plane included in the first substrate assembly 73 (see FIG. 7).

Figure 15:
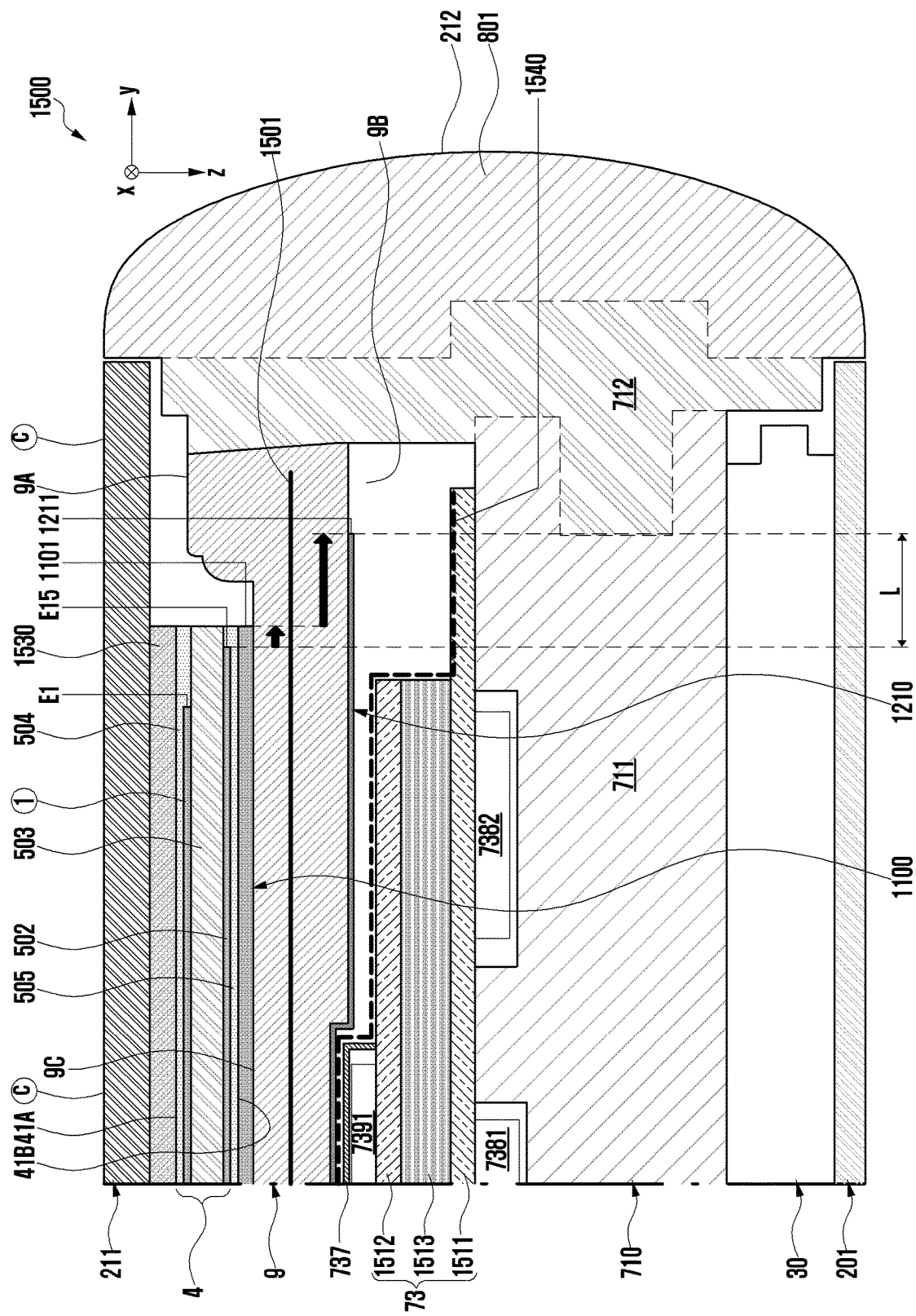
FIG. 15 is a cross-sectional view of an electronic device taken along line D-D' in FIG. 7 according to an embodiment of the disclosure.

FIG. 15 is a cross-sectional view 1500 of the electronic device 2 taken along line D-D' in FIG. 7 according to an embodiment of the disclosure.

Referring to FIG. 15, the electronic device 2 may include the first side member 212, the first support structure 710, the front cover 201, the first rear cover 211, the flexible display 30, the first substrate assembly 73, the antenna structure 4, the third support structure 9, the conductive adhesive member 1100, the first conductive pattern 1210, and/or a buffer member 1530. A part of the flexible display 30, which corresponds to the first housing 21 (see FIG. 2), may be positioned between the first support structure 710 and the front cover 201. The first substrate assembly 73, the antenna structure 4, the third support structure 9, the conductive adhesive member 1100, the first conductive pattern 1210, or the buffer member 1530 may be positioned between the first support structure 710 and the first rear cover 211. The third support structure 9 may be positioned between the first substrate assembly 73 and the first rear cover 211. At least a part of the antenna structure 4 may be positioned between the third support structure 9 and the first rear cover 211. The buffer member 1530 may be positioned between the antenna structure 4 and the first rear cover 211.

The first substrate assembly 73 may include a primary PCB 1511, a secondary PCB 1512, and an interposer substrate 1513 between the primary PCB 1511 and the secondary PCB 1512. For example, the primary PCB 1511 may include the first printed circuit board 730 illustrated in FIG. 7. The primary PCB 1511 may be disposed on the first support structure 710. When viewed from above the first rear cover 211 (e.g., when viewed in the −z-axis direction), the secondary PCB 1512 may be disposed to at least partially overlap the primary PCB 1511. The interposer substrate 1513 may be configured to electrically connect the primary PCB 1511 and the secondary PCB 1512. For example, the interposer substrate 1513 may include multiple conductive vias (not shown) configured to electrically connect the primary PCB 1511 and the secondary PCB 1512. At least a part of the multiple conductive vias included in the interposer substrate 1513 may be a part of a signal line which allows a signal to be transmitted between at least one first electronic component disposed on the primary PCB 1511 and at least one second electronic component disposed on the secondary PCB 1512. A part of the multiple conductive vias included in the interposer substrate 1513 may be a part of a ground path configured to connect a ground plane included in the primary PCB 1511 and a ground plane included in the secondary PCB 1512.

The first support structure 710 may include a first conductive area 711 including a metal material, and a first non-conductive area 712 which is coupled to the first conductive area 711 and includes a non-metal material. At least a part of the first conductive area 711 of the first support structure 710 may be positioned between the first substrate assembly 73 and the flexible display 30. The first conductive area 711 may be configured to reduce the electromagnetic influence (e.g., the electromagnetic interference (EMI)) on multiple electronic components 7381 and 7382 arranged on one surface thereof, which faces the first substrate assembly 73 (or first support structure 71), and/or flexible display 30. For example, the first conductive area 711 may be configured to reduce the electromagnetic interference between the first substrate assembly 73 (or the multiple electronic components 7381 and 7382) and the flexible display 30. The first conductive area 711 may be electrically connected to a ground plane included in the first substrate assembly 73. For example, the first conductive area 711 and the primary PCB 1511 may be electrically connected to each other using a conductive adhesive member (or a conductive adhesive material) or a flexible conductive member (e.g., a conductive clip, a pogo pin, a spring, conductive PORON, conductive rubber, a conductive tape, or a conductive connector) positioned between the first conductive area 711 and the primary PCB 1511.

The antenna structure 4 may be disposed on the third surface 9A of the third support structure 9 using the conductive adhesive member 1100. The antenna structure 4 may include the first antenna element ①, the second conductive layer 502, the dielectric 503, a first coverlay 504, and/or a second coverlay 505. The first coverlay 504 may be configured to form the first surface 41A of the antenna structure 4, and the second coverlay 505 may be configured to form the second surface 41B of the antenna structure 4. For example, the first coverlay 504 and the second coverlay 505 may be configured to protect, from the outside, the antenna structure 4 or a circuit (e.g., the first antenna element ①, the second antenna element ②, the third antenna element ③, the first path pattern PP1, the second path pattern PP2, and the third path pattern PP3 in FIG. 11) included in the antenna structure 4. For example, the first coverlay 504 and the second coverlay 505 may include an insulating material or a non-conductive material. The first coverlay 504 or the second coverlay 505 may include various insulating materials such as an epoxy-based solder mask insulating ink (e.g., a photo imageable solder resist (PSR) mask ink). The first coverlay 504 may include an electromagnetic shielding material (or an electromagnetic wave shielding component), and in this case, when viewed from above the first rear cover 211 (e.g., when viewed in the +z-axis direction), may be arranged so as not to overlap the first antenna element ①, the second antenna element ②, and the third antenna element ③.

There may be limitations in expanding the second conductive layer 502 included in the antenna structure 4 due to a limited antenna design space (or an antenna mounting space) in the electronic device 2. According to an embodiment of the disclosure, the conductive adhesive member 1100 may be configured to contribute to expanding or strengthening an antenna ground for the first antenna element ① without expansion of the second conductive layer 502. For example, when viewed from above the first rear cover 211, the conductive adhesive member 1100 may be disposed to be expanded more than the second conductive layer 502 of the antenna structure 4, in a direction (e.g., the +y-axis direction) toward the first conductive part 801 of the first side member 212. There may be limitations in expanding the conductive adhesive member 1100 due to a limited antenna design space thereof. Since there are limitations in expansion of the second conductive layer 502 and/or limitations in expansion of the conductive adhesive member 1100, the first conductive pattern 1210 may be disposed on the fourth surface 9B of the third support structure 9, which enables an easy securing of the area thereof compared to the third surface 9A on which the antenna structure 4 is disposed, and thus may be configured to contribute to expanding or strengthening an antenna ground for the first antenna element ①. For example, at least a part of the first conductive pattern 1210 may be positioned between the third support structure 9 and the first substrate assembly 73. When viewed from above the first rear cover 211, the first conductive pattern 1210 may be disposed to be expanded more than the conductive adhesive member 1100, in a direction toward the first conductive part 801 of the first side member 212. When viewed from above the first rear cover 211, the conductive adhesive member 1100 may include an edge 1101 positioned to be spaced apart in the +y-axis direction with respect to the fifteenth edge E15 of the second conductive layer 502. The first conductive pattern 1210 may include an edge 1211 positioned to be spaced apart in the +y-axis direction with respect to the edge 1101 of the conductive adhesive member 1100, which corresponds to the first edge E1 of the first antenna element ①.

According to various embodiments, at least a part of the first conductive pattern 1210 may be positioned inside the third support structure 9 as the imaginary line (a dash-double dotted line) 1501.

The buffer member 1530 may be disposed on the antenna structure 4 or disposed on the first rear cover 211. The buffer member 1530 may be positioned in the gap between the antenna structure 4 and the first rear cover 211. The buffer member 1530 may be configured to press the antenna structure 4 toward the first substrate assembly 73, between the antenna structure 4 and the first rear cover 211. The buffer member 1530 may be configured to reduce the influence (e.g., scratch) between the antenna structure 4 and the first rear cover 211. The buffer member 1530 may be configured to reduce friction allophone between the antenna structure 4 and the first rear cover 211. The buffer member 1530 may include a non-conductive material capable of reducing degradation of antenna radiation performance when the antenna structure 4 transmits or receives a frequency signal to or from the third cover area ⓒ of the electronic device 2. The buffer member 1530 may have a dielectric permittivity (e.g., a low dielectric permittivity) allowing the degradation of antenna radiation performance of the antenna structure 4 to be reduced. For example, the buffer member 1530 may be the form of a film, or may include a flexible member such as a sponge.

Although not illustrated, the antenna structure 4 may be positioned in the inner space of the first housing 21 such that the first surface 41A faces the front cover 201. The antenna structure 4 may be positioned in the inner space of the second housing 22 (see FIG. 2) such that the first surface 41A faces the second cover area ⓑ (see FIG. 2). For example, the antenna structure 4 and the first portion 411 (see FIG. 6) of the antenna structure 4 may be positioned on the rear surface of the flexible display 30 or below or beneath the flexible display 30 such that the first surface 41A faces the flexible display 30. In some embodiments, the antenna structure 4 or the first portion 411 of the antenna structure 4 may be aligned and positioned in a recess formed on the rear surface of the flexible display 30. The flexible display 30 may include a conductive layer (e.g., a copper layer) configured to face the first support structure 710 and the second support structure 720. The conductive layer may be configured to perform a function of electromagnetic shielding and/or heat dissipation. A recess formed on the rear surface of the flexible display 30 may be a groove having a shape in which an area of the conductive layer of the flexible display 30, which corresponds to the antenna structure 4 (or the first portion 411 of the antenna structure 4) or the multiple antenna elements ①, ②, and ③, is removed. The antenna structure 4 may be configured to receive a signal from the outside, which passes through the front cover 201 and the flexible display 30. The signal from the antenna structure 4 may be transmitted to the outside through the front cover 201 and the flexible display 30. In an embodiment, an air gap may be positioned between the antenna structure 4 (or the first portion 411 of the antenna structure 4) and the flexible display 30 to secure antenna radiation performance of the antenna structure 4. A partial area of the flexible display 30, which at least partially overlaps the antenna structure 4 (or the first portion 411 of the antenna structure 4) or the multiple antenna elements ①, ②, and ③, may include a different pixel structure and/or wiring structure compared to other areas. For example, a partial area of the flexible display 30, which at least partially overlaps the antenna structure 4 (or the first portion 411 of the antenna structure 4) or the multiple antenna elements ①, ②, and ③, may have a different pixel density compared to other areas. A pixel structure and/or a wiring structure formed in a partial area of the flexible display 30, which at least partially overlaps the antenna structure 4 (or the first portion 411 of the antenna structure 4) or the multiple antenna elements ①, ②, and ③, may be configured to reduce loss of a signal, between the outside and the antenna structure 4.

Although not illustrated, the antenna structure 4 may be positioned in the inner space of the second housing 22 (see FIG. 2). The antenna structure 4 may be positioned such that the first surface 41A faces the second rear cover 221 (or the fourth cover area ⓓ) (see FIG. 2). For example, the antenna structure 4 and the first portion 411 (see FIG. 6) of the antenna structure 4 may be positioned on the rear surface of the sub-display 310, or below or beneath the sub-display 310 such that the first surface 41A faces the sub-display 310. The antenna structure 4 or the first portion 411 of the antenna structure 4 may be aligned and positioned in a recess formed on the rear surface of the sub-display 310. The sub-display 310 may include a conductive layer (e.g., a copper layer) configured to face the second support structure 720 (see FIG. 7). The conductive layer may be configured to perform a function of electromagnetic shielding and/or heat dissipation. For example, a recess formed on the rear surface of the sub-display 310 may be a groove having a shape in which an area of the conductive layer of the sub-display 310, which corresponds to the antenna structure 4 (or the first portion 411 of the antenna structure 4) or the multiple antenna elements ①, ②, and ③, is removed. The antenna structure 4 may be configured to receive a signal from the outside, which passes through the second rear cover 221 and the sub-display 310. The signal from the antenna structure 4 may be transmitted to the outside through the second rear cover 221 and the sub-display 310. An air gap may be positioned between the antenna structure 4 (or the first portion 411 of the antenna structure 4) and the sub-display 310 to secure antenna radiation performance of the antenna structure 4. A partial area of the sub-display 310, which at least partially overlaps the antenna structure 4 (or the first portion 411 of the antenna structure 4) or the multiple antenna elements ①, ②, and ③, may include a different pixel structure and/or wiring structure compared to other areas. For example, a partial area of the sub-display 310, which at least partially overlaps the antenna structure 4 (or the first portion 411 of the antenna structure 4) or the multiple antenna elements ①, ②, and ③, may have a different pixel density compared to other areas. A pixel structure and/or a wiring structure formed in a partial area of the sub-display 310, which at least partially overlaps the antenna structure 4 (or the first portion 411 of the antenna structure 4) or the multiple antenna elements ①, ②, and ③, may be configured to reduce loss of a signal, between the outside and the antenna structure 4.

Figure 16:
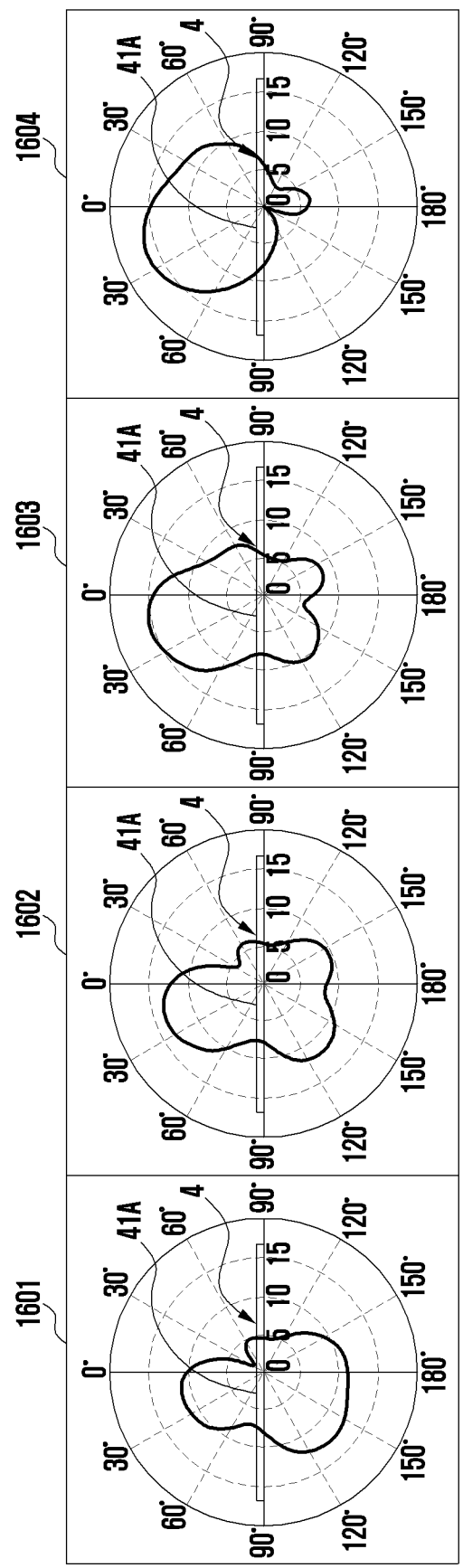
FIG. 16 illustrates graphs showing radiation patterns of an antenna structure according to the size of an antenna ground for an antenna structure according to an embodiment of the disclosure.

FIG. 16 illustrates graphs showing radiation patterns of the antenna structure 4 according to the size of an antenna ground for the antenna structure 4 according to an embodiment of the disclosure.

Referring to FIG. 16, reference numeral '1601' indicates a radiation pattern of the antenna structure 4 in a comparative example not including the conductive adhesive member 1100 (see FIG. 15) and the conductive pattern 1200 (see FIG. 12). Reference numeral '1602', reference numeral '1603', and reference numeral '1604' indicate radiation patterns of the antenna structure 4 when an antenna ground is expanded due to the conductive adhesive member 1100 and the conductive pattern 1200. For example, referring to FIG. 15, when viewed from above the first surface 41A of the antenna structure 4 (e.g., when viewed in the −z-axis direction), reference numeral 'L' is the distance in which the edge 1211 of the first conductive pattern 1210 is spaced apart from the fifteenth edge E15 of the second conductive layer 502 in the +y-axis direction, and may be understood as an expansion size of an antenna ground with respect to the first edge E1 of the first antenna element ①. The expansion size of an antenna ground with respect to the antenna structure 4 may be understood in substantially the same manner even with respect to other edges (e.g., the second edge E2 and the third edge E3 in FIG. 13) of the first antenna element ①. The expansion size of an antenna ground with respect to the antenna structure 4 may be understood in substantially the same manner even with respect to the edge (e.g., the tenth edge E10, the eleventh edge E11, and the twelfth edge E13 in FIG. 14) of the third antenna element ③.

Reference numeral '1602' indicates a radiation pattern of the antenna structure 4 when the extension size of an antenna ground is about 1 mm Reference numeral '1603' indicates a radiation pattern of the antenna structure 4 when the extension size of an antenna ground is about 2 mm Reference numeral '1604' indicates a radiation pattern of the antenna structure 4 when the extension size of an antenna ground is about 4 mm Compared to the comparative example, when an antenna ground is expanded using the conductive adhesive member 1100 and the conductive pattern 1200, a radiation pattern (e.g., an omnidirectional radiation pattern), which is emitted wider and more uniformly to a space to which the first surface 41A of the antenna structure 4 is directed, may be formed.

Figure 17:
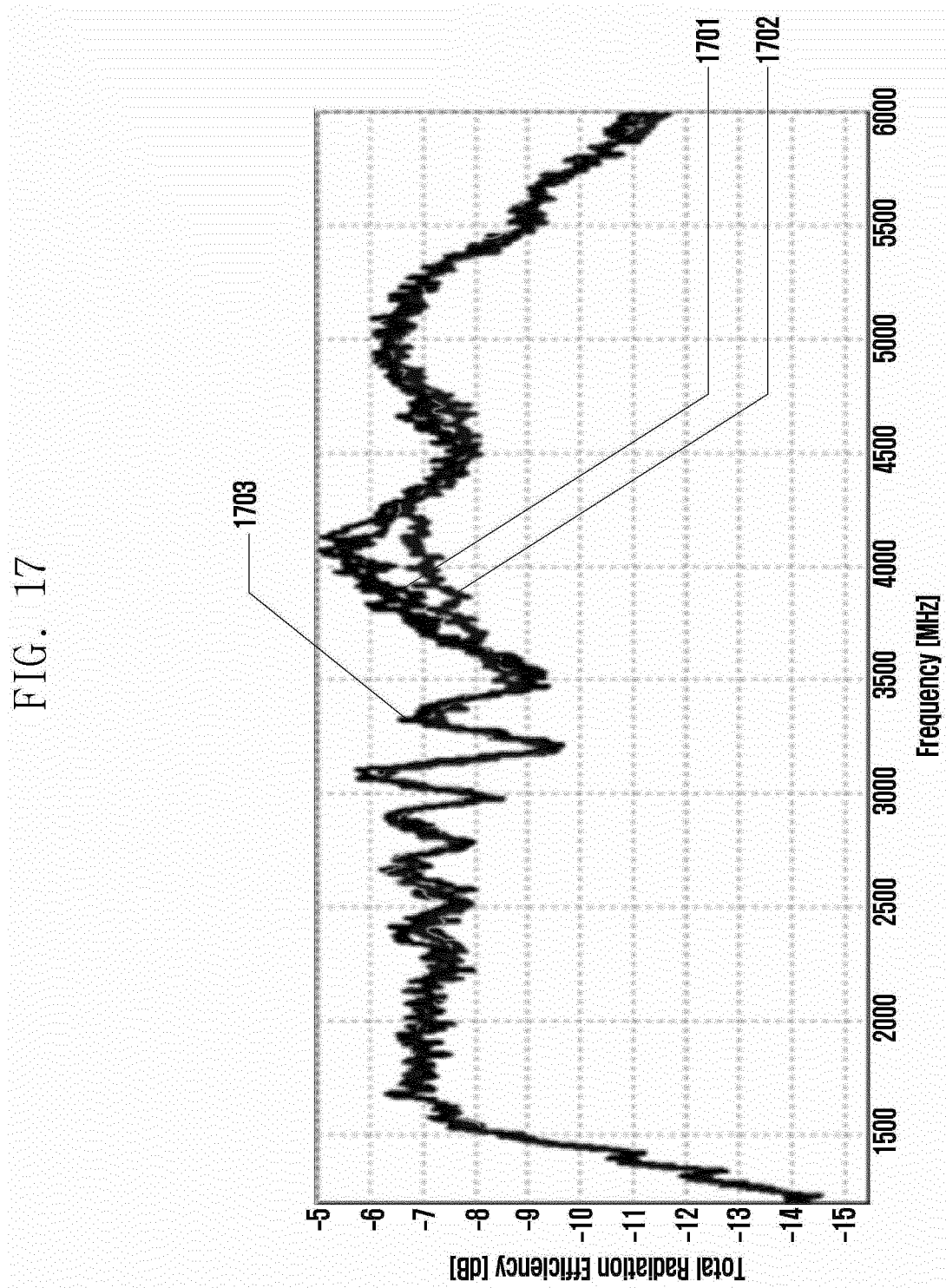
FIG. 17 illustrates graphs showing antenna radiation performance of an antenna using a conductive part included in a first side member according to the size of an antenna ground for an antenna structure according to an embodiment of the disclosure.

FIG. 17 illustrates graphs showing antenna radiation performance of an antenna using a conductive part included in the first side member 212 according to the size of an antenna ground for the antenna structure 4 according to an embodiment of the disclosure.

Referring to FIGS. 7 and 15, for example, a conductive part (e.g., the first conductive part 801, the second conductive part 802, or the sixth conductive part 806), which is at least partially positioned on the first side surface part S1 corresponding to the first edge E1 of the first antenna element ①, may be configured to operate as an antenna radiator. For example, in order to improve antenna radiation performance of the first antenna element ①, there may be an example in which the fifteenth edge E15 of the second conductive layer 502, which corresponds to the first edge E1 of the first antenna element ①, is expanded in the +y-axis direction. Referring to FIG. 17, reference numeral '1701' may indicate antenna radiation performance according to a first example in which the fifteenth edge E15 of the second conductive layer 502 is spaced about 0.5 mm apart from the first edge E1 of the first antenna element ① in the +y-axis direction. Reference numeral '1702' may indicate antenna radiation performance according to a second example in which the fifteenth edge E15 of the second conductive layer 502 is spaced about 1 mm apart from the first edge E1 of the first antenna element ① in the +y-axis direction. Reference numeral '1703' may indicate antenna radiation performance according to a third example in which the fifteenth edge E15 of the second conductive layer 502 is not expanded in the +y-axis direction compared to the first example and the second example. In the case of the first example or the second example, compared to the third example, since the second conductive layer 502 becomes close to the first conductive part 801, the second conductive part 802, or the sixth conductive part 806, antenna radiation performance of an antenna using the first conductive part 801, the second conductive part 802, or the sixth conductive part 806 as an antenna radiator may be reduced. Compared to the second example or the third example, an embodiment including the conductive adhesive member 1100 (see FIG. 15) and the conductive pattern 1200 (see FIG. 12) may be configured to reduce the degradation of antenna radiation performance of an antenna using the first conductive part 801, the second conductive part 802, or the sixth conductive part 806 as an antenna radiator while expanding or strengthening an antenna ground for the first antenna element ① without expansion of the second conductive layer 502.

Referring to FIG. 15, electrical elements or the set of the electrical elements positioned below or beneath the third support structure 9 may be configured to form a ground area 1540 for the antenna structure 4. For example, the first substrate assembly 73 may include one or more electronic components 7391 positioned between the first substrate assembly 73 and the third support structure 9. For example, the first substrate assembly 73 may include an electromagnetic shield member (e.g., a shield can) 737 configured to at least partially cover the one or more electronic components 7391. Elements of the first substrate assembly 73, such as one or more electronic components 7391 including a metallic material, a ground plane, or the electromagnetic shield member 737, may be configured to form a ground structure 1540 having electromagnetic influence on the antenna structure 4. For example, when viewed from above the first rear cover 211 (e.g., when viewed in the +z-axis direction), the ground structure 1540 may be understood or interpreted as a conductive surface, a conductive area, a ground surface, or a ground area which at least partially overlaps the antenna structure 4 so as to influence (e.g., reflect) an electromagnetic field (or an electromagnetic wave) emitted from the antenna structure 4.

The ground structure 1540 may not be substantially flat compared to the second conductive layer 502 included in the antenna structure 4. For example, a first distance, in which a part of the ground structure 1540 is spaced apart from the second surface 41B of the antenna structure 4 in the +z-axis direction, may be different from a second distance in which another part of the ground structure 1540 is spaced apart from the second surface 41B of the antenna structure 4 in the +z-axis direction. The ground structure 1540 may be configured to operate as an antenna ground for the antenna structure 4. In the case of a comparative example not including a conductive pattern (e.g., the first conductive pattern 1210 or the second conductive pattern 1220 in FIG. 12) disposed on the third support structure 9 to be positioned between the antenna structure 4 and the ground structure 1540, the ground structure 1540 may be configured to reduce antenna radiation performance of the antenna structure 4. For example, in the comparative example, the ground structure 1540 may make it difficult to form a radiation pattern (or a beam pattern) (e.g., an omnidirectional radiation pattern) which is uniformly emitted to a space in a direction to which the first surface 41A of the antenna structure 4 is directed. A conductive pattern (e.g., the first conductive pattern 1210 or the second conductive pattern 1220), which is positioned between the antenna structure 4 and the ground structure 1540, may be flat compared to the ground structure 1540. In the example of FIG. 12, the first conductive pattern 1210 and the second conductive pattern 1220 may be implemented in consideration of an area flatter than the ground structure 1540 of the fourth surface 9B. In some embodiments, an integrated conductive pattern replacing the first conductive pattern 1210 and the second conductive pattern 1220 may be disposed on the fourth surface 9B of the third support structure 9, and in this case, the fourth surface 9B may include an area flatter than the ground structure 1540 so as to correspond to the integrated conductive pattern. A conductive pattern (e.g., the first conductive pattern 1210 or the second conductive pattern 1220), which is positioned between the antenna structure 4 and the ground structure 1540, may be configured to reduce the influence of the ground structure 1540 on the electromagnetic field (or the electromagnetic wave) emitted from the antenna structure 4, thereby contributing to securing antenna radiation performance. A conductive pattern (e.g., the first conductive pattern 1210 or the second conductive pattern 1220), which is positioned between the antenna structure 4 and the ground structure 1540, may be configured to contribute to the formation of a radiation pattern (or a beam pattern) (e.g., an omnidirectional radiation pattern) which is emitted wider and more uniformly to a space to which the third cover area ⓒ of the electronic device is directed.

Figure 18:
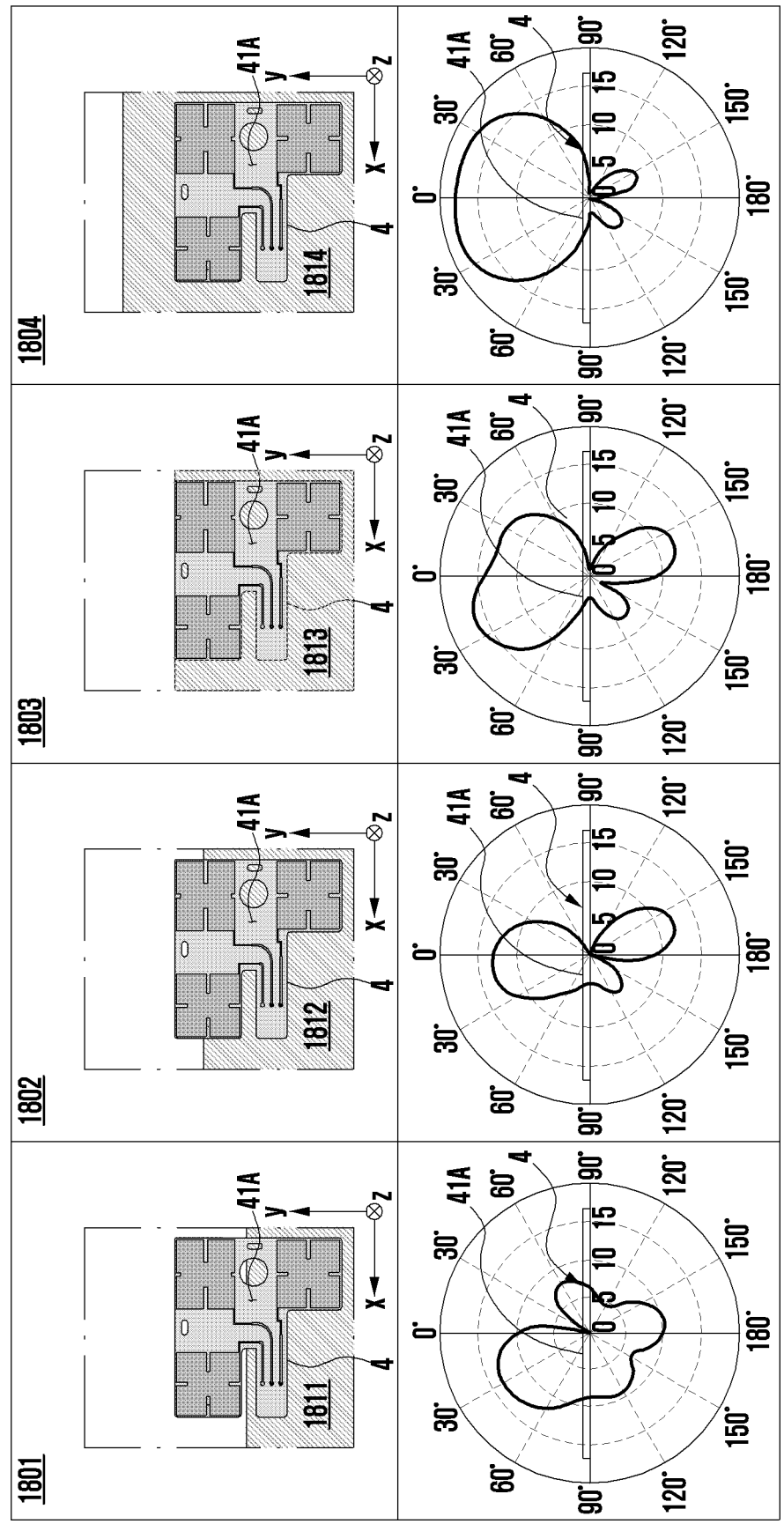
FIG. 18 illustrates graphs showing radiation patterns in cases in which the sizes of ground areas are different in the +y-axis direction when viewed from above a first surface of an antenna structure in a comparative example not including a conductive pattern according to an embodiment of the disclosure.

FIG. 18 illustrates graphs showing radiation patterns in cases in which the sizes of ground areas are different in the +y-axis direction when viewed from above the first surface 41A of the antenna structure 4 (e.g., when viewed in the +z-axis direction) in a comparative example not including the conductive pattern 1200 (FIG. 12) according to an embodiment of the disclosure.

Referring to FIG. 18, when viewed from above the first surface 41A, a first example (see reference numeral '1801') may include a ground area 1811 configured to partially overlap the antenna structure 4. When viewed from above the first surface 41A, a second example (see reference numeral '1802') may include a ground area 1812 configured to overlap more with the antenna structure 4 compared to the first example. When viewed from above the first surface 41A, a third example (see reference numeral '1803') may include a ground area 1813 configured to overlap more with the antenna structure 4 compared to the second example. In the third example 1803, for example, an edge of the ground area 1813, which corresponds to the +y-axis direction, may be configured to overlap the edge of the second conductive layer 502 (see to FIG. 15) of the antenna structure 4. When viewed from above the first surface 41A, a fourth example (see reference numeral '1804') may include a ground area 1814 further expanded in the +y-axis direction compared to the third example. The ground area 1811 of the first example 1801, the ground area 1812 of the second example 1802, the ground area 1813 of the third example 1803, and the ground area 1814 of the fourth example 1804 may be configured to be substantially flat and substantially parallel to the second conductive layer 502 of the antenna structure 4. When viewed from above the first surface 41A, as a flat ground area overlapping the antenna structure 4 expands, a radiation pattern of the antenna structure 4 may be formed as a radiation pattern (e.g., an omnidirectional radiation pattern) emitted wider and more uniformly to a space to which the first surface 41A is directed. The conductive pattern 1200 (see FIG. 15) according to an embodiment may be configured to correspond to the ground area 1814 of the fourth example 1804. The conductive pattern 1200 may be positioned between the antenna structure 4 and an uneven ground structure 1540 (see FIG. 15), and may be configured to reduce the influence of the uneven ground structure 1540 on the antenna radiation performance or the radiation pattern of the antenna structure 4.

Referring to FIG. 15, the first rear cover 211 may be formed of a non-conductive material such as polymer or glass. For example, when the antenna structure 4 transmits or receives a frequency signal toward or from the first rear cover 211, the first rear cover 211 may have a dielectric permittivity (e.g., a dielectric low permittivity) (e.g., a relative dielectric permittivity of about 10 or less) allowing the degradation of antenna radiation performance to be reduced.

Figure 19:
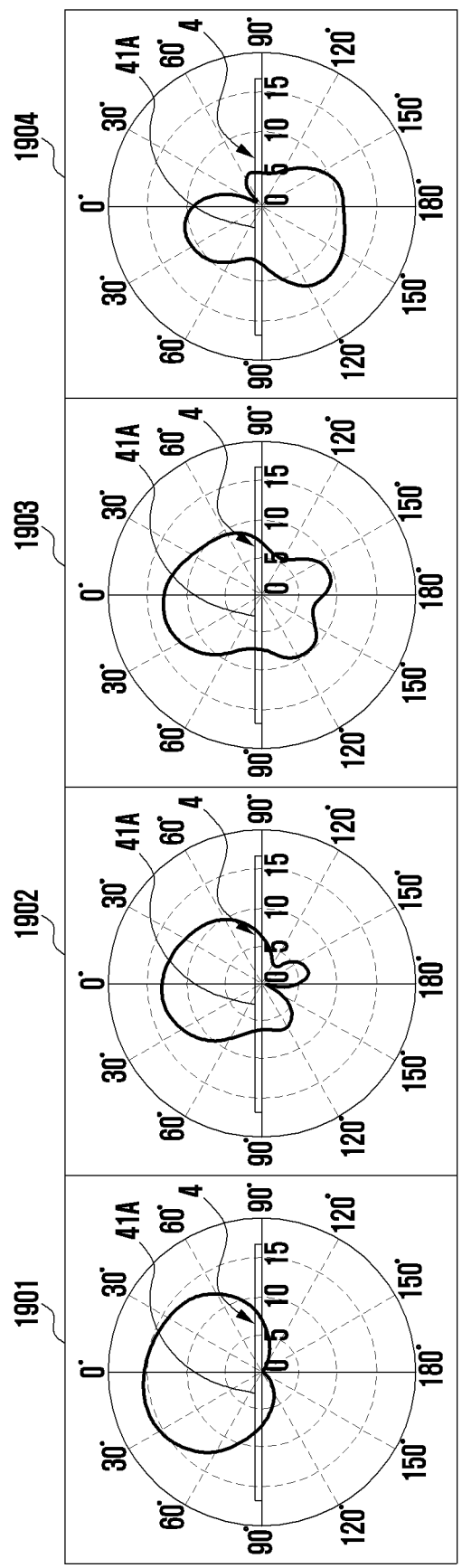
FIG. 19 illustrates graphs showing radiation patterns of an antenna structure according to the dielectric permittivity of a first rear cover in a comparative example not including a conductive adhesive member and a conductive pattern according to an embodiment of the disclosure.

FIG. 19 illustrates graphs showing radiation patterns of the antenna structure 4 according to the dielectric permittivity of the first rear cover 211 in a comparative example not including the conductive adhesive member 1100 (see FIG. 10) and the conductive pattern 1200 (see FIG. 12) according to an embodiment of the disclosure.

Referring to FIG. 19, the conductive adhesive member 1100 (see FIG. 10) and the conductive pattern 1200 (see FIG. 12) may be configured to reduce the influence of the first rear cover 211 on the antenna radiation performance of the antenna structure 4 compared to a comparative example not including the conductive adhesive member 1100 and the conductive pattern 1200. In the comparative example, the first rear cover 211 may be configured to reflect the electromagnetic wave emitted from the antenna structure 4 so as to reduce the radiation amount of electromagnetic waves passing through the first rear cover 211 and then the traveling to the outside. In the comparative example, it may make it difficult to form a radiation pattern (e.g., an omnidirectional radiation pattern) which is uniformly emitted to a space in a direction to which the third cover area ⓒ of the electronic device 2 is directed. In the comparative example, the first rear cover 211 may make it difficult to form a beam in which a relatively large amount of energy is emitted in a direction to which the third cover area ⓒ of the electronic device 2 is directed.

Referring to FIG. 19, reference numeral '1901' indicates a radiation pattern of the antenna structure 4 in the case in which the first rear cover 211 is formed of a material (e.g., glass) having a relative dielectric permittivity of about 7 in the comparative example. Reference numeral '1902' indicates a radiation pattern of the antenna structure 4 in the case in which the first rear cover 211 is formed of a material having a relative dielectric permittivity of about 15 in the comparative example. Reference numeral '1903' indicates a radiation pattern of the antenna structure 4 in the case in which the first rear cover 211 is formed of a material having a relative dielectric permittivity of about 20 in the comparative example. Reference numeral '1904' indicates a radiation pattern of the antenna structure 4 in the case in which the first rear cover 211 is formed of a material (e.g., ceramic) having a relative dielectric permittivity of about 30 in the comparative example. In the comparative example, as the dielectric permittivity of the first rear cover 211 is greater, the amount of reflection by the first rear cover 211 may increases, and the radiation amount of an electromagnetic wave, which passes through the first rear cover 211 and then travels to the outside, may be reduced. In the comparative example, a surface wave, which is guided through the first rear cover 211, may be generated due to electromagnetic waves emitted from the antenna structure 4. In the comparative example, the first rear cover 211 may be a waveguide through which electromagnetic waves emitted from the antenna structure 4 flow, and for example, may be a path of a medium which allows electromagnetic waves to flow therethrough using the property of total reflection. In the comparative example, although beamforming may be performed such that a corresponding beam pattern is formed through the antenna array AR (see FIG. 4) of the antenna structure 4, a surface wave guided to the first rear cover 211 may cause deformation (or distortion) of a beam pattern or reduction of beam coverage (or communication range). In the comparative example, a surface wave may cause power loss so that the antenna radiation performance of the antenna structure 4 is degraded. In the comparative example, a part of an electromagnetic field (or an electromagnetic wave), which is formed from the antenna array AR of the antenna structure 4, may be reflected from the first rear cover 211, and the reflected component may cause compensation and/or interference with respect to the boresight (e.g., the direction of the main lobe) thereof, thereby resulting in deformation (or distortion) of a beam pattern.

In the comparative example, deformation (or distortion) of a beam pattern may include the formation of a null between lobes of the beam pattern. The null may mean an ineffective area in which the antenna array AR cannot radiate or detect electromagnetic waves. The null may mean a direction which the radiation intensity is substantially zero. In the comparative example, it may be difficult that beam coverage is secured due to deformation or distortion of a beam pattern. In the comparative example, a part of an electromagnetic field (or an electromagnetic wave), which is formed from the antenna structure 4, may be reflected by the first rear cover 211 to reach the ground structure 1540 (see FIG. 20) and then be reflected by the uneven ground structure 1540, and the reflected component may cause compensation and/or interference, thereby resulting in deformation (or distortion) of the beam pattern.

According to an embodiment of the disclosure, as compared to the comparative example, the conductive pattern 1200 may be configured to reduce the influence of the first rear cover 211 and/or the uneven ground structure 1540 on the antenna radiation performance of the antenna structure 4 or the beam pattern. The conductive pattern 1200 may be configured to reduce or control a surface wave, in which an electromagnetic wave emitted from the antenna structure 4 is abandoned to the first rear cover 211 or flows through after being leaked, so as to reduce deformation or distortion of a beam pattern, thereby securing antenna gain and beam coverage. The conductive pattern 1200 may control a surface wave or reduce a disturbance wave. The conductive pattern 1200 may be configured to reduce transformation or distortion of electromagnetic waves by changing a boundary condition of electromagnetic waves with respect to the first rear cover 211.

Figure 20:
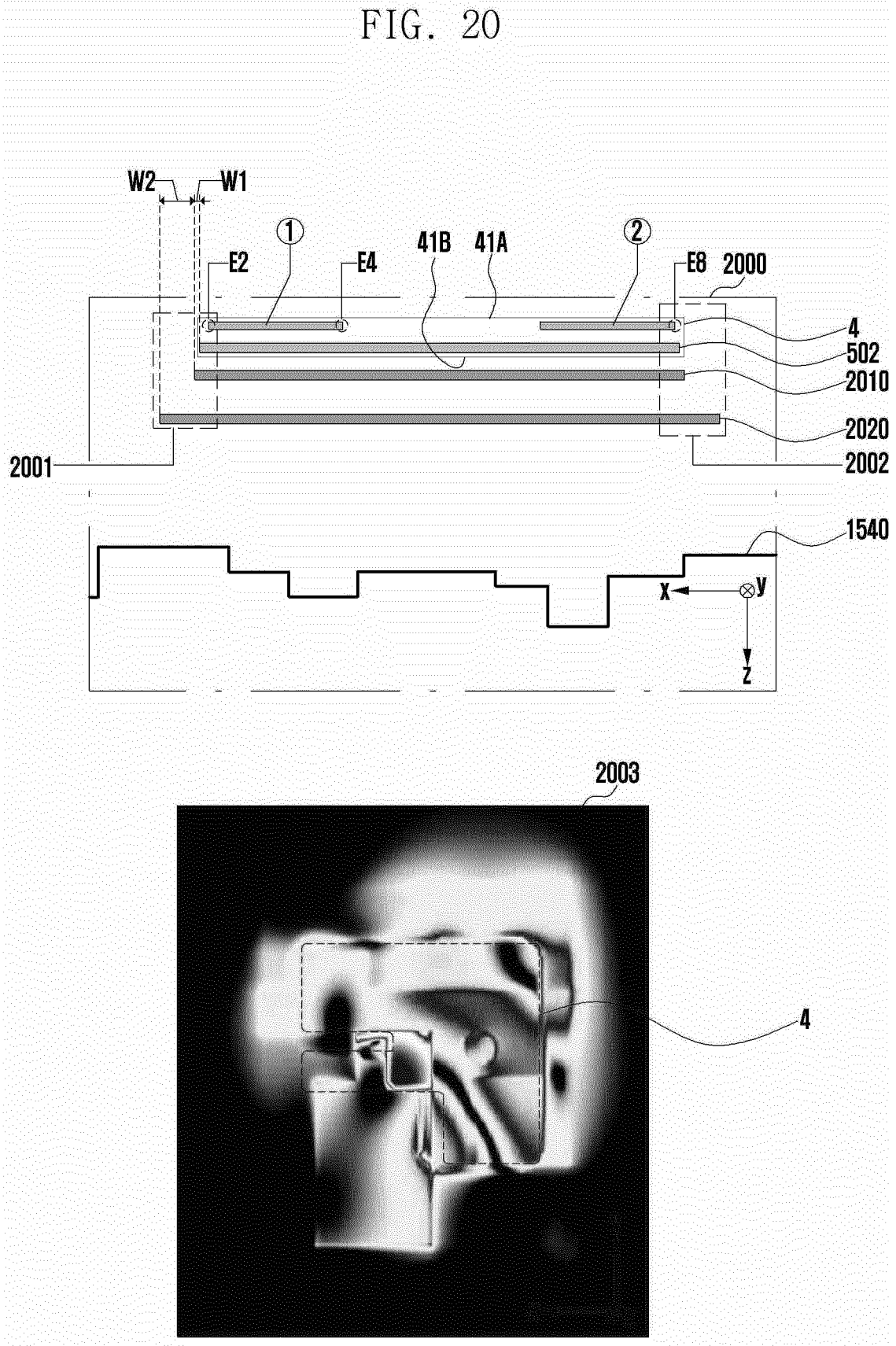
FIG. 20 is a cross-sectional view of an electronic device taken along line D-D' in FIG. 7, and a diagram illustrating an electric field distribution of an antenna structure in an example of FIG. 20 according to an embodiment of the disclosure.

FIG. 20 is a cross-sectional view 2000 of an electronic device 2 taken along line D-D' in FIG. 7, and a diagram 2003 illustrating an electric field distribution of an antenna structure 4 in an example of FIG. 20, according to an embodiment of the disclosure.

Referring to FIG. 20, a first layer (or a first conductive material) 2010 including a conductive material and a second layer (or a second conductive material) 2020 including a conductive material are may be positioned between the antenna structure 4 and the ground structure 1540. The first layer 2010 may be positioned between the antenna structure 4 and the second layer 2020. For example, the first layer 2010 may include the conductive adhesive member 1100 in FIG. 10. The first layer 2010 may not be limited to the conductive adhesive member 1100, and may be implemented in various shapes such as a conductive sheet or a conductive plate positioned between the antenna structure 4 and the ground structure 1540. For example, the second layer 2020 may include the conductive pattern 1200 in FIG. 12. The second layer 2020 may not be limited to the conductive pattern 1200, and may be implemented in various shapes such as a conductive sheet or a conductive plate positioned between the first layer 2010 and the ground structure 1540. The first layer 2010 may be positioned to be spaced apart from the second conductive layer 502 of the antenna structure 4 in a direction (e.g., the +z-axis direction) to which the second surface 41B of the antenna structure 4 is directed. The second conductive layer 2020 may be positioned to be spaced apart from the first layer 2010 in a direction to which the second surface 41B of the antenna structure 4 is directed.

When viewed from above the first surface 41A of the antenna structure 4 (e.g., when viewed in the +z-axis direction), the first layer 2010 may be configured to at least partially overlap the first antenna element ①, the second antenna element ②, or the third antenna element ③ (see FIG. 11). When viewed from above the first surface 41A of the antenna structure 4, the first layer 2010 may be configured to at least partially overlap the second conductive layer 502 of the antenna structure 4. When viewed from above the first surface 41A of the antenna structure 4, the first layer 2010 may be expanded to a first width W1 in the +x-axis direction with respect to the edge of the second conductive layer 502 and be disposed. When viewed from above the first surface 41A of the antenna structure 4, the second layer 2020 may be expanded to a second width W2 in the +x-axis direction with respect to the edge of the first layer 2010 and be disposed.

Referring to the portion indicated by reference numeral '2001', when viewed from above the first surface 41A of the antenna structure 4, the second conductive layer 502, the first layer 2010, and the second layer 2020 may be configured to form an antenna ground area expanded to correspond to the second edge E2 of the first antenna element ①. When an emission current is provided (or fed) to the first antenna element ①, electromagnetic waves may be substantially emitted in the edge (e.g., the second edge E2 and the fourth edge E4 in the illustrated cross-sectional view 2000) of the first antenna element ①. Since the second edge E2 is positioned adjacent to the edge of the antenna structure 4 compared to the fourth edge E4, an antenna ground area of the second conductive layer 502, which corresponds to the second edge E2, may be smaller than an antenna ground area of the second conductive layer 502, which corresponds to the fourth edge E4. An antenna ground area, which corresponds to the second edge E2, may be expanded or strengthened using the first layer 2010 and the second layer 2020 without the expansion of the second conductive layer 502. For example, the first layer 2010 and the second layer 2020 may be substantially contribute such that an electromagnetic wave emitted from the second edge E2 travels in a direction to which the first surface 41A of the antenna structure 4 is directed, and thus the antenna radiation performance of the antenna structure 4 can be improved.

Referring to the portion indicated by reference numeral '2002', by substantially the same as the method of expanding an antenna ground area to correspond to the second edge E2 of the first antenna element ①, when viewed from above the first surface 41A of the antenna structure 4, the second conductive layer 502, the first layer 2010, and the second layer 2020 may be configured to form an antenna ground area expanded to correspond to the eighth edge E8 of the second antenna element ②. For example, the portion indicated by reference numeral '2002' may be formed substantially symmetrically with the portion indicated by reference numeral '2001'. The portion indicated by reference numeral '2001' and the portion indicated by reference numeral '2002' may be formed in shapes which are at least partially different from each other. Although it is illustrated that the first layer 2010 is formed as an integrated layer, the first layer 2010 is not limited thereto, and it may be understood and interpreted that the first layer 2010 can be implemented in a form including multiple portions (e.g., multiple floating ground layers) separated from each other, as the conductive adhesive member 1100 in FIG. 10. For example, multiple portions included in the first layer 2010 may be positioned so as not to overlap each other when viewed from above the first surface 41A of the antenna structure 4.

The thickness of any two portions of the multiple portions included in the first layer 2010 may be substantially the same or different. For example, in order to adjust the height of the antenna structure 4 with respect to the third support structure 9, or in order for the antenna structure 4 to be positioned substantially flat with respect to the third surface 9A of the third support structure 9, a first portion (e.g., the first conductive adhesive member 1110 in FIG. 10) and a second portion (e.g., the second conductive adhesive member 1120 in FIG. 10), which are included in the first layer 2010, may have different thicknesses. In some embodiments, the first layer 2010 may be integrally formed, and different areas of the first layer 2010 may have the same thickness or different thicknesses.

Although it is illustrated that the second layer 2020 is formed as an integrated layer, it may not be limited thereto, and it may be understood and interpreted that the second layer 2020 includes multiple portions (e.g., multiple floating ground layers) separated from each other, as the conductive pattern 1200 in FIG. 12. Multiple portions included in the second layer 2020 may be positioned so as not to overlap each other when viewed from above the first surface 41A of the antenna structure 4. Due to a relative position with a surrounding element (e.g., the first support structure 710 or the first substrate assembly 73 in FIG. 15) with respect to the fourth surface 9B (see FIG. 12) of the third support structure 9, or a structural reason of the fourth surface 9B, when it is difficult that the second layer 2020 is integrally formed using LDS, multiple portions (e.g., the first conductive pattern 1210 and the second conductive pattern 1220 in FIG. 12) positioned in areas of the fourth surface 9B, which are separated from each other and on which the LDS is easily performed, may be implemented. In some embodiments, the thickness of any two portions of the multiple portions included in the second layer 2020 may be substantially the same or different. In some embodiments, the second layer 2020 may be integrally formed, and different areas of the second layer 2020 may have the same thickness or different thicknesses. In the illustrated example, although a flat shape, in which the first layer 2010 or the second layer 2020 is substantially parallel to the first surface 41A of the antenna structure 4, is presented, the shape is not limited thereto, and the shape may be formed in various other shapes so as to fit the mounting area or the mounting space thereof.

The first layer 2010 and/or the second layer 2020 may be configured to expand or strengthen an antenna ground for the antenna structure 4, thereby reducing the influence of the ground structure 1540 on the antenna radiation performance or the radiation pattern thereof. The second layer 2020 may be configured to be flat compared to the ground structure 1540 and may be positioned between the antenna structure 4 and the ground structure 1540 so as to reduce the electromagnetic influence of the ground structure 1540 on the antenna structure 4.

Figure 21:
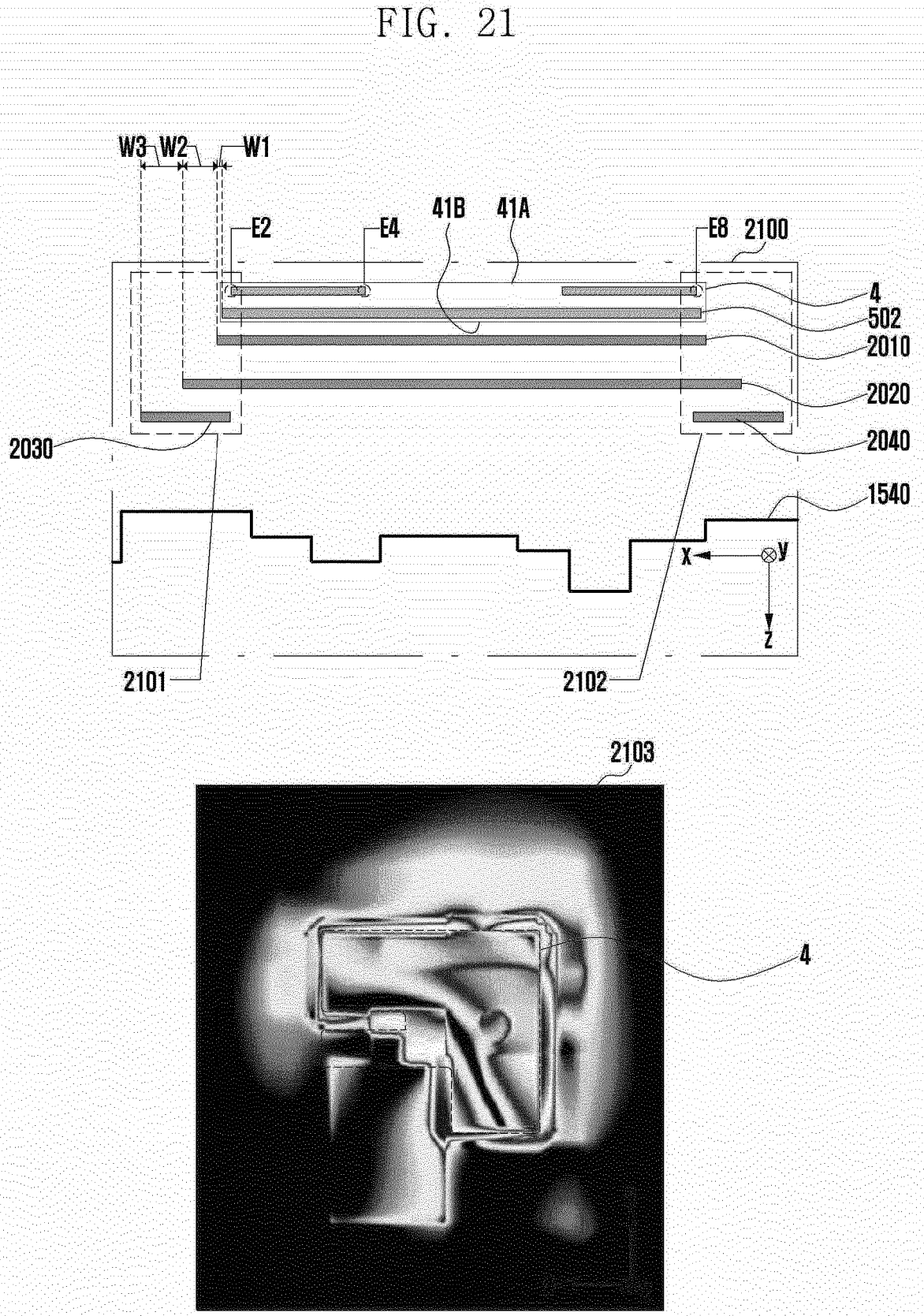
FIG. 21 is a cross-sectional view of an electronic device taken along line D-D' in FIG. 7, and a diagram illustrating an electric field distribution of an antenna structure in an example of FIG. 21, according to an embodiment of the disclosure.

FIG. 21 is a cross-sectional view 2100 of the electronic device 2 taken along line D-D' in FIG. 7, and a diagram 2103 illustrating an electric field distribution 2103 of the antenna structure 4 in an example of FIG. 21, according to an embodiment of the disclosure.

Referring to FIG. 21, compared to the example of FIG. 20, a third layer (or a third conductive material) 2030 including a conductive material and a fourth layer (or a fourth conductive material) 2040 including a conductive material may be added. The third layer 2030 may be positioned to be spaced apart from the second layer 2020 in a direction (e.g., the +z-axis direction) to which the second surface 41B of the antenna structure 4 is directed. When viewed from above the first surface 41A of the antenna structure 4, at least a part of the second layer 2020 may be configured to overlap the third layer 2030. When viewed from above the first surface 41A of the antenna structure 4, the third layer 2030 may be expanded to a third width W3 in the +x-axis direction with respect to the edge of the second layer 2020 and be disposed. Referring to the portion indicated by reference numeral '2101', when viewed from above the first surface 41A of the antenna structure 4, the second conductive layer 502, the first layer 2010, the second layer 2020, and the third layer 2030 may be configured to form an antenna ground area expanded to correspond to the second edge E2 of the first antenna element ①.

The fourth layer 2040 may be positioned to be spaced apart from the second layer 2020 in a direction (e.g., the +z-axis direction) to which the second surface 41B of the antenna structure 4 is directed. When viewed from above the first surface 41A of the antenna structure 4, at least a part of the second layer 2020 may be configured to overlap the fourth layer 2040. When viewed from above the first surface 41A of the antenna structure 4, the fourth layer 2040 may be expanded in the −x-axis direction with respect to the edge of the second layer 2020 and be disposed. Referring to the portion indicated by reference numeral '2102', when viewed from above the first surface 41A of the antenna structure 4, the second conductive layer 502, the first layer 2010, the second layer 2020, and the fourth layer 2040 may be configured to form an antenna ground area expanded to correspond to the eighth edge E8 of the second antenna element ②. Referring to the portion indicated by reference numeral '2102', when viewed from above the first surface 41A of the antenna structure 4, the second conductive layer 502, the first layer 2010, the second layer 2020, and the fourth layer 2040 may be configured to form an antenna ground area expanded to correspond to the eighth edge E8 of the second antenna element ②. For example, the portion indicated by reference numeral '2102' may be formed substantially symmetrically with the portion indicated by reference numeral '2101'. In some embodiments, the portion indicated by reference numeral '2101' and the portion indicated by reference numeral '2102' may be formed in shapes which are at least partially different from each other.

Figure 22:
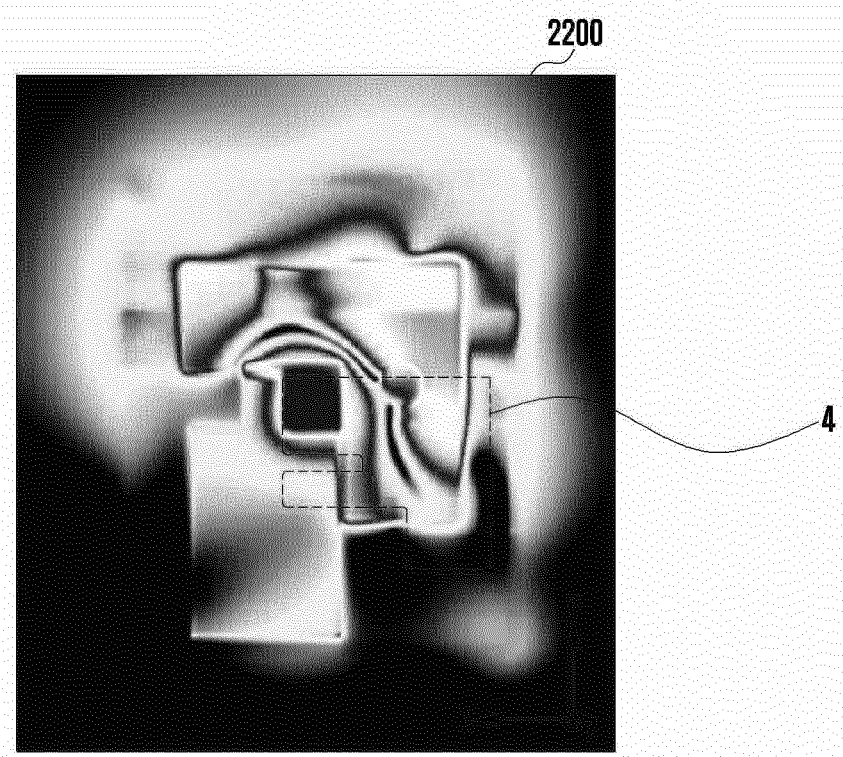
FIG. 22 is a diagram illustrating an electric field distribution of an antenna structure in a comparative example not including a second layer compared to the example of FIG. 20 according to an embodiment of the disclosure.

FIG. 22 is a diagram illustrating an electric field distribution 2200 of an antenna structure 4 in a comparative example not including the second layer 2020 compared to the example of FIG. 20 according to an embodiment of the disclosure.

Referring to FIG. 22, compared to the electric field distribution 2003 according to the example of FIG. 20, the electric field distribution 2103 according to the example of FIG. 21, and the electric field distribution 2200 according to a comparative example of FIG. 22, the example of FIG. 20 or the example of FIG. 21 may be configured to form a uniform electric field distribution compared to the comparative example of FIG. 22.

Figure 23:
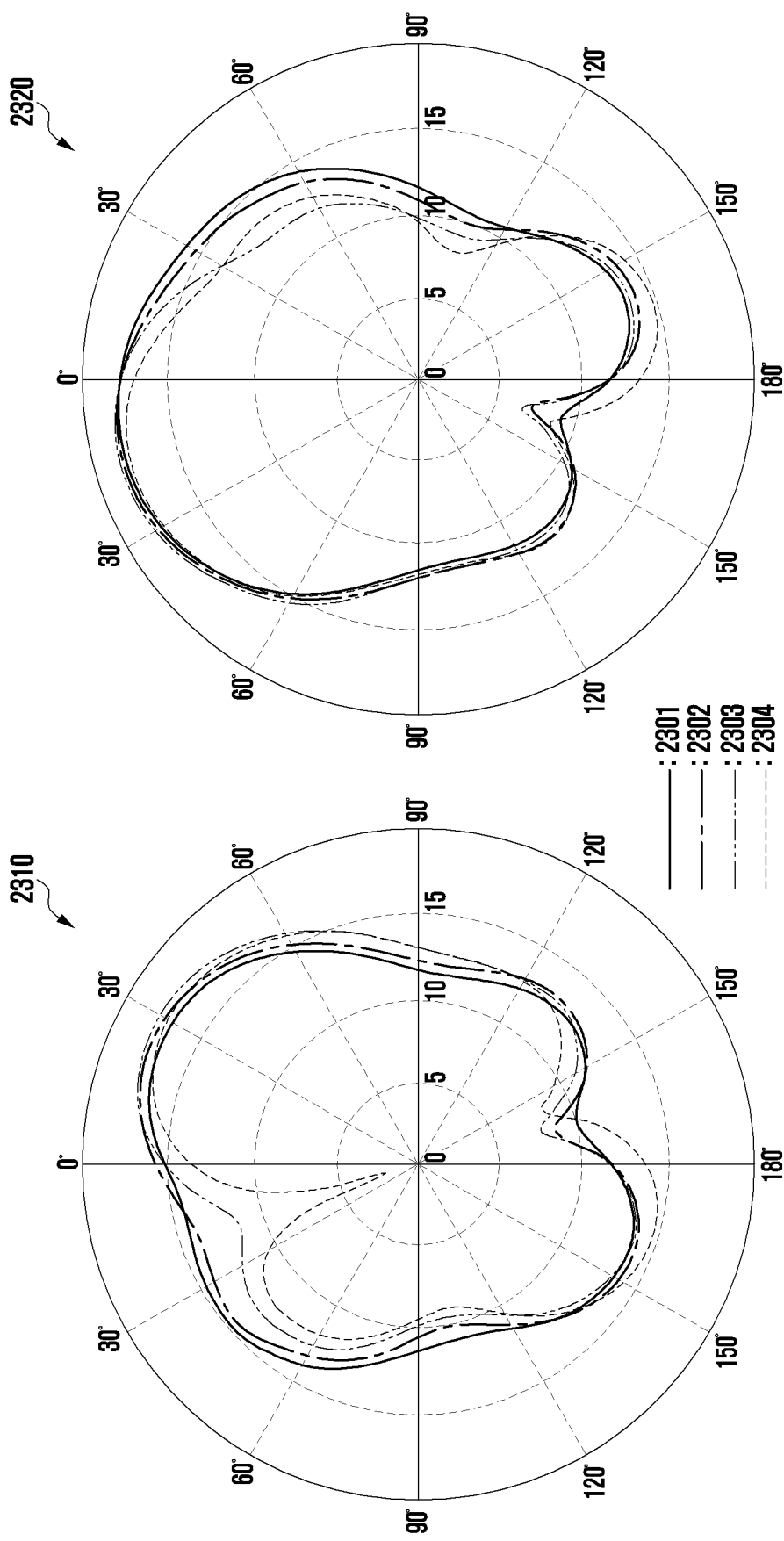
FIG. 23 is a graph showing a radiation pattern according to the example of FIG. 20, a graph showing a radiation pattern according to the example of FIG. 21, a graph showing a radiation pattern according to a first comparative example, and a graph showing a radiation pattern according to a second comparative example according to an embodiment of the disclosure.

FIG. 23 is a graph 2301 showing a radiation pattern according to the example of FIG. 20, a graph 2302 showing a radiation pattern according to the example of FIG. 21, a graph 2303 showing a radiation pattern according to a first comparative example, and a graph 2304 showing a radiation pattern according to a second comparative example according to an embodiment of the disclosure.

Referring to FIG. 23, compared to the example of FIG. 21, the first comparative example may mean a case in which the third layer 2030 or the fourth layer 2040 is positioned so as not to overlap the second layer 2020 when viewed from above the first surface 41A of the antenna structure 4. The second comparative example may omit the second layer 2020 compared to the example of FIG. 20.

Referring to FIG. 23, reference numeral '2310' indicates a radiation pattern of the first antenna element ①, and reference numeral '2320' indicates a radiation pattern of the second antenna element ②. According to the example of FIG. 20 or the example of FIG. 21, an antenna ground for the antenna structure 4 may be expanded or strengthened to have an improved radiation pattern compared to the first comparative example. When the graph 2302 showing a radiation pattern according to the example of FIG. 21 and the graph 2303 showing a radiation pattern according to the first comparative example are compared, the overlapping of the third layer 2030 and the fourth layer 2040 with the second layer 2020 may contribute to improvement of a radiation pattern thereof when viewed from above the first surface 41A of the antenna structure 4.

Figure 24:
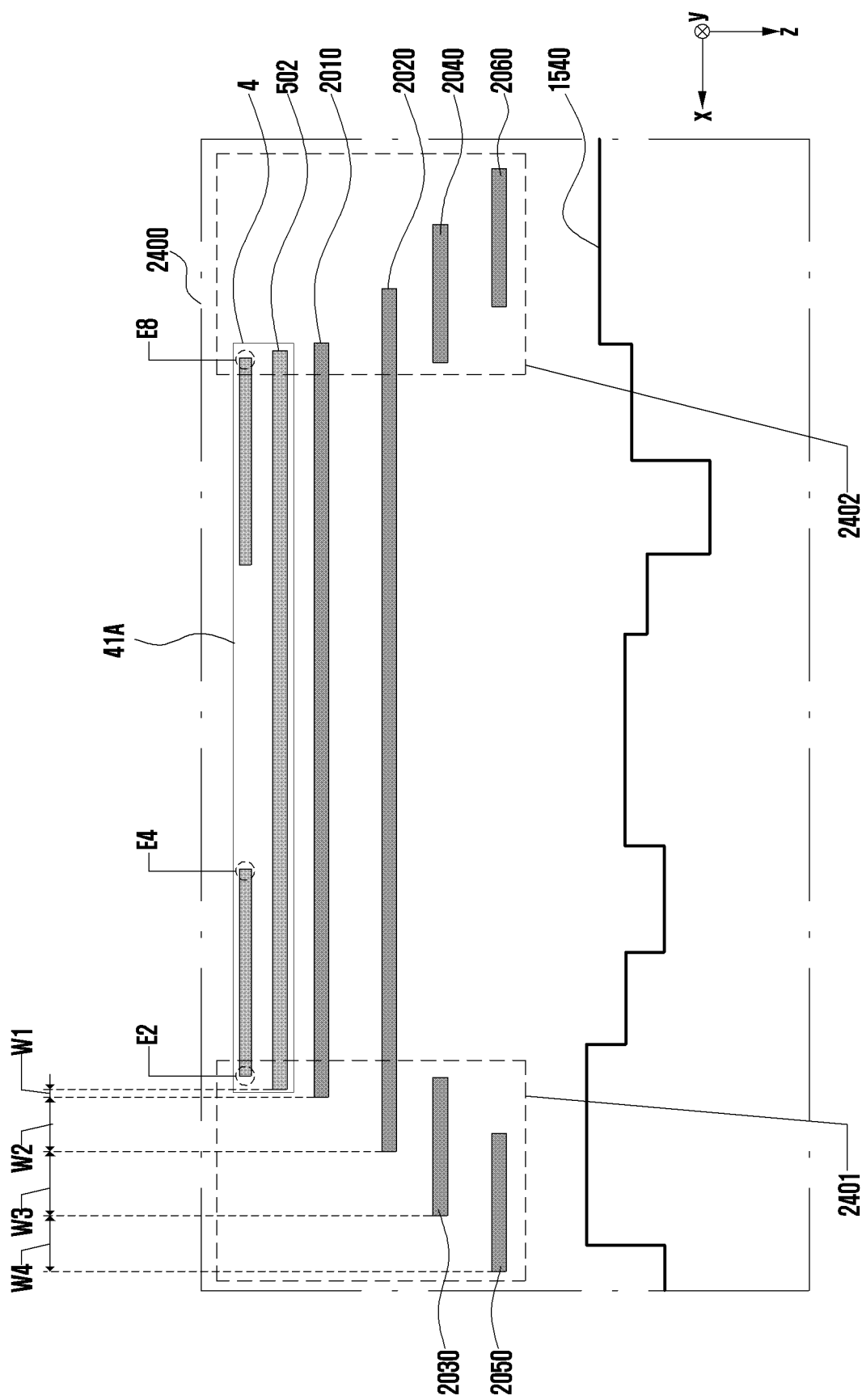
FIG. 24 is a cross-sectional view of an electronic device taken along line D-D' in FIG. 7 according to an embodiment of the disclosure.

FIG. 24 is a cross-sectional view 2400 of the electronic device 2 taken along line D-D' in FIG. 7 according to an embodiment of the disclosure.

Referring to FIG. 24, the example of FIG. 24 may further include a fifth layer (or a fifth conductive material) 2050 including a conductive material and a sixth layer (or a sixth conductive material) 2060 including a conductive material compared to the example of FIG. 21. The fifth layer 2050 may be positioned to be spaced apart from the third layer 2030 in a direction (e.g., the +z-axis direction) to which the second surface 41B of the antenna structure 4 is directed. When viewed from above the first surface 41A of the antenna structure 4, at least a part of the third layer 2030 may be configured to overlap the fifth layer 2050. When viewed from above the first surface 41A of the antenna structure 4, the fifth layer 2050 may be expanded to a fourth width W4 in the +x-axis direction with respect to the edge of the third layer 2030 and be disposed. Referring to the portion indicated by reference numeral '2401', when viewed from above the first surface 41A of the antenna structure 4, the second conductive layer 502, the first layer 2010, the second layer 2020, the third layer 2030, and the fifth layer 2050 may be configured to form an antenna ground area expanded to correspond to the second edge E2 of the first antenna element ①.

The sixth layer 2060 may be positioned to be spaced apart from the fourth layer 2040 in a direction (e.g., the +z-axis direction) to which the second surface 41B of the antenna structure 4 is directed. When viewed from above the first surface 41A of the antenna structure 4, at least a part of the fourth layer 2040 may be configured to overlap the sixth layer 2060. When viewed from above the first surface 41A of the antenna structure 4, the sixth layer 2060 may be expanded in the −x-axis direction with respect to the edge of the fourth layer 2040 and be disposed. Referring to the portion indicated by reference numeral '2402', when viewed from above the first surface 41A of the antenna structure 4, the second conductive layer 502, the first layer 2010, the second 2020, the fourth layer 2040, and the sixth layer 2060 may be configured to form an antenna ground area expanded to correspond to the eighth edge E8 of the second antenna element ②. For example, the portion indicated by reference numeral '2402' may be formed substantially symmetrically with the portion indicated by reference numeral '2401'. In some embodiments, the portion indicated by reference numeral '2401' and the portion indicated by reference numeral '2402' may be formed in shapes which are at least partially different from each other.

Figure 25:
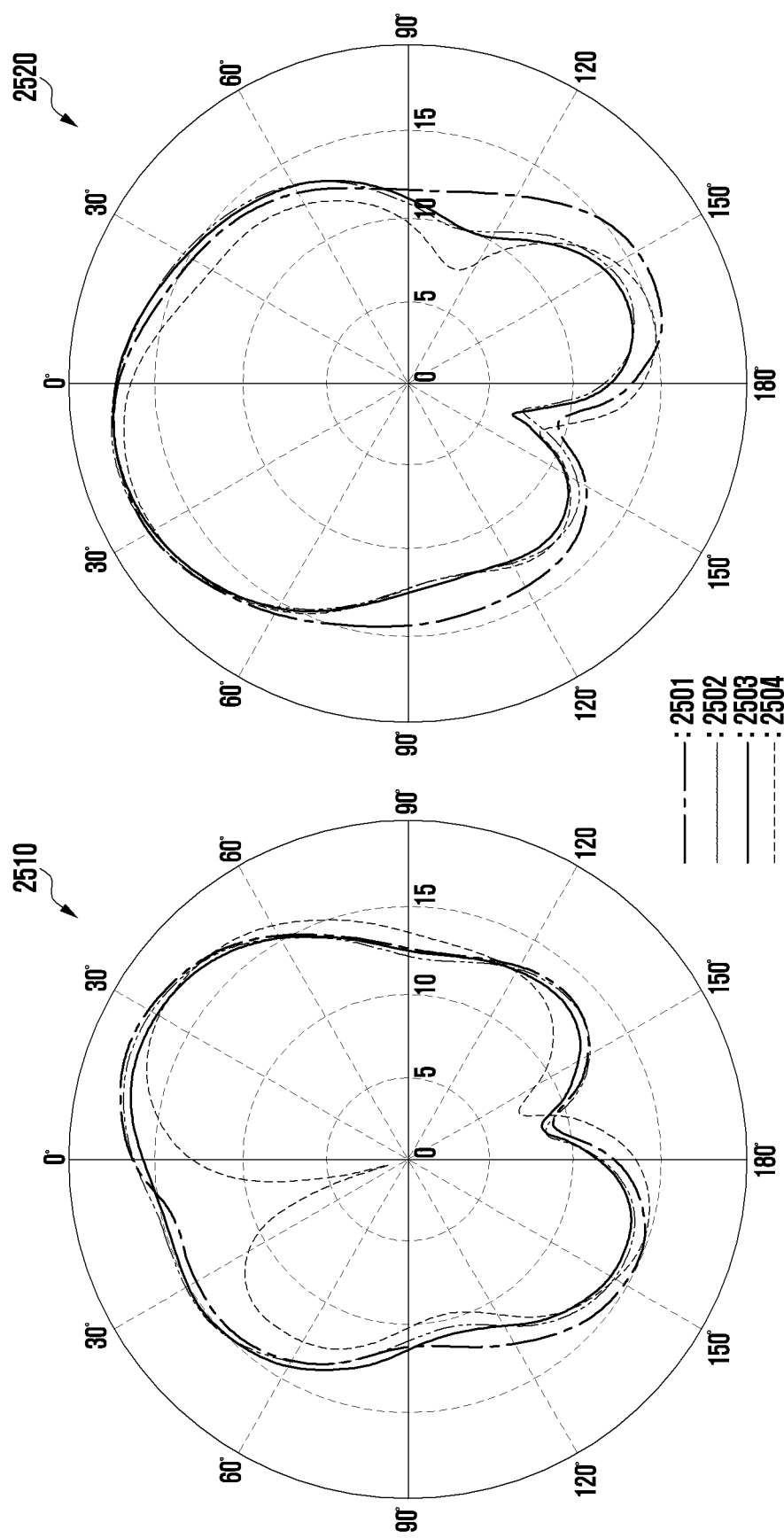
FIG. 25 is a graph showing a radiation pattern according to a first example related to FIG. 24, a graph showing a radiation pattern according to a second example related to FIG. 25, a graph showing a radiation pattern according to the example of FIG. 20, and a graph showing a radiation pattern according to an embodiment of the disclosure.

FIG. 25 is a graph 2501 showing a radiation pattern according to a first example related to FIG. 24, a graph 2502 showing a radiation pattern according to a second example related to FIG. 25, a graph 2503 showing a radiation pattern according to the example of FIG. 20, and a graph 2504 showing a radiation pattern according to an embodiment of the disclosure.

Referring to FIG. 25, according to the first example related to FIG. 24, the second width W2 may be formed to about 0.5 mm, the third width W3 may be formed to about 0.5 mm, and the fourth width W4 may be formed to about 0.5 mm According to the second example related to FIG. 24, the second width W2 may be formed substantially to 0 mm, the third width W3 may be formed to about 1 mm, and the fourth width W4 may be formed to about 1 mm. The comparative example may not include the second layer 2020 compared to the example of FIG. 20.

Referring to FIG. 25, reference numeral '2510' indicates a radiation pattern of the first antenna element ①, and reference numeral '2520' indicates a radiation pattern of the second antenna element ②. According to the first example related to FIG. 24, the second example related to FIG. 24, or the example of FIG. 20, an antenna ground for the antenna structure 4 may be expanded or strengthened to have an improved radiation pattern compared to the comparative example. Considering the graph 2501 showing a radiation pattern according to the first example related to FIG. 24 and the graph 2502 showing a radiation pattern according to the second example related to FIG. 24, radiation patterns may be variously formed based on the first width W1, the second width W2, the third width W3, or the fourth width W4.

Figure 26:
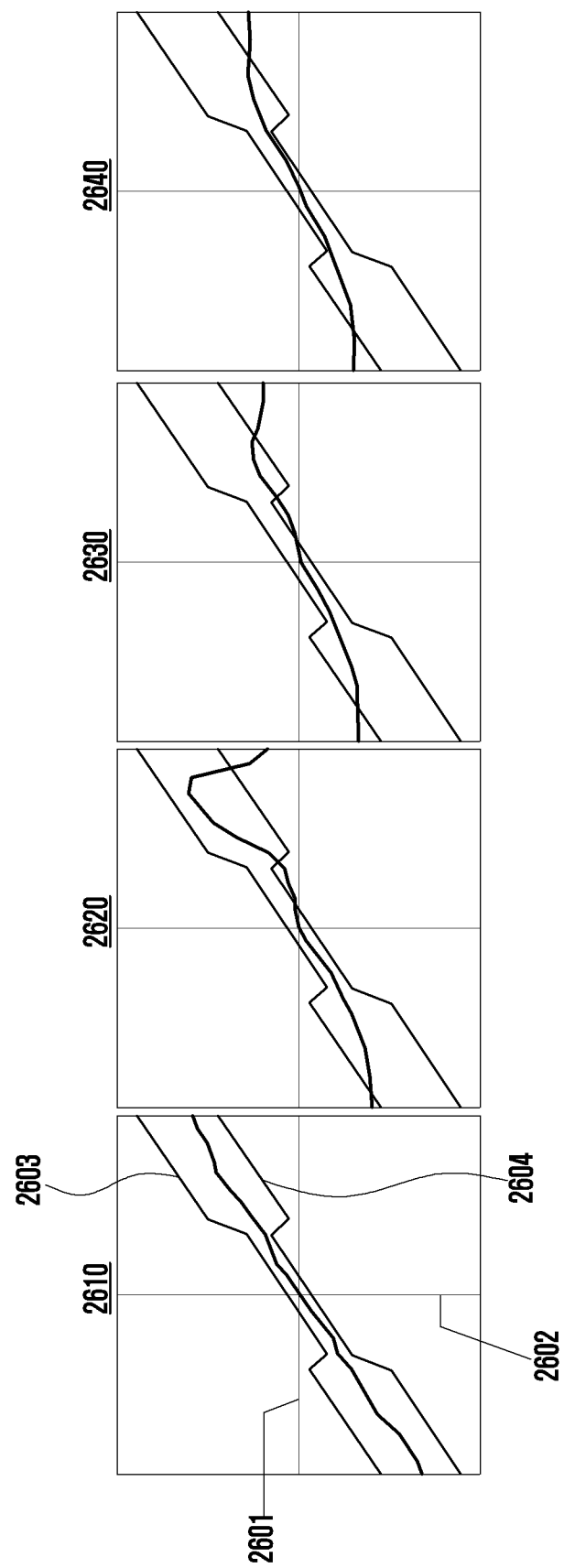
FIG. 26 illustrates graphs showing values in which angles, at which a signal transmitted from a signal source is received, are measured by an electronic device, an electronic device according to a first comparative example, an electronic device according to a second comparative example, and an electronic device according to a third comparative example according to an embodiment of the disclosure.

FIG. 26 illustrates graphs showing values in which angles, at which a signal transmitted from a signal source is received, are measured by the electronic device 2 (see FIG. 2), an electronic device according to a first comparative example, an electronic device according to a second comparative example measure, and an electronic device according to an embodiment of the disclosure.

Referring to FIG. 26, the electronic device 2 according to an embodiment may include the adhesive member 1100 (see FIG. 10) and the conductive pattern 1200 (see FIG. 12) capable of expanding or strengthening an antenna ground for the antenna structure 4 (see FIG. 7). An electronic device of the first comparative example may not include an adhesive member 1100 and a conductive pattern. An electronic device of the second comparative example may include the adhesive member 1100 and may not include the conductive pattern 1200. An electronic device of the third comparative example may include the conductive pattern 1200 and may not include the adhesive member 1100. Reference numeral '2610' indicates a graph for the electronic device 2 according to an embodiment. Reference numeral '2620' indicates a graph for the electronic device according to the first comparative example. Reference numeral '2630' indicates a graph for the electronic device according to the second comparative example. Reference numeral '2640' indicates a graph for the electronic device according to the third comparative example. The horizontal axis 2601 of the graphs indicates an angle at which the electronic device rotates. In the graphs, the vertical axis 2602 may indicate a value obtained by measuring an angle (e.g., an angle received with respect to the x-axis, or an angle received with respect to the y-axis) at which a signal transmitted from a signal source is received according to a rotation angle of the electronic device. For example, the graph indicated by reference numeral '2603' and the graph indicated by '2604' may show a design range which allows reliability of data received from a signal source according to a rotation angle of the electronic device to be secured. The electronic device 2 may be configured to expand or strengthen an antenna ground for the antenna structure 4 so as to measure a signal reception angle with reliability satisfying a design range compared to the electronic device according to the first comparative example, the electronic device according to the second comparative example, and the electronic device according to the third comparative example.

According to an embodiment of the disclosure, an electronic device (e.g., the electronic device 2 in FIG. 2) may include a housing (e.g., the foldable housing 20 in FIG. 2) configured to provide a front surface (e.g., the front surface 20A in FIG. 2) of the electronic device and a rear surface (e.g., the rear surface 20B in FIG. 2) of the electronic device. The electronic device may include an antenna structure (e.g., the antenna structure 4 in FIG. 2) positioned in the housing. The antenna structure may include a printed circuit board (e.g., the printed circuit board 41 in FIG. 4). The printed circuit board may include a first surface (e.g., the first surface 41A in FIG. 4) configured to face the front surface or the rear surface and a second surface (e.g., the second surface 41B in FIG. 6) configured to face a direction opposite to the first surface. The printed circuit board may include a first conductive layer (e.g., the first conductive layer 501 in FIG. 5) including a first antenna element and a second antenna element (e.g., any two of the multiple antenna elements ①, ②, and ③ in FIG. 5) configured not to overlap with each other when viewed from above the first surface. The printed circuit board may include a second conductive layer (e.g., the second conductive layer 502 in FIG. 5) positioned closer to the second surface than the first conductive layer. The second conductive layer may be configured to operate as a ground plane. The printed circuit board may include a dielectric (e.g., the dielectric 503 in FIG. 5) positioned between the first conductive layer and the second conductive layer.

The electronic device may include a first conductive material (e.g., the conductive adhesive member 1100 in FIG. 15) which is positioned between the front surface and the second surface when the first surface faces the rear surface and positioned between the rear surface and the second surface when the first surface faces the front surface. The first conductive material may be configured to overlap the second conductive layer when viewed from above the first surface.

The electronic device may include a second conductive material (e.g., the first conductive pattern 1210 in FIG. 15) configured to overlap the first conductive material when viewed from above the first surface. The second conductive material may be positioned closer to the front surface than the first conductive material when the first surface faces the rear surface, and may be positioned closer to the rear surface than the first conductive material when the first surface faces the front surface. The second conductive layer may include a second edge (e.g., the fifteenth edge E15 in FIG. 15) configured to correspond to a first edge (e.g., the first edge E1 in FIG. 15) of the first antenna element or the second antenna element when viewed from above the first surface. The second conductive material may include a third edge (e.g., the edge 1211 in FIG. 15) configured to correspond to the second edge. The second edge may be positioned between the first edge and the third edge.

The first conductive material (e.g., the conductive adhesive member 1100 in FIG. 15) may include a fourth edge (e.g., the edge 1101 in FIG. 15) positioned between the second edge (e.g., the fifteenth edge E15 in FIG. 15) and the third edge (e.g., the third edge 1211 in FIG. 15) when viewed from above the first surface (e.g., the first surface 41A in FIG. 15).

The first conductive material may include a conductive adhesive member (e.g., the conductive adhesive member 1100 in FIG. 15) disposed on the second surface (e.g., the second surface 41B in FIG. 15).

The first conductive material (e.g., the conductive adhesive member 1100 in FIG. 15) or the second conductive material (e.g., the first conductive pattern 1210 in FIG. 15) may be in an electrically floating state.

The electronic device may further include a non-conductive support structure (e.g., the third support structure 9 in FIG. 15) positioned in the housing. The printed circuit board (e.g., the printed circuit board 41 in FIG. 15) may be coupled to the non-conductive support structure. At least a part of the first conductive material (e.g., the conductive adhesive member 1100 in FIG. 15) may be positioned between the printed circuit board and the non-conductive support structure.

The first conductive material may include a conductive adhesive member (e.g., the conductive adhesive member 1100 in FIG. 15).

The non-conductive support structure (e.g., the third support structure 9 in FIG. 15) may include a third surface (e.g., the third surface 9A in FIG. 15) configured to face the printed circuit board (e.g., the printed circuit board 41 in FIG. 15), and a fourth surface (e.g., the fourth surface 9B in FIG. 15) configured to face a direction opposite to the third surface. The second conductive material (e.g., the first conductive pattern 1210 in FIG. 15) may be disposed on the fourth surface.

The second conductive material (e.g., the first conductive pattern 1210 in FIG. 15) may be disposed on the fourth surface (e.g., the fourth surface 9B in FIG. 15) using LDS.

At least a part of the second conductive material (e.g., the first conductive pattern 1210 in FIG. 15) may be positioned inside the non-conductive support structure (e.g., the third support structure 9 in FIG. 15).

The electronic device may further include a side surface member (e.g., the first side member 212 in FIG. 15) configured to provide at least a part of a side surface of the electronic device. The electronic device may further include a support member (e.g., the first support structure 710 in FIG. 15) positioned in the housing. The support member may be connected or coupled to the side surface member. The electronic device may further include a non-conductive support structure (e.g., the third support structure 9 in FIG. 15) disposed on one side of the support member, which is configured to face the rear surface. The printed circuit board (e.g., the printed circuit board 41 in FIG. 15) may be coupled to the non-conductive support structure.

The first conductive material (e.g., the conductive adhesive member 1100 in FIG. 15) or the second conductive material (e.g., the first conductive pattern 1210 in FIG. 15) may be configured to be parallel to the second conductive layer (e.g., the second conductive layer 502 in FIG. 15).

The electronic device may further include a third conductive material (e.g., the third layer 2030 or the fourth layer 2040 in FIG. 21). The third conductive material may be positioned closer to the front surface than the second conductive material (e.g., the second layer 2020 in FIG. 2) when the first surface faces the rear surface, and positioned closer to the rear surface than the second conductive material when the first surface faces the front surface. The third conductive material may be configured to overlap the second conductive material when viewed from above the first surface. When viewed from above the first surface, the third conductive material may include a fourth edge configured to correspond to the third edge (e.g., the edge of the second layer 2020 in FIG. 21), and the third edge may be positioned between the second edge (e.g., the edge of the second conductive layer 502 in FIG. 21) and the third edge.

The electronic device may further include a flexible display (e.g., the flexible display 30 in FIG. 15) positioned in the housing. The flexible display may be configured to be visually exposed through the front surface (e.g., the front surface 20A in FIG. 2). The housing (e.g., the foldable housing 20 in FIG. 2) may be configured such that the front surface is folded inward. The housing may include a first housing (e.g., the first housing 21 in FIG. 2) and a second housing (e.g., the second housing 22 in FIG. 2) with reference to a folding axis (e.g., the folding axis A in FIG. 2). The antenna structure may be positioned in the first housing or the second housing.

The antenna structure (e.g., the antenna structure 4 in FIG. 15) may be configured to transmit and/or receive a signal of a frequency band of a UWB.

The electronic device may further include a wireless communication circuit (e.g., the wireless communication module 192 in FIG. 1) configured to transmit and/or receive a signal in a selected or a designated frequency band through the antenna structure (e.g., the antenna structure 4 in FIG. 15). The electronic device may further include a processor (e.g., the processor 120 in FIG. 1) electrically connected to the wireless communication circuit. The processor may be configured to perform a location positioning function with respect to a signal source, based on the signals received through the first antenna element and the second antenna element.

According to an embodiment of the disclosure, an electronic device (e.g., the electronic device 2 in FIG. 2) may include a housing (e.g., the foldable housing 20 in FIG. 2) configured to provide a front surface (e.g., the front surface 20A in FIG. 2) of the electronic device and a rear surface (e.g., the rear surface 20B in FIG. 2) of the electronic device. The electronic device may include an antenna structure (e.g., the antenna structure 4 in FIG. 2) positioned in the housing. The antenna structure may include a printed circuit board (e.g., the printed circuit board 41 in FIG. 4). The printed circuit board may include a first surface (e.g., the first surface 41A in FIG. 4) configured to face the front surface or the rear surface and a second surface (e.g., the second surface 41B in FIG. 6) configured to face a direction opposite to the first surface. The printed circuit board may include a first conductive layer (e.g., the first conductive layer 501 in FIG. 5) including a first antenna element and a second antenna element (e.g., any two of the multiple antenna elements ①, ②, and ③ in FIG. 5) which do not overlap with each other when viewed from above the first surface. The printed circuit board may include a second conductive layer (e.g., the second conductive layer 502 in FIG. 5) positioned closer to the second surface than the first conductive layer. The second conductive layer may be configured to operate as a ground plane. The printed circuit board may include a dielectric (e.g., the dielectric 503 in FIG. 5) positioned between the first conductive layer and the second conductive layer.

The electronic device may include a first conductive material (e.g., the conductive adhesive member 1100 in FIG. 15) which is positioned between the front surface and the second surface when the first surface faces the rear surface and positioned between the rear surface and the second surface when the first surface faces the front surface. The first conductive material may be configured to overlap the second conductive layer when viewed from above the first surface.

The electronic device may include a second conductive material (e.g., the first conductive pattern 1210 in FIG. 15) configured to overlap the first conductive material when viewed from above the first surface. The second conductive material may be positioned closer to the front surface than the first conductive material when the first surface faces the rear surface, and may be positioned closer to the rear surface than the first conductive material when the first surface faces the front surface. The second conductive layer may include a second edge (e.g., the fifteenth edge E15 in FIG. 15) configured to correspond to a first edge (e.g., the first edge E1 in FIG. 15) of the first antenna element or the second antenna element when viewed from above the first surface. The second conductive material may include a third edge (e.g., the edge 1211 in FIG. 15) configured to correspond to the second edge. The second edge may be positioned between the first edge and the third edge. The first conductive material may include a fourth edge (e.g., the edge 1101 in FIG. 15) positioned between the second and the third edge when viewed from above the first surface.

The electronic device may further include a non-conductive support structure (e.g., the third support structure 9 in FIG. 15) positioned in the housing. The printed circuit board (e.g., the printed circuit board 41 in FIG. 15) may be coupled to the non-conductive support structure. The first conductive material may include a conductive adhesive member (e.g., the conductive adhesive member 1100 in FIG. 15) which is positioned at least partially between the printed circuit board and the non-conductive support structure.

The non-conductive support structure (e.g., the third support structure 9 in FIG. 15) may include a third surface (e.g., the third surface 9A in FIG. 15) configured to face the printed circuit board (e.g., printed circuit board 41 in FIG. 15), and a fourth surface (e.g., the fourth surface 9B in FIG. 15) configured to face a direction opposite to the third surface. The second conductive material (e.g., the first conductive pattern 1210 in FIG. 15) may be disposed on the fourth surface.

The second conductive material (e.g., the first conductive pattern 1210 in FIG. 15) may be disposed on a fourth surface (e.g., the fourth surface 9B in FIG. 15) using LDS.

The electronic device may further include a third conductive material (e.g., the third layer 2030 or the fourth layer 2040 in FIG. 21). The third conductive material may be positioned closer to the front surface than the second conductive material (e.g., the second layer 2020 in FIG. 2) when the first surface faces the rear surface, and positioned closer to the rear surface than the second conductive material when the first surface faces the front surface. The third conductive material may be configured to overlap the second conductive material when viewed from above the first surface. The third conductive material may include a fifth edge configured to correspond to the third edge (e.g., the edge of the second layer 2020 in FIG. 21) when viewed from above the first surface. The third edge may be positioned between the fourth edge (e.g., the edge of the first layer 2010 in FIG. 21) and the fifth edge.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing configured to provide a front surface of the electronic device and a rear surface of the electronic device;
an antenna structure comprising a printed circuit board which is positioned in the housing, wherein the printed circuit board comprises:
a first surface configured to face the front surface or the rear surface,
a second surface configured to face a direction opposite to the first surface,
a first conductive layer comprising a first antenna element and a second antenna element which are configured so as not to overlap each other when viewed from above the first surface,
a second conductive layer positioned closer to the second surface than the first conductive layer and configured to operate as a ground plane, and
a dielectric positioned between the first conductive layer and the second conductive layer;
a first conductive material positioned between the front surface and the second surface when the first surface faces the rear surface and positioned between the rear surface and the second surface when the first surface faces the front surface, and configured to overlap the second conductive layer when viewed from above the first surface; and
a second conductive material positioned closer to the front surface than the first conductive material when the first surface faces the rear surface and positioned closer to the rear surface than the first conductive material when the first surface faces the front surface, and configured to overlap the first conductive material when viewed from above the first surface,
wherein when viewed from above the first surface, the second conductive layer comprises a second edge configured to correspond to a first edge of the first antenna element or the second antenna element and the second conductive material comprises a third edge configured to correspond to the second edge, and the second edge is positioned between the first edge and the third edge.

2. The electronic device of claim 1, wherein the first conductive material comprises a fourth edge positioned between the second edge and the third edge when viewed from above the first surface.

3. The electronic device of claim 1, wherein the first conductive material comprises a conductive adhesive member disposed on the second surface.

4. The electronic device of claim 1, wherein the first conductive material or the second conductive material is in an electrically floating state.

5. The electronic device of claim 1, further comprising:
a non-conductive support structure positioned in the housing,
wherein the printed circuit board is coupled to the non-conductive support structure, and
wherein at least a part of the first conductive material is positioned between the printed circuit board and the non-conductive support structure.

6. The electronic device of claim 5, wherein the first conductive material comprises a conductive adhesive member.

7. The electronic device of claim 5,
wherein the non-conductive support structure comprises:
a third surface configured to face the printed circuit board, and
a fourth surface configured to face a direction opposite to the third surface, and
wherein the second conductive material is disposed on the fourth surface.

8. The electronic device of claim 7, wherein the second conductive material is disposed on the fourth surface using laser direct structuring (LDS).

9. The electronic device of claim 5, wherein at least a part of the second conductive material is positioned inside the non-conductive support structure.

10. The electronic device of claim 1, further comprising:
a side surface member configured to provide at least a part of a side surface of the electronic device;
a support member positioned in the housing, and connected or coupled to the side surface member; and
a non-conductive support structure disposed on one surface of the support member, which is configured to face the rear surface,
wherein the printed circuit board is coupled to the non-conductive support structure.

11. The electronic device of claim 1, wherein the first conductive material or the second conductive material is configured to be parallel to the second conductive layer.

12. The electronic device of claim 1, further comprising:
a third conductive material positioned closer to the front surface than the second conductive material when the first surface faces the rear surface and positioned closer to the rear surface than the second conductive material, and configured to overlap the second conductive material when viewed from above the first surface,
wherein when viewed from above the first surface, the third conductive material comprises a fourth edge configured to correspond to the third edge, and the third edge is positioned between the second edge and the third edge.

13. The electronic device of claim 1, further comprising:
a flexible display positioned in the housing and configured to be visually exposed through the front surface,
wherein the housing is configured such that the front surface is foldable inward, and comprises a first housing and a second housing with reference to a folding axis, and
wherein the antenna structure is positioned in the first housing or the second housing.

14. The electronic device of claim 1, wherein the antenna structure is configured to transmit and/or receive a signal of a frequency band of an ultra-wide band (UWB).

15. The electronic device of claim 1, further comprising:
a wireless communication circuit configured to transmit and/or receive a signal in a selected or a designated frequency band through the antenna structure; and a processor electrically connected to the wireless communication circuit, wherein the processor is configured to perform a location positioning function with respect to a signal source, based on the signals received through the first antenna element and the second antenna element.

16. An electronic device comprising:
a housing configured to provide a front surface of the electronic device and a rear surface of the electronic device;
an antenna structure comprising a printed circuit board which is positioned in the housing, wherein the printed circuit board comprises:
    a first surface configured to face the front surface or the rear surface,
    a second surface configured to face a direction opposite to the first surface,
    a first conductive layer comprising a first antenna element and a second antenna element which are configured so as not to overlap each other when viewed from above the first surface,
    a second conductive layer positioned closer to the second surface than first conductive layer and configured to operate as a ground plane, and
    a dielectric positioned between the first conductive layer and the second conductive layer;
a first conductive material positioned between the front surface and the second surface when the first surface faces the rear surface and positioned between the rear surface and the second surface when the first surface faces the front surface, and configured to overlap the second conductive layer when viewed from above the first surface; and
a second conductive material positioned closer to the front surface than the first conductive material when the first surface faces the rear surface and positioned closer to the rear surface than the first conductive material when the first surface faces the front surface, and configured to overlap the first conductive material when viewed from above the first surface,
wherein when viewed from above the first surface, the second conductive layer comprises a second edge configured to correspond to a first edge of the first antenna element or the second antenna element, the second conductive material comprises a third edge configured to correspond to the second edge, and the second edge is positioned between the first edge and the third edge, and
wherein the first conductive material comprises a fourth edge positioned between the second edge and the third edge when viewed from above the first surface.

17. The electronic device of claim 16, further comprising:
a non-conductive support structure positioned in the housing,
wherein the printed circuit board is coupled to the non-conductive support structure, and
wherein the first conductive material comprises a conductive adhesive member of which at least a part is positioned between the printed circuit board and the non-conductive support structure.

18. The electronic device of claim 17,
wherein the non-conductive support structure comprises:
    a third surface configured to face the printed circuit board, and
    a fourth surface configured to face a direction opposite to the third surface, and
wherein the second conductive material is disposed on the fourth surface.

19. The electronic device of claim 18, wherein the second conductive material is disposed on the fourth surface using laser direct structuring (LDS).

20. The electronic device of claim 16, further comprising:
a third conductive material positioned closer to the front surface than the second conductive material when the first surface faces the rear surface, positioned closer to the rear surface than the second conductive material when the first surface faces the front surface, and configured to overlap the second conductive material when viewed from above the first surface,
wherein when viewed from above the first surface, the third conductive material comprises a fifth edge configured to correspond to the third edge, and the third edge is positioned between the fourth edge and the fifth edge.

* * * * *